(12) United States Patent
King et al.

(10) Patent No.: US 8,799,099 B2
(45) Date of Patent: *Aug. 5, 2014

(54) PROCESSING TECHNIQUES FOR TEXT CAPTURE FROM A RENDERED DOCUMENT

(75) Inventors: Martin T. King, Vashon Island, WA (US); Dale L. Grover, Ann Arbor, MI (US); Clifford A. Kushler, Lynnwood, WA (US); James Q. Stafford-Fraser, Cambridge (GB)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/615,517

(22) Filed: Sep. 13, 2012

(65) Prior Publication Data

US 2013/0041782 A1 Feb. 14, 2013

Related U.S. Application Data

(63) Continuation of application No. 12/696,599, filed on Jan. 29, 2010, now Pat. No. 8,489,624, which is a
(Continued)

(51) Int. Cl.
*G06Q 30/00* (2012.01)

(52) U.S. Cl.
USPC ...................................................... 705/26.1

(58) Field of Classification Search
USPC ...................................................... 705/26.1
See application file for complete search history.

(56) References Cited

U.S. PATENT DOCUMENTS

| 3,899,687 A | 8/1975 | Jones |
| 3,917,317 A | 11/1975 | Ryan |

(Continued)

FOREIGN PATENT DOCUMENTS

| EP | 0424803 | 5/1991 |
| EP | 0544434 | 6/1993 |

(Continued)

OTHER PUBLICATIONS

Agilent Technologies, "Agilent ADNK-2133 Optical Mouse Designer's Kit: Product Overview", Agilent Technologies, May 26, 2004, pp. 1-6.

(Continued)

*Primary Examiner* — Yogesh C Garg
(74) *Attorney, Agent, or Firm* — Fish & Richardson P.C.

(57) ABSTRACT

A facility for initiating a purchase is described. The facility receives a text sequence captured by a user from a rendered document using a handheld text capture device. The facility identifies in the received text sequence a reference to a distinguished product. In response to identifying the reference, the facility presents to the user an opportunity to place an order for the established product. If the user accepts the presented opportunity to order the distinct product, the facility orders the distinct product on behalf of the user.

23 Claims, 11 Drawing Sheets

Related U.S. Application Data continuation of application No. 11/131,945, filed on May 17, 2005, now Pat. No. 7,818,215, which is a continuation-in-part of application No. 11/004,637, filed on Dec. 3, 2004, now Pat. No. 7,707,039, and a continuation-in-part of application No. 11/097,961, filed on Apr. 1, 2005, now abandoned, and a continuation-in-part of application No. 11/097,093, filed on Apr. 1, 2005, now abandoned, and a continuation-in-part of application No. 11/098,038, filed on Apr. 1, 2005, now Pat. No. 7,599,844, and a continuation-in-part of application No. 11/098,014, filed on Apr. 1, 2005, now Pat. No. 8,019,648, and a continuation-in-part of application No. 11/097,103, filed on Apr. 1, 2005, now Pat. No. 7,596,269, and a continuation-in-part of application No. 11/098,043, filed on Apr. 1, 2005, now abandoned, and a continuation-in-part of application No. 11/097,981, filed on Apr. 1, 2005, now Pat. No. 7,606,741, and a continuation-in-part of application No. 11/097,089, filed on Apr. 1, 2005, now Pat. No. 8,214,387, and a continuation-in-part of application No. 11/097,835, filed on Apr. 1, 2005, now Pat. No. 7,831,912, and a continuation-in-part of application No. 11/098,016, filed on Apr. 1, 2005, now Pat. No. 7,421,155, and a continuation-in-part of application No. 11/097,828, filed on Apr. 1, 2005, now Pat. No. 7,742,953, and a continuation-in-part of application No. 11/097,833, filed on Apr. 1, 2005, now Pat. No. 8,515,816, and a continuation-in-part of application No. 11/097,836, filed on Apr. 1, 2005, now abandoned, and a continuation-in-part of application No. 11/098,042, filed on Apr. 1, 2005, now Pat. No. 7,593,605, and a continuation-in-part of application No. 11/096,704, filed on Apr. 1, 2005, now Pat. No. 7,599,580, and a continuation-in-part of application No. 11/110,353, filed on Apr. 19, 2005, now Pat. No. 7,702,624.

(60) Provisional application No. 60/571,715, filed on May 17, 2004, provisional application No. 60/589,203, filed on Jul. 19, 2004, provisional application No. 60/589,201, filed on Jul. 19, 2004, provisional application No. 60/589,202, filed on Jul. 19, 2004, provisional application No. 60/598,821, filed on Aug. 2, 2004, provisional application No. 60/602,956, filed on Aug. 18, 2004, provisional application No. 60/602,925, filed on Aug. 18, 2004, provisional application No. 60/602,947, filed on Aug. 18, 2004, provisional application No. 60/602,897, filed on Aug. 18, 2004, provisional application No. 60/602,896, filed on Aug. 18, 2004, provisional application No. 60/602,898, filed on Aug. 18, 2004, provisional application No. 60/602,930, filed on Aug. 18, 2004, provisional application No. 60/603,466, filed on Aug. 19, 2004, provisional application No. 60/603,082, filed on Aug. 19, 2004, provisional application No. 60/603,081, filed on Aug. 19, 2004, provisional application No. 60/603,498, filed on Aug. 20, 2004, provisional application No. 60/603,358, filed on Aug. 20, 2004, provisional application No. 60/604,103, filed on Aug. 23, 2004, provisional application No. 60/604,102, filed on Aug. 23, 2004, provisional application No. 60/604,100, filed on Aug. 23, 2004, provisional application No. 60/604,098, filed on Aug. 23, 2004, provisional application No. 60/605,229, filed on Aug. 27, 2004, provisional application No. 60/605,105, filed on Aug. 27, 2004, provisional application No. 60/613,243, filed on Sep. 27, 2004, provisional application No. 60/613,628, filed on Sep. 27, 2004, provisional application No. 60/613,632, filed on Sep. 27, 2004, provisional application No. 60/613,589, filed on Sep. 27, 2004, provisional application No. 60/613,242, filed on Sep. 27, 2004, provisional application No. 60/613,602, filed on Sep. 27, 2004, provisional application No. 60/613,340, filed on Sep. 27, 2004, provisional application No. 60/613,634, filed on Sep. 27, 2004, provisional application No. 60/613,461, filed on Sep. 27, 2004, provisional application No. 60/613,455, filed on Sep. 27, 2004, provisional application No. 60/613,460, filed on Sep. 27, 2004, provisional application No. 60/613,400, filed on Sep. 27, 2004, provisional application No. 60/613,456, filed on Sep. 27, 2004, provisional application No. 60/613,341, filed on Sep. 27, 2004, provisional application No. 60/613,361, filed on Sep. 27, 2004, provisional application No. 60/613,454, filed on Sep. 27, 2004, provisional application No. 60/613,339, filed on Sep. 27, 2004, provisional application No. 60/613,633, filed on Sep. 27, 2004, provisional application No. 60/615,378, filed on Oct. 1, 2004, provisional application No. 60/615,112, filed on Oct. 1, 2004, provisional application No. 60/615,538, filed on Oct. 1, 2004, provisional application No. 60/617,122, filed on Oct. 7, 2004, provisional application No. 60/622,906, filed on Oct. 28, 2004, provisional application No. 60/633,452, filed on Dec. 6, 2004, provisional application No. 60/633,678, filed on Dec. 6, 2004, provisional application No. 60/633,453, filed on Dec. 6, 2004, provisional application No. 60/633,486, filed on Dec. 6, 2004, provisional application No. 60/634,627, filed on Dec. 9, 2004, provisional application No. 60/634,739, filed on Dec. 9, 2004, provisional application No. 60/647,684, filed on Jan. 26, 2005, provisional application No. 60/648,746, filed on Jan. 31, 2005, provisional application No. 60/653,372, filed on Feb. 15, 2005, provisional application No. 60/653,663, filed on Feb. 16, 2005, provisional application No. 60/653,669, filed on Feb. 16, 2005, provisional application No. 60/653,899, filed on Feb. 16, 2005, provisional application No. 60/653,679, filed on Feb. 16, 2005, provisional application No. 60/653,847, filed on Feb. 16, 2005, provisional application No. 60/654,379, filed on Feb. 17, 2005, provisional application No. 60/654,368, filed on Feb. 18, 2005, provisional application No. 60/654,326, filed on Feb. 18, 2005, provisional application No. 60/654,196, filed on Feb. 18, 2005, provisional application No. 60/655,279, filed on Feb. 22, 2005, provisional application No. 60/655,280, filed on Feb. 22, 2005, provisional application No. 60/655,987, filed on Feb. 22, 2005, provisional application No. 60/655,697, filed on Feb. 22, 2005, provisional application No. 60/655,281, filed on Feb. 22, 2005, provisional application No. 60/657,309, filed on Feb. 28, 2005.

(56) References Cited

U.S. PATENT DOCUMENTS

| | | |
|---|---|---|
| 4,052,058 A | 10/1977 | Hintz |
| 4,065,778 A | 12/1977 | Harvey |
| 4,135,791 A | 1/1979 | Govignon |
| 4,358,824 A | 11/1982 | Glickman et al. |
| 4,526,078 A | 7/1985 | Chadabe |
| 4,538,072 A | 8/1985 | Immler et al. |
| 4,553,261 A | 11/1985 | Froessl |
| 4,610,025 A | 9/1986 | Blum et al. |
| 4,633,507 A | 12/1986 | Cannistra et al. |
| 4,636,848 A | 1/1987 | Yamamoto |
| 4,713,008 A | 12/1987 | Stocker et al. |
| 4,716,804 A | 1/1988 | Chadabe |
| 4,748,678 A | 5/1988 | Takeda et al. |
| 4,776,464 A | 10/1988 | Miller et al. |
| 4,804,949 A | 2/1989 | Faulkerson |
| 4,805,099 A | 2/1989 | Huber |
| 4,829,453 A | 5/1989 | Katsuta et al. |
| 4,829,872 A | 5/1989 | Topic et al. |
| 4,890,230 A | 12/1989 | Tanoshima et al. |
| D306,162 S | 2/1990 | Faulkerson et al. |

(56) References Cited

U.S. PATENT DOCUMENTS

| | | |
|---|---|---|
| 4,901,364 A | 2/1990 | Faulkerson et al. |
| 4,903,229 A | 2/1990 | Schmidt et al. |
| 4,914,709 A | 4/1990 | Rudak |
| 4,941,125 A | 7/1990 | Boyne |
| 4,947,261 A | 8/1990 | Ishikawa et al. |
| 4,949,391 A | 8/1990 | Faulkerson et al. |
| 4,955,693 A | 9/1990 | Bobba |
| 4,958,379 A | 9/1990 | Yamaguchi et al. |
| 4,968,877 A | 11/1990 | McAvinney et al. |
| 4,985,863 A | 1/1991 | Fujisawa et al. |
| 4,988,981 A | 1/1991 | Zimmerman et al. |
| 5,010,500 A | 4/1991 | Makkuni et al. |
| 5,012,349 A | 4/1991 | de Fay et al. |
| 5,040,229 A | 8/1991 | Lee et al. |
| 5,048,097 A | 9/1991 | Gaborski et al. |
| 5,062,143 A | 10/1991 | Schmitt |
| 5,083,218 A | 1/1992 | Takasu et al. |
| 5,093,873 A | 3/1992 | Takahashi |
| 5,107,256 A | 4/1992 | Ueno et al. |
| 5,109,439 A | 4/1992 | Froessl |
| 5,119,081 A | 6/1992 | Ikehira |
| 5,133,024 A | 7/1992 | Froessl et al. |
| 5,133,052 A | 7/1992 | Bier et al. |
| 5,136,687 A | 8/1992 | Edelman et al. |
| 5,140,644 A | 8/1992 | Kawaguchi et al. |
| 5,142,161 A | 8/1992 | Brackmann |
| 5,146,404 A | 9/1992 | Calloway et al. |
| 5,146,552 A | 9/1992 | Cassoria et al. |
| 5,151,951 A | 9/1992 | Ueda et al. |
| 5,157,384 A | 10/1992 | Greanias et al. |
| 5,159,668 A | 10/1992 | Kaasila |
| 5,168,147 A | 12/1992 | Bloomberg |
| 5,168,565 A | 12/1992 | Morita |
| 5,179,652 A | 1/1993 | Rozmanith et al. |
| 5,185,857 A | 2/1993 | Rozmanith et al. |
| 5,201,010 A | 4/1993 | Deaton et al. |
| 5,202,985 A | 4/1993 | Goyal |
| 5,203,704 A | 4/1993 | McCloud |
| 5,212,739 A | 5/1993 | Johnson |
| 5,229,590 A | 7/1993 | Harden et al. |
| 5,231,698 A | 7/1993 | Forcier |
| 5,243,149 A | 9/1993 | Comerford et al. |
| 5,247,285 A | 9/1993 | Yokota et al. |
| 5,251,106 A | 10/1993 | Hui |
| 5,251,316 A | 10/1993 | Anick et al. |
| 5,252,951 A | 10/1993 | Tannenbaum et al. |
| RE34,476 E | 12/1993 | Norwood |
| 5,271,068 A | 12/1993 | Ueda et al. |
| 5,272,324 A | 12/1993 | Blevins |
| 5,288,938 A | 2/1994 | Wheaton |
| 5,301,243 A | 4/1994 | Olschafskie et al. |
| 5,347,295 A | 9/1994 | Agulnick et al. |
| 5,347,306 A | 9/1994 | Nitta |
| 5,347,477 A | 9/1994 | Lee |
| 5,355,146 A | 10/1994 | Chiu et al. |
| 5,360,971 A | 11/1994 | Kaufman et al. |
| 5,367,453 A | 11/1994 | Capps et al. |
| 5,371,348 A | 12/1994 | Kumar et al. |
| 5,377,706 A | 1/1995 | Huang |
| 5,398,310 A | 3/1995 | Tchao et al. |
| 5,404,442 A | 4/1995 | Foster et al. |
| 5,404,458 A | 4/1995 | Zetts |
| 5,418,684 A | 5/1995 | Koenck et al. |
| 5,418,717 A | 5/1995 | Su et al. |
| 5,418,951 A | 5/1995 | Damashek |
| 5,423,554 A | 6/1995 | Davis |
| 5,430,558 A | 7/1995 | Sohaei et al. |
| 5,438,630 A | 8/1995 | Chen et al. |
| 5,444,779 A | 8/1995 | Daniele |
| 5,452,442 A | 9/1995 | Kephart |
| 5,454,043 A | 9/1995 | Freeman |
| 5,462,473 A | 10/1995 | Sheller |
| 5,465,325 A | 11/1995 | Capps et al. |
| 5,465,353 A | 11/1995 | Hull et al. |
| 5,467,425 A | 11/1995 | Lau et al. |
| 5,481,278 A | 1/1996 | Shigematsu et al. |
| 5,485,565 A | 1/1996 | Saund et al. |
| 5,488,196 A | 1/1996 | Zimmerman et al. |
| 5,499,108 A | 3/1996 | Cotte et al. |
| 5,500,920 A | 3/1996 | Kupiec |
| 5,500,937 A | 3/1996 | Thompson-Rohrlich |
| 5,502,803 A | 3/1996 | Yoshida et al. |
| 5,512,707 A | 4/1996 | Ohshima |
| 5,517,331 A | 5/1996 | Murai et al. |
| 5,517,578 A | 5/1996 | Altman et al. |
| 5,522,798 A | 6/1996 | Johnson et al. |
| 5,532,469 A | 7/1996 | Shepard et al. |
| 5,533,141 A | 7/1996 | Futatsugi et al. |
| 5,539,427 A | 7/1996 | Bricklin et al. |
| 5,541,419 A | 7/1996 | Arackellian |
| 5,543,591 A | 8/1996 | Gillespie et al. |
| 5,550,930 A | 8/1996 | Berman et al. |
| 5,555,363 A | 9/1996 | Tou et al. |
| 5,563,996 A | 10/1996 | Tchao |
| 5,568,452 A | 10/1996 | Kronenberg |
| 5,570,113 A | 10/1996 | Zetts |
| 5,574,804 A | 11/1996 | Olschafskie et al. |
| 5,577,135 A | 11/1996 | Grajski et al. |
| 5,581,276 A | 12/1996 | Cipolla et al. |
| 5,581,670 A | 12/1996 | Bier et al. |
| 5,581,681 A | 12/1996 | Tchao et al. |
| 5,583,542 A | 12/1996 | Capps et al. |
| 5,583,543 A | 12/1996 | Takahashi et al. |
| 5,583,980 A | 12/1996 | Anderson |
| 5,590,219 A | 12/1996 | Gourdol |
| 5,590,256 A | 12/1996 | Tchao et al. |
| 5,592,566 A | 1/1997 | Pagallo et al. |
| 5,594,469 A | 1/1997 | Freeman et al. |
| 5,594,640 A | 1/1997 | Capps et al. |
| 5,594,810 A | 1/1997 | Gourdol |
| 5,595,445 A | 1/1997 | Bobry |
| 5,596,697 A | 1/1997 | Foster et al. |
| 5,600,765 A | 2/1997 | Ando et al. |
| 5,602,376 A | 2/1997 | Coleman et al. |
| 5,602,570 A | 2/1997 | Capps et al. |
| 5,608,778 A | 3/1997 | Partridge, III |
| 5,612,719 A | 3/1997 | Beernink et al. |
| 5,624,265 A | 4/1997 | Redford et al. |
| 5,625,711 A | 4/1997 | Nicholson et al. |
| 5,625,833 A | 4/1997 | Levine et al. |
| 5,627,960 A | 5/1997 | Clifford et al. |
| 5,638,092 A | 6/1997 | Eng et al. |
| 5,649,060 A | 7/1997 | Ellozy et al. |
| 5,652,849 A | 7/1997 | Conway et al. |
| 5,656,804 A | 8/1997 | Barkan et al. |
| 5,659,638 A | 8/1997 | Bengtson |
| 5,663,514 A | 9/1997 | Usa |
| 5,663,808 A | 9/1997 | Park |
| 5,668,573 A | 9/1997 | Favot et al. |
| 5,677,710 A | 10/1997 | Thompson-Rohrlich |
| 5,680,607 A | 10/1997 | Brueckheimer |
| 5,682,439 A | 10/1997 | Beernink et al. |
| 5,684,873 A | 11/1997 | Tiilikainen |
| 5,684,891 A | 11/1997 | Tanaka et al. |
| 5,687,254 A | 11/1997 | Poon et al. |
| 5,692,073 A | 11/1997 | Cass |
| 5,699,441 A | 12/1997 | Sagawa et al. |
| 5,701,424 A | 12/1997 | Atkinson |
| 5,701,497 A | 12/1997 | Yamauchi et al. |
| 5,708,825 A | 1/1998 | Sotomayor |
| 5,710,831 A | 1/1998 | Beernink et al. |
| 5,713,045 A | 1/1998 | Berdahl |
| 5,714,698 A | 2/1998 | Tokioka et al. |
| 5,717,846 A | 2/1998 | Iida et al. |
| 5,724,521 A | 3/1998 | Dedrick |
| 5,724,985 A | 3/1998 | Snell et al. |
| 5,732,214 A | 3/1998 | Subrahmanyam |
| 5,732,227 A | 3/1998 | Kuzunuki et al. |
| 5,734,923 A | 3/1998 | Sagawa et al. |
| 5,737,507 A | 4/1998 | Smith |
| 5,745,116 A | 4/1998 | Pisutha-Arnond |
| 5,748,805 A | 5/1998 | Withgott et al. |
| 5,748,926 A | 5/1998 | Fukuda et al. |
| 5,752,051 A | 5/1998 | Cohen |

(56) References Cited

U.S. PATENT DOCUMENTS

| | | |
|---|---|---|
| 5,754,308 A | 5/1998 | Lopresti et al. |
| 5,754,939 A | 5/1998 | Herz et al. |
| 5,756,981 A | 5/1998 | Roustaei et al. |
| 5,757,360 A | 5/1998 | Nitta et al. |
| 5,764,794 A | 6/1998 | Perlin |
| 5,767,457 A | 6/1998 | Gerpheide et al. |
| 5,768,418 A | 6/1998 | Berman et al. |
| 5,768,607 A | 6/1998 | Drews et al. |
| 5,774,357 A | 6/1998 | Hoffberg et al. |
| 5,774,591 A | 6/1998 | Black et al. |
| 5,777,614 A | 7/1998 | Ando et al. |
| 5,781,662 A | 7/1998 | Mori et al. |
| 5,781,723 A | 7/1998 | Yee et al. |
| 5,784,061 A | 7/1998 | Moran et al. |
| 5,784,504 A | 7/1998 | Anderson et al. |
| 5,796,866 A | 8/1998 | Sakurai et al. |
| 5,798,693 A | 8/1998 | Engellenner |
| 5,798,758 A | 8/1998 | Harada et al. |
| 5,799,219 A | 8/1998 | Moghadam et al. |
| 5,805,167 A | 9/1998 | Van Cruyingen |
| 5,809,172 A | 9/1998 | Melen |
| 5,809,267 A | 9/1998 | Moran et al. |
| 5,809,476 A | 9/1998 | Ryan |
| 5,815,577 A | 9/1998 | Clark |
| 5,818,612 A | 10/1998 | Segawa et al. |
| 5,818,965 A | 10/1998 | Davies |
| 5,821,925 A | 10/1998 | Carey et al. |
| 5,822,539 A | 10/1998 | van Hoff |
| 5,825,943 A | 10/1998 | DeVito et al. |
| 5,832,474 A | 11/1998 | Lopresti et al. |
| 5,832,528 A | 11/1998 | Kwatinetz et al. |
| 5,837,987 A | 11/1998 | Koenck et al. |
| 5,838,326 A | 11/1998 | Card et al. |
| 5,838,889 A | 11/1998 | Booker |
| 5,845,301 A | 12/1998 | Rivette et al. |
| 5,848,187 A | 12/1998 | Bricklin et al. |
| 5,852,676 A | 12/1998 | Lazar |
| 5,861,886 A | 1/1999 | Moran et al. |
| 5,862,256 A | 1/1999 | Zetts et al. |
| 5,862,260 A | 1/1999 | Rhoads |
| 5,864,635 A | 1/1999 | Zetts et al. |
| 5,864,848 A | 1/1999 | Horvitz et al. |
| 5,867,150 A | 2/1999 | Bricklin et al. |
| 5,867,597 A | 2/1999 | Peairs et al. |
| 5,867,795 A | 2/1999 | Novis et al. |
| 5,880,411 A | 3/1999 | Gillespie et al. |
| 5,880,731 A | 3/1999 | Liles et al. |
| 5,880,743 A | 3/1999 | Moran et al. |
| 5,884,267 A | 3/1999 | Goldenthal et al. |
| 5,889,236 A | 3/1999 | Gillespie et al. |
| 5,889,523 A | 3/1999 | Wilcox et al. |
| 5,889,896 A | 3/1999 | Meshinsky et al. |
| 5,890,147 A | 3/1999 | Peltonen et al. |
| 5,893,095 A | 4/1999 | Jain et al. |
| 5,893,126 A | 4/1999 | Drews et al. |
| 5,893,130 A | 4/1999 | Inoue et al. |
| 5,895,470 A | 4/1999 | Pirolli et al. |
| 5,899,700 A | 5/1999 | Williams et al. |
| 5,905,251 A | 5/1999 | Knowles |
| 5,907,328 A | 5/1999 | Brush, II et al. |
| 5,913,185 A | 6/1999 | Martino et al. |
| 5,917,491 A | 6/1999 | Bauersfeld |
| 5,920,477 A | 7/1999 | Hoffberg et al. |
| 5,920,694 A | 7/1999 | Carleton et al. |
| 5,932,863 A | 8/1999 | Rathus et al. |
| 5,933,829 A | 8/1999 | Durst et al. |
| 5,937,422 A | 8/1999 | Nelson et al. |
| 5,946,406 A | 8/1999 | Frink et al. |
| 5,949,921 A | 9/1999 | Kojima et al. |
| 5,952,599 A | 9/1999 | Dolby et al. |
| 5,953,541 A | 9/1999 | King et al. |
| 5,956,423 A | 9/1999 | Frink et al. |
| 5,960,383 A | 9/1999 | Fleischer |
| 5,963,966 A | 10/1999 | Mitchell et al. |
| 5,966,126 A | 10/1999 | Szabo |
| 5,970,455 A | 10/1999 | Wilcox et al. |
| 5,982,853 A | 11/1999 | Liebermann |
| 5,982,928 A | 11/1999 | Shimada et al. |
| 5,982,929 A | 11/1999 | Ilan et al. |
| 5,983,171 A | 11/1999 | Yokoyama et al. |
| 5,983,295 A | 11/1999 | Cotugno |
| 5,986,200 A | 11/1999 | Curtin |
| 5,986,655 A | 11/1999 | Chiu et al. |
| 5,990,878 A | 11/1999 | Ikeda et al. |
| 5,990,893 A | 11/1999 | Numazaki |
| 5,991,441 A | 11/1999 | Jourjine |
| 5,995,643 A | 11/1999 | Saito |
| 5,999,664 A | 12/1999 | Mahoney et al. |
| 6,002,491 A | 12/1999 | Li et al. |
| 6,002,798 A | 12/1999 | Palmer et al. |
| 6,002,808 A | 12/1999 | Freeman |
| 6,003,775 A | 12/1999 | Ackley |
| 6,009,420 A | 12/1999 | Fagg, III et al. |
| 6,011,905 A | 1/2000 | Huttenlocher et al. |
| 6,012,071 A | 1/2000 | Krishna et al. |
| 6,018,342 A | 1/2000 | Bristor |
| 6,018,346 A | 1/2000 | Moran et al. |
| 6,021,218 A | 2/2000 | Capps et al. |
| 6,021,403 A | 2/2000 | Horvitz et al. |
| 6,025,844 A | 2/2000 | Parsons |
| 6,026,388 A | 2/2000 | Liddy et al. |
| 6,028,271 A | 2/2000 | Gillespie et al. |
| 6,029,141 A | 2/2000 | Bezos et al. |
| 6,029,195 A | 2/2000 | Herz |
| 6,031,525 A | 2/2000 | Perlin |
| 6,033,086 A | 3/2000 | Bohn |
| 6,036,086 A | 3/2000 | Sizer, II et al. |
| 6,038,342 A | 3/2000 | Bernzott et al. |
| 6,040,840 A | 3/2000 | Koshiba et al. |
| 6,042,012 A | 3/2000 | Olmstead et al. |
| 6,044,378 A | 3/2000 | Gladney |
| 6,049,034 A | 4/2000 | Cook |
| 6,049,327 A | 4/2000 | Walker et al. |
| 6,052,481 A | 4/2000 | Grajski et al. |
| 6,053,413 A | 4/2000 | Swift et al. |
| 6,055,333 A | 4/2000 | Guzik et al. |
| 6,055,513 A | 4/2000 | Katz et al. |
| 6,057,844 A | 5/2000 | Strauss |
| 6,057,845 A | 5/2000 | Dupouy |
| 6,061,050 A | 5/2000 | Allport et al. |
| 6,064,854 A | 5/2000 | Peters et al. |
| 6,066,794 A | 5/2000 | Longo |
| 6,069,622 A | 5/2000 | Kurlander |
| 6,072,494 A | 6/2000 | Nguyen |
| 6,072,502 A | 6/2000 | Gupta |
| 6,075,895 A | 6/2000 | Qiao et al. |
| 6,078,308 A | 6/2000 | Rosenberg et al. |
| 6,081,206 A | 6/2000 | Kielland |
| 6,081,621 A | 6/2000 | Ackner |
| 6,081,629 A | 6/2000 | Browning |
| 6,085,162 A | 7/2000 | Cherny |
| 6,088,484 A | 7/2000 | Mead |
| 6,088,731 A | 7/2000 | Kiraly et al. |
| 6,092,038 A | 7/2000 | Kanevsky et al. |
| 6,092,068 A | 7/2000 | Dinkelacker |
| 6,094,689 A | 7/2000 | Embry et al. |
| 6,095,418 A | 8/2000 | Swartz et al. |
| 6,097,392 A | 8/2000 | Leyerle |
| 6,098,106 A | 8/2000 | Philyaw et al. |
| 6,104,401 A | 8/2000 | Parsons |
| 6,104,845 A | 8/2000 | Lipman et al. |
| 6,107,994 A | 8/2000 | Harada et al. |
| 6,108,656 A | 8/2000 | Durst et al. |
| 6,111,580 A | 8/2000 | Kazama et al. |
| 6,111,588 A | 8/2000 | Newell |
| 6,115,053 A | 9/2000 | Perlin |
| 6,115,482 A | 9/2000 | Sears et al. |
| 6,115,724 A | 9/2000 | Booker |
| 6,118,888 A | 9/2000 | Chino et al. |
| 6,118,899 A | 9/2000 | Bloomfield et al. |
| D432,539 S | 10/2000 | Philyaw |
| 6,128,003 A | 10/2000 | Smith et al. |
| 6,134,532 A | 10/2000 | Lazarus et al. |
| 6,138,915 A | 10/2000 | Danielson et al. |

(56) References Cited

U.S. PATENT DOCUMENTS

| | | |
|---|---|---|
| 6,140,140 A | 10/2000 | Hopper |
| 6,144,366 A | 11/2000 | Numazaki et al. |
| 6,145,003 A | 11/2000 | Sanu et al. |
| 6,147,678 A | 11/2000 | Kumar et al. |
| 6,151,208 A | 11/2000 | Bartlett |
| 6,154,222 A | 11/2000 | Haratsch et al. |
| 6,154,723 A | 11/2000 | Cox et al. |
| 6,154,737 A | 11/2000 | Inaba et al. |
| 6,154,758 A | 11/2000 | Chiang |
| 6,157,465 A | 12/2000 | Suda et al. |
| 6,157,935 A | 12/2000 | Tran et al. |
| 6,164,534 A | 12/2000 | Rathus et al. |
| 6,167,369 A | 12/2000 | Schulze |
| 6,169,969 B1 | 1/2001 | Cohen |
| 6,175,772 B1 | 1/2001 | Kamiya et al. |
| 6,175,922 B1 | 1/2001 | Wang |
| 6,178,261 B1 | 1/2001 | Williams et al. |
| 6,178,263 B1 | 1/2001 | Fan et al. |
| 6,181,343 B1 | 1/2001 | Lyons |
| 6,181,778 B1 | 1/2001 | Ohki et al. |
| 6,184,847 B1 | 2/2001 | Fateh et al. |
| 6,192,165 B1 | 2/2001 | Irons |
| 6,192,478 B1 | 2/2001 | Elledge |
| 6,195,104 B1 | 2/2001 | Lyons |
| 6,195,475 B1 | 2/2001 | Beausoleil, Jr. et al. |
| 6,199,048 B1 | 3/2001 | Hudetz et al. |
| 6,201,903 B1 | 3/2001 | Wolff et al. |
| 6,204,852 B1 | 3/2001 | Kumar et al. |
| 6,208,355 B1 | 3/2001 | Schuster |
| 6,208,435 B1 | 3/2001 | Zwolinski |
| 6,212,299 B1 | 4/2001 | Yuge |
| 6,215,890 B1 | 4/2001 | Matsuo et al. |
| 6,218,964 B1 | 4/2001 | Ellis |
| 6,219,057 B1 | 4/2001 | Carey et al. |
| 6,222,465 B1 | 4/2001 | Kumar et al. |
| 6,226,631 B1 | 5/2001 | Evans |
| 6,229,137 B1 | 5/2001 | Bohn |
| 6,229,542 B1 | 5/2001 | Miller |
| 6,233,591 B1 | 5/2001 | Sherman et al. |
| 6,240,207 B1 | 5/2001 | Shinozuka et al. |
| 6,243,683 B1 | 6/2001 | Peters |
| 6,244,873 B1 | 6/2001 | Hill et al. |
| 6,249,292 B1 | 6/2001 | Christian et al. |
| 6,249,606 B1 | 6/2001 | Kiraly et al. |
| 6,252,598 B1 | 6/2001 | Segen |
| 6,256,400 B1 | 7/2001 | Takata et al. |
| 6,265,844 B1 | 7/2001 | Wakefield |
| 6,269,187 B1 | 7/2001 | Frink et al. |
| 6,269,188 B1 | 7/2001 | Jamali |
| 6,270,013 B1 | 8/2001 | Lipman et al. |
| 6,285,794 B1 | 9/2001 | Georgiev et al. |
| 6,289,304 B1 | 9/2001 | Grenfenstette |
| 6,292,274 B1 | 9/2001 | Bohn |
| 6,304,674 B1 | 10/2001 | Cass et al. |
| 6,307,952 B1 | 10/2001 | Dietz |
| 6,307,955 B1 | 10/2001 | Zank et al. |
| 6,310,971 B1 | 10/2001 | Shiiyama |
| 6,310,988 B1 | 10/2001 | Flores et al. |
| 6,311,152 B1 | 10/2001 | Bai et al. |
| 6,312,175 B1 | 11/2001 | Lum |
| 6,313,853 B1 | 11/2001 | Lamontagne et al. |
| 6,314,406 B1 | 11/2001 | O'Hagan et al. |
| 6,314,457 B1 | 11/2001 | Schena et al. |
| 6,316,710 B1 | 11/2001 | Lindemann |
| 6,317,132 B1 | 11/2001 | Perlin |
| 6,318,087 B1 | 11/2001 | Baumann et al. |
| 6,321,991 B1 | 11/2001 | Knowles |
| 6,323,846 B1 | 11/2001 | Westerman et al. |
| 6,326,962 B1 | 12/2001 | Szabo |
| 6,330,976 B1 | 12/2001 | Dymetman et al. |
| 6,335,725 B1 | 1/2002 | Koh et al. |
| 6,341,280 B1 | 1/2002 | Glass et al. |
| 6,341,290 B1 | 1/2002 | Lombardo et al. |
| 6,342,901 B1 | 1/2002 | Alder et al. |
| 6,344,906 B1 | 2/2002 | Gatto et al. |
| 6,345,104 B1 | 2/2002 | Rhoads |
| 6,346,933 B1 | 2/2002 | Lin |
| 6,347,290 B1 | 2/2002 | Bartlett |
| 6,349,308 B1 | 2/2002 | Whang et al. |
| 6,351,222 B1 | 2/2002 | Swan et al. |
| 6,356,281 B1 | 3/2002 | Isenman |
| 6,356,899 B1 | 3/2002 | Chakrabarti et al. |
| 6,360,949 B1 | 3/2002 | Shepard et al. |
| 6,360,951 B1 | 3/2002 | Swinehart |
| 6,363,160 B1 | 3/2002 | Bradski et al. |
| RE37,654 E | 4/2002 | Longo |
| 6,366,288 B1 | 4/2002 | Naruki et al. |
| 6,369,811 B1 | 4/2002 | Graham et al. |
| 6,377,296 B1 | 4/2002 | Zlatsin et al. |
| 6,377,712 B1 | 4/2002 | Georgiev et al. |
| 6,377,986 B1 | 4/2002 | Philyaw et al. |
| 6,378,075 B1 | 4/2002 | Goldstein et al. |
| 6,380,931 B1 | 4/2002 | Gillespie et al. |
| 6,381,602 B1 | 4/2002 | Shoroff et al. |
| 6,384,744 B1 | 5/2002 | Philyaw et al. |
| 6,384,829 B1 | 5/2002 | Prevost et al. |
| 6,393,443 B1 | 5/2002 | Rubin et al. |
| 6,396,523 B1 | 5/2002 | Segal et al. |
| 6,396,951 B1 | 5/2002 | Grefenstette |
| 6,400,845 B1 | 6/2002 | Volino |
| 6,404,438 B1 | 6/2002 | Hatlelid et al. |
| 6,408,257 B1 | 6/2002 | Harrington et al. |
| 6,409,401 B1 | 6/2002 | Petteruti et al. |
| 6,414,671 B1 | 7/2002 | Gillespie et al. |
| 6,417,797 B1 | 7/2002 | Cousins et al. |
| 6,418,433 B1 | 7/2002 | Chakrabarti et al. |
| 6,421,453 B1 | 7/2002 | Kanevsky et al. |
| 6,421,675 B1 | 7/2002 | Ryan et al. |
| 6,427,032 B1 | 7/2002 | Irons et al. |
| 6,429,899 B1 | 8/2002 | Nio et al. |
| 6,430,554 B1 | 8/2002 | Rothschild |
| 6,430,567 B2 | 8/2002 | Burridge |
| 6,433,784 B1 | 8/2002 | Merrick et al. |
| 6,434,561 B1 | 8/2002 | Durst, Jr. et al. |
| 6,434,581 B1 | 8/2002 | Forcier |
| 6,438,523 B1 | 8/2002 | Oberteuffer et al. |
| 6,448,979 B1 | 9/2002 | Schena et al. |
| 6,449,616 B1 | 9/2002 | Walker et al. |
| 6,454,626 B1 | 9/2002 | An |
| 6,459,823 B2 | 10/2002 | Altunbasak et al. |
| 6,460,036 B1 | 10/2002 | Herz |
| 6,466,198 B1 | 10/2002 | Feinstein |
| 6,466,336 B1 | 10/2002 | Sturgeon et al. |
| 6,476,830 B1 | 11/2002 | Farmer et al. |
| 6,476,834 B1 | 11/2002 | Doval et al. |
| 6,477,239 B1 | 11/2002 | Ohki et al. |
| 6,483,513 B1 | 11/2002 | Haratsch et al. |
| 6,484,156 B1 | 11/2002 | Gupta et al. |
| 6,486,874 B1 | 11/2002 | Muthuswamy et al. |
| 6,486,892 B1 | 11/2002 | Stern |
| 6,489,970 B1 | 12/2002 | Pazel |
| 6,490,553 B2 | 12/2002 | van Thong et al. |
| 6,491,217 B2 | 12/2002 | Catan |
| 6,493,707 B1 | 12/2002 | Dey et al. |
| 6,498,970 B2 | 12/2002 | Colmenarez et al. |
| 6,504,138 B1 | 1/2003 | Mangerson |
| 6,507,349 B1 | 1/2003 | Balassanian |
| 6,508,706 B2 | 1/2003 | Sitrick et al. |
| 6,509,707 B2 | 1/2003 | Yamashita et al. |
| 6,509,912 B1 | 1/2003 | Moran et al. |
| 6,510,387 B2 | 1/2003 | Fuchs et al. |
| 6,510,417 B1 | 1/2003 | Woods et al. |
| 6,518,950 B1 | 2/2003 | Dougherty et al. |
| 6,520,407 B1 | 2/2003 | Nieswand et al. |
| 6,522,333 B1 | 2/2003 | Hatlelid et al. |
| 6,525,749 B1 | 2/2003 | Moran et al. |
| 6,526,395 B1 | 2/2003 | Morris |
| 6,526,449 B1 | 2/2003 | Philyaw et al. |
| 6,532,007 B1 | 3/2003 | Matsuda |
| 6,537,324 B1 | 3/2003 | Tabata et al. |
| 6,538,187 B2 | 3/2003 | Beigi |
| 6,539,931 B2 | 4/2003 | Trajkovic et al. |
| 6,540,141 B1 | 4/2003 | Dougherty et al. |
| 6,542,933 B1 | 4/2003 | Durst, Jr. et al. |

(56) References Cited

U.S. PATENT DOCUMENTS

| | | |
|---|---|---|
| 6,543,052 B1 | 4/2003 | Ogasawara |
| 6,545,669 B1 | 4/2003 | Kinawi et al. |
| 6,546,385 B1 | 4/2003 | Mao et al. |
| 6,546,405 B2 | 4/2003 | Gupta et al. |
| 6,549,751 B1 | 4/2003 | Mandri |
| 6,549,891 B1 | 4/2003 | Rauber et al. |
| 6,554,433 B1 | 4/2003 | Holler |
| 6,560,281 B1 | 5/2003 | Black et al. |
| 6,564,144 B1 | 5/2003 | Cherveny |
| 6,570,555 B1 | 5/2003 | Prevost et al. |
| 6,571,193 B1 | 5/2003 | Unuma et al. |
| 6,571,235 B1 | 5/2003 | Marpe et al. |
| 6,573,883 B1 | 6/2003 | Bartlett |
| 6,577,329 B1 | 6/2003 | Flickner et al. |
| 6,577,953 B1 | 6/2003 | Swope et al. |
| 6,587,835 B1 | 7/2003 | Treyz et al. |
| 6,593,723 B1 | 7/2003 | Johnson |
| 6,594,616 B2 | 7/2003 | Zhang et al. |
| 6,594,705 B1 | 7/2003 | Philyaw |
| 6,597,443 B2 | 7/2003 | Boman |
| 6,597,812 B1 | 7/2003 | Fallon et al. |
| 6,599,130 B2 | 7/2003 | Moehrle |
| 6,600,475 B2 | 7/2003 | Gutta et al. |
| 6,610,936 B2 | 8/2003 | Gillespie et al. |
| 6,611,598 B1 | 8/2003 | Hayosh |
| 6,615,136 B1 | 9/2003 | Swope et al. |
| 6,615,268 B1 | 9/2003 | Philyaw et al. |
| 6,616,038 B1 | 9/2003 | Olschafskie et al. |
| 6,616,047 B2 | 9/2003 | Catan |
| 6,617,369 B2 | 9/2003 | Parfondry et al. |
| 6,618,504 B1 | 9/2003 | Yoshino |
| 6,618,732 B1 | 9/2003 | White et al. |
| 6,622,165 B1 | 9/2003 | Philyaw |
| 6,624,833 B1 | 9/2003 | Kumar et al. |
| 6,625,335 B1 | 9/2003 | Kanai |
| 6,625,581 B1 | 9/2003 | Perkowski |
| 6,628,295 B2 | 9/2003 | Wilensky |
| 6,629,133 B1 | 9/2003 | Philyaw et al. |
| 6,630,924 B1 | 10/2003 | Peck |
| 6,631,404 B1 | 10/2003 | Philyaw |
| 6,636,763 B1 | 10/2003 | Junker et al. |
| 6,636,892 B1 | 10/2003 | Philyaw |
| 6,636,896 B1 | 10/2003 | Philyaw |
| 6,638,314 B1 | 10/2003 | Meyerzon et al. |
| 6,638,317 B2 | 10/2003 | Nakao |
| 6,640,145 B2 | 10/2003 | Hoffberg et al. |
| 6,641,037 B2 | 11/2003 | Williams |
| 6,643,661 B2 | 11/2003 | Polizzi et al. |
| 6,643,692 B1 | 11/2003 | Philyaw et al. |
| 6,643,696 B2 | 11/2003 | Davis et al. |
| 6,650,442 B1 | 11/2003 | Chiu |
| 6,650,761 B1 | 11/2003 | Rodriguez et al. |
| 6,651,053 B1 | 11/2003 | Rothschild |
| 6,658,151 B2 | 12/2003 | Lee et al. |
| 6,661,919 B2 | 12/2003 | Nicholson et al. |
| 6,664,991 B1 | 12/2003 | Chew et al. |
| 6,669,088 B2 | 12/2003 | Veeneman |
| 6,671,684 B1 | 12/2003 | Hull et al. |
| 6,675,356 B1 | 1/2004 | Alder et al. |
| 6,677,969 B1 | 1/2004 | Hongo |
| 6,678,075 B1 | 1/2004 | Tsai et al. |
| 6,678,664 B1 | 1/2004 | Ganesan |
| 6,678,687 B2 | 1/2004 | Watanabe et al. |
| 6,681,031 B2 | 1/2004 | Cohen et al. |
| 6,686,844 B2 | 2/2004 | Watanabe et al. |
| 6,687,612 B2 | 2/2004 | Cherveny |
| 6,688,081 B2 | 2/2004 | Boyd |
| 6,688,522 B1 | 2/2004 | Philyaw et al. |
| 6,688,523 B1 | 2/2004 | Koenck |
| 6,688,525 B1 | 2/2004 | Nelson et al. |
| 6,690,358 B2 | 2/2004 | Kaplan |
| 6,691,107 B1 | 2/2004 | Dockter et al. |
| 6,691,123 B1 | 2/2004 | Guliksen |
| 6,691,151 B1 | 2/2004 | Cheyer et al. |
| 6,691,194 B1 | 2/2004 | Ofer |
| 6,691,914 B2 | 2/2004 | Isherwood et al. |
| 6,692,259 B2 | 2/2004 | Kumar et al. |
| 6,694,356 B1 | 2/2004 | Philyaw |
| 6,697,838 B1 | 2/2004 | Jakobson |
| 6,697,949 B1 | 2/2004 | Philyaw et al. |
| H2098 H | 3/2004 | Morin |
| 6,701,354 B1 | 3/2004 | Philyaw et al. |
| 6,701,369 B1 | 3/2004 | Philyaw |
| 6,704,024 B2 | 3/2004 | Robotham et al. |
| 6,704,699 B2 | 3/2004 | Nir |
| 6,707,581 B1 | 3/2004 | Browning |
| 6,708,208 B1 | 3/2004 | Philyaw |
| 6,714,677 B1 | 3/2004 | Stearns et al. |
| 6,714,969 B1 | 3/2004 | Klein et al. |
| 6,718,308 B1 | 4/2004 | Nolting |
| 6,720,984 B1 | 4/2004 | Jorgensen et al. |
| 6,721,921 B1 | 4/2004 | Altman |
| 6,725,125 B2 | 4/2004 | Basson et al. |
| 6,725,203 B1 | 4/2004 | Seet et al. |
| 6,725,260 B1 | 4/2004 | Philyaw |
| 6,728,000 B1 | 4/2004 | Lapstun et al. |
| 6,735,632 B1 | 5/2004 | Kiraly et al. |
| 6,738,519 B1 | 5/2004 | Nishiwaki |
| 6,741,745 B2 | 5/2004 | Dance et al. |
| 6,741,871 B1 | 5/2004 | Silverbrook et al. |
| 6,744,938 B1 | 6/2004 | Rantze et al. |
| 6,745,234 B1 | 6/2004 | Philyaw et al. |
| 6,745,937 B2 | 6/2004 | Walsh et al. |
| 6,747,632 B2 | 6/2004 | Howard |
| 6,748,306 B2 | 6/2004 | Lipowicz |
| 6,750,852 B2 | 6/2004 | Gillespie et al. |
| 6,752,317 B2 | 6/2004 | Dymetman et al. |
| 6,752,498 B2 | 6/2004 | Covannon et al. |
| 6,753,883 B2 | 6/2004 | Schena et al. |
| 6,754,632 B1 | 6/2004 | Kalinowski et al. |
| 6,754,698 B1 | 6/2004 | Philyaw et al. |
| 6,757,715 B1 | 6/2004 | Philyaw |
| 6,757,783 B2 | 6/2004 | Koh |
| 6,758,398 B1 | 7/2004 | Philyaw et al. |
| 6,760,661 B2 | 7/2004 | Klein et al. |
| 6,763,386 B2 | 7/2004 | Davis et al. |
| 6,766,494 B1 | 7/2004 | Price et al. |
| 6,766,956 B1 | 7/2004 | Boylan, III et al. |
| 6,771,283 B2 | 8/2004 | Carro |
| 6,772,047 B2 | 8/2004 | Butikofer |
| 6,772,338 B1 | 8/2004 | Hull |
| 6,773,177 B2 | 8/2004 | Denoue et al. |
| 6,775,422 B1 | 8/2004 | Altman |
| 6,778,988 B2 | 8/2004 | Bengtson |
| 6,783,071 B2 | 8/2004 | Levine et al. |
| 6,785,421 B1 | 8/2004 | Gindele et al. |
| 6,786,793 B1 | 9/2004 | Wang |
| 6,788,809 B1 | 9/2004 | Grzeszczuk et al. |
| 6,788,815 B2 | 9/2004 | Lui et al. |
| 6,791,536 B2 | 9/2004 | Keely et al. |
| 6,791,588 B1 | 9/2004 | Philyaw |
| 6,792,112 B1 | 9/2004 | Campbell et al. |
| 6,792,452 B1 | 9/2004 | Philyaw |
| 6,798,429 B2 | 9/2004 | Bradski |
| 6,801,637 B2 | 10/2004 | Voronka et al. |
| 6,801,658 B2 | 10/2004 | Morita et al. |
| 6,801,907 B1 | 10/2004 | Zagami |
| 6,804,396 B2 | 10/2004 | Higaki et al. |
| 6,804,659 B1 | 10/2004 | Graham et al. |
| 6,812,961 B1 | 11/2004 | Parulski et al. |
| 6,813,039 B1 | 11/2004 | Silverbrook et al. |
| 6,816,894 B1 | 11/2004 | Philyaw et al. |
| 6,820,237 B1 | 11/2004 | Abu-Hakima et al. |
| 6,822,639 B1 | 11/2004 | Silverbrook et al. |
| 6,823,075 B2 | 11/2004 | Perry |
| 6,823,388 B1 | 11/2004 | Philyaw et al. |
| 6,824,044 B1 | 11/2004 | Lapstun et al. |
| 6,824,057 B2 | 11/2004 | Rathus et al. |
| 6,825,956 B2 | 11/2004 | Silverbrook et al. |
| 6,826,592 B1 | 11/2004 | Philyaw et al. |
| 6,827,259 B2 | 12/2004 | Rathus et al. |
| 6,827,267 B2 | 12/2004 | Rathus et al. |
| 6,829,650 B1 | 12/2004 | Philyaw et al. |
| 6,830,187 B2 | 12/2004 | Rathus et al. |

(56) References Cited

U.S. PATENT DOCUMENTS

| | | |
|---|---|---|
| 6,830,188 B2 | 12/2004 | Rathus et al. |
| 6,832,116 B1 | 12/2004 | Tillgren et al. |
| 6,833,936 B1 | 12/2004 | Seymour |
| 6,834,804 B2 | 12/2004 | Rathus et al. |
| 6,836,799 B1 | 12/2004 | Philyaw et al. |
| 6,837,436 B2 | 1/2005 | Swartz et al. |
| 6,845,913 B2 | 1/2005 | Madding et al. |
| 6,850,252 B1 | 2/2005 | Hoffberg |
| 6,854,642 B2 | 2/2005 | Metcalf et al. |
| 6,862,046 B2 | 3/2005 | Ko |
| 6,865,284 B2 | 3/2005 | Mahoney et al. |
| 6,868,193 B1 | 3/2005 | Gharbia et al. |
| 6,877,001 B2 | 4/2005 | Wolf et al. |
| 6,879,957 B1 | 4/2005 | Pechter et al. |
| 6,880,122 B1 | 4/2005 | Lee et al. |
| 6,880,124 B1 | 4/2005 | Moore |
| 6,886,104 B1 | 4/2005 | McClurg et al. |
| 6,889,896 B2 | 5/2005 | Silverbrook et al. |
| 6,892,264 B2 | 5/2005 | Lamb |
| 6,898,592 B2 | 5/2005 | Peltonen et al. |
| 6,904,171 B2 | 6/2005 | Van Zee |
| 6,917,722 B1 | 7/2005 | Bloomfield |
| 6,917,724 B2 | 7/2005 | Seder et al. |
| 6,920,431 B2 | 7/2005 | Showghi et al. |
| 6,922,725 B2 | 7/2005 | Lamming et al. |
| 6,925,182 B1 | 8/2005 | Epstein |
| 6,931,592 B1 | 8/2005 | Ramaley et al. |
| 6,938,024 B1 | 8/2005 | Horvitz |
| 6,947,571 B1 | 9/2005 | Rhoads et al. |
| 6,947,930 B2 | 9/2005 | Anick et al. |
| 6,952,281 B1 | 10/2005 | Irons et al. |
| 6,957,384 B2 | 10/2005 | Jeffery et al. |
| 6,970,915 B1 | 11/2005 | Partovi et al. |
| 6,978,297 B1 | 12/2005 | Piersol |
| 6,985,169 B1 | 1/2006 | Deng et al. |
| 6,985,962 B2 | 1/2006 | Philyaw |
| 6,990,548 B1 | 1/2006 | Kaylor |
| 6,991,158 B2 | 1/2006 | Munte |
| 6,992,655 B2 | 1/2006 | Ericson et al. |
| 6,993,580 B2 | 1/2006 | Isherwood et al. |
| 7,001,681 B2 | 2/2006 | Wood |
| 7,004,390 B2 | 2/2006 | Silverbrook et al. |
| 7,006,881 B1 | 2/2006 | Hoffberg et al. |
| 7,010,616 B2 | 3/2006 | Carlson et al. |
| 7,016,084 B2 | 3/2006 | Tsai |
| 7,016,532 B2 | 3/2006 | Boncyk et al. |
| 7,020,663 B2 | 3/2006 | Hay et al. |
| 7,023,536 B2 | 4/2006 | Zhang et al. |
| 7,038,846 B2 | 5/2006 | Mandella |
| 7,043,489 B1 | 5/2006 | Kelley |
| 7,047,491 B2 | 5/2006 | Schubert et al. |
| 7,051,943 B2 | 5/2006 | Leone et al. |
| 7,057,607 B2 | 6/2006 | Mayoraz et al. |
| 7,058,223 B2 | 6/2006 | Cox |
| 7,062,437 B2 | 6/2006 | Kovales et al. |
| 7,062,706 B2 | 6/2006 | Maxwell et al. |
| 7,066,391 B2 | 6/2006 | Tsikos et al. |
| 7,069,240 B2 | 6/2006 | Spero et al. |
| 7,069,272 B2 | 6/2006 | Snyder |
| 7,069,582 B2 | 6/2006 | Philyaw et al. |
| 7,079,713 B2 | 7/2006 | Simmons |
| 7,085,755 B2 | 8/2006 | Bluhm et al. |
| 7,088,440 B2 | 8/2006 | Buermann et al. |
| 7,089,330 B1 | 8/2006 | Mason |
| 7,093,759 B2 | 8/2006 | Walsh |
| 7,096,218 B2 | 8/2006 | Schirmer et al. |
| 7,103,848 B2 | 9/2006 | Barsness et al. |
| 7,110,100 B2 | 9/2006 | Buermann et al. |
| 7,110,576 B2 | 9/2006 | Norris, Jr. et al. |
| 7,111,787 B2 | 9/2006 | Ehrhart |
| 7,113,270 B2 | 9/2006 | Buermann et al. |
| 7,117,374 B2 | 10/2006 | Hill et al. |
| 7,121,469 B2 | 10/2006 | Dorai et al. |
| 7,124,093 B1 | 10/2006 | Graham et al. |
| 7,130,885 B2 | 10/2006 | Chandra et al. |
| 7,131,061 B2 | 10/2006 | MacLean et al. |
| 7,133,862 B2 | 11/2006 | Hubert et al. |
| 7,136,530 B2 | 11/2006 | Lee et al. |
| 7,136,814 B1 | 11/2006 | McConnell |
| 7,137,077 B2 | 11/2006 | Iwema et al. |
| 7,139,445 B2 | 11/2006 | Pilu et al. |
| 7,151,864 B2 | 12/2006 | Henry et al. |
| 7,161,664 B2 | 1/2007 | Buermann et al. |
| 7,165,268 B1 | 1/2007 | Moore et al. |
| 7,167,586 B2 | 1/2007 | Braun et al. |
| 7,174,054 B2 | 2/2007 | Manber et al. |
| 7,174,332 B2 | 2/2007 | Baxter et al. |
| 7,181,761 B2 | 2/2007 | Davis et al. |
| 7,185,275 B2 | 2/2007 | Roberts et al. |
| 7,188,307 B2 | 3/2007 | Ohsawa |
| 7,190,480 B2 | 3/2007 | Sturgeon et al. |
| 7,197,716 B2 | 3/2007 | Newell et al. |
| 7,203,158 B2 | 4/2007 | Oshima et al. |
| 7,203,384 B2 | 4/2007 | Carl |
| 7,216,121 B2 | 5/2007 | Bachman et al. |
| 7,216,224 B2 | 5/2007 | Lapstun et al. |
| 7,224,480 B2 | 5/2007 | Tanaka et al. |
| 7,224,820 B2 | 5/2007 | Inomata et al. |
| 7,225,979 B2 | 6/2007 | Silverbrook et al. |
| 7,234,645 B2 | 6/2007 | Silverbrook et al. |
| 7,239,747 B2 | 7/2007 | Bresler et al. |
| 7,240,843 B2 | 7/2007 | Paul et al. |
| 7,242,492 B2 | 7/2007 | Currans et al. |
| 7,246,118 B2 | 7/2007 | Chastain et al. |
| 7,257,567 B2 | 8/2007 | Toshima |
| 7,260,534 B2 | 8/2007 | Gandhi et al. |
| 7,262,798 B2 | 8/2007 | Stavely et al. |
| 7,263,521 B2 | 8/2007 | Carpentier et al. |
| 7,268,956 B2 | 9/2007 | Mandella |
| 7,275,049 B2 | 9/2007 | Clausner et al. |
| 7,277,925 B2 | 10/2007 | Warnock |
| 7,283,974 B2 | 10/2007 | Katz et al. |
| 7,283,992 B2 | 10/2007 | Liu et al. |
| 7,284,192 B2 | 10/2007 | Kashi et al. |
| 7,289,806 B2 | 10/2007 | Morris et al. |
| 7,295,101 B2 | 11/2007 | Ward et al. |
| 7,299,186 B2 | 11/2007 | Kuzunuki et al. |
| 7,299,969 B2 | 11/2007 | Paul et al. |
| 7,308,483 B2 | 12/2007 | Philyaw |
| 7,318,106 B2 | 1/2008 | Philyaw |
| 7,327,883 B2 | 2/2008 | Polonowski |
| 7,331,523 B2 | 2/2008 | Meier et al. |
| 7,339,467 B2 | 3/2008 | Lamb |
| 7,349,552 B2 | 3/2008 | Levy et al. |
| 7,353,199 B1 | 4/2008 | DiStefano, III |
| 7,362,902 B1 | 4/2008 | Baker et al. |
| 7,373,345 B2 | 5/2008 | Carpentier et al. |
| 7,376,581 B2 | 5/2008 | DeRose et al. |
| 7,377,421 B2 | 5/2008 | Rhoads |
| 7,383,263 B2 | 6/2008 | Goger |
| 7,385,736 B2 | 6/2008 | Tseng et al. |
| 7,392,287 B2 | 6/2008 | Ratcliff, III |
| 7,392,475 B1 | 6/2008 | Leban et al. |
| 7,404,520 B2 | 7/2008 | Vesuna |
| 7,409,434 B2 | 8/2008 | Lamming et al. |
| 7,412,158 B2 | 8/2008 | Kakkori |
| 7,415,670 B2 | 8/2008 | Hull et al. |
| 7,421,155 B2 | 9/2008 | King et al. |
| 7,424,543 B2 | 9/2008 | Rice, III |
| 7,424,618 B2 | 9/2008 | Roy et al. |
| 7,426,486 B2 | 9/2008 | Treibach-Heck et al. |
| 7,433,068 B2 | 10/2008 | Stevens et al. |
| 7,433,893 B2 | 10/2008 | Lowry |
| 7,437,023 B2 | 10/2008 | King et al. |
| 7,437,351 B2 | 10/2008 | Page |
| 7,437,475 B2 | 10/2008 | Philyaw |
| 7,474,809 B2 | 1/2009 | Carl et al. |
| 7,477,780 B2 | 1/2009 | Boncyk et al. |
| 7,477,783 B2 | 1/2009 | Nakamata |
| 7,477,909 B2 | 1/2009 | Roth |
| 7,487,112 B2 | 2/2009 | Barnes, Jr. |
| 7,493,487 B2 | 2/2009 | Phillips et al. |
| 7,496,638 B2 | 2/2009 | Philyaw |
| 7,505,785 B2 | 3/2009 | Callaghan et al. |

(56) References Cited

U.S. PATENT DOCUMENTS

| | | |
|---|---|---|
| 7,505,956 B2 | 3/2009 | Ibbotson |
| 7,506,250 B2 | 3/2009 | Hull et al. |
| 7,512,254 B2 | 3/2009 | Vollkommer et al. |
| 7,519,397 B2 | 4/2009 | Fournier et al. |
| 7,523,067 B1 | 4/2009 | Nakajima |
| 7,523,126 B2 | 4/2009 | Rivette et al. |
| 7,533,040 B2 | 5/2009 | Perkowski |
| 7,536,547 B2 | 5/2009 | Van Den Tillaart |
| 7,542,966 B2 | 6/2009 | Wolf et al. |
| 7,552,075 B1 | 6/2009 | Walsh |
| 7,552,381 B2 | 6/2009 | Barrus |
| 7,561,312 B1 | 7/2009 | Proudfoot et al. |
| 7,574,407 B2 | 8/2009 | Carro et al. |
| 7,587,412 B2 | 9/2009 | Weyl et al. |
| 7,591,597 B2 | 9/2009 | Pasqualini et al. |
| 7,593,605 B2 | 9/2009 | King et al. |
| 7,596,269 B2 | 9/2009 | King et al. |
| 7,599,580 B2 | 10/2009 | King et al. |
| 7,599,844 B2 | 10/2009 | King et al. |
| 7,599,855 B2 | 10/2009 | Sussman |
| 7,606,741 B2 | 10/2009 | King et al. |
| 7,613,634 B2 | 11/2009 | Siegel et al. |
| 7,616,840 B2 | 11/2009 | Erol et al. |
| 7,634,407 B2 | 12/2009 | Chelba et al. |
| 7,634,468 B2 | 12/2009 | Stephan |
| 7,646,921 B2 | 1/2010 | Vincent et al. |
| 7,647,349 B2 | 1/2010 | Hubert et al. |
| 7,650,035 B2 | 1/2010 | Vincent et al. |
| 7,660,813 B2 | 2/2010 | Milic-Frayling et al. |
| 7,664,734 B2 | 2/2010 | Lawrence et al. |
| 7,672,543 B2 | 3/2010 | Hull et al. |
| 7,672,931 B2 | 3/2010 | Hurst-Hiller et al. |
| 7,680,067 B2 | 3/2010 | Prasad et al. |
| 7,689,712 B2 | 3/2010 | Lee et al. |
| 7,689,832 B2 | 3/2010 | Talmor et al. |
| 7,697,758 B2 | 4/2010 | Vincent et al. |
| 7,698,344 B2 | 4/2010 | Sareen et al. |
| 7,702,624 B2 | 4/2010 | King et al. |
| 7,706,611 B2 | 4/2010 | King et al. |
| 7,707,039 B2 | 4/2010 | King et al. |
| 7,710,598 B2 | 5/2010 | Harrison, Jr. |
| 7,729,515 B2 | 6/2010 | Mandella et al. |
| 7,742,953 B2 | 6/2010 | King et al. |
| 7,761,451 B2 | 7/2010 | Cunningham |
| 7,779,002 B1 | 8/2010 | Gomes et al. |
| 7,783,617 B2 | 8/2010 | Lu et al. |
| 7,788,248 B2 | 8/2010 | Forstall et al. |
| 7,793,326 B2 | 9/2010 | McCoskey et al. |
| 7,796,116 B2 | 9/2010 | Salsman et al. |
| 7,806,322 B2 | 10/2010 | Brundage et al. |
| 7,812,860 B2 | 10/2010 | King et al. |
| 7,818,178 B2 | 10/2010 | Overend et al. |
| 7,818,215 B2 | 10/2010 | King et al. |
| 7,826,641 B2 | 11/2010 | Mandella et al. |
| 7,831,912 B2 | 11/2010 | King et al. |
| 7,844,907 B2 | 11/2010 | Watler et al. |
| 7,870,199 B2 | 1/2011 | Galli et al. |
| 7,872,669 B2 | 1/2011 | Darrell et al. |
| 7,894,670 B2 | 2/2011 | King et al. |
| 7,941,433 B2 | 5/2011 | Benson |
| 7,949,191 B1 | 5/2011 | Ramkumar et al. |
| 7,961,909 B2 | 6/2011 | Mandella et al. |
| 8,082,258 B2 | 12/2011 | Kumar et al. |
| 8,111,927 B2 | 2/2012 | Vincent et al. |
| 8,146,156 B2 | 3/2012 | King et al. |
| 2001/0001854 A1 | 5/2001 | Schena et al. |
| 2001/0003176 A1 | 6/2001 | Schena et al. |
| 2001/0003177 A1 | 6/2001 | Schena et al. |
| 2001/0032252 A1 | 10/2001 | Durst, Jr. et al. |
| 2001/0034237 A1 | 10/2001 | Garahi |
| 2001/0049636 A1 | 12/2001 | Hudda et al. |
| 2001/0053252 A1 | 12/2001 | Creque |
| 2001/0055411 A1 | 12/2001 | Black |
| 2001/0056463 A1 | 12/2001 | Grady et al. |
| 2002/0002504 A1 | 1/2002 | Engel et al. |
| 2002/0012065 A1 | 1/2002 | Watanabe |
| 2002/0013781 A1 | 1/2002 | Peterson |
| 2002/0016750 A1 | 2/2002 | Attia |
| 2002/0022993 A1 | 2/2002 | Miller et al. |
| 2002/0023215 A1 | 2/2002 | Wang et al. |
| 2002/0023957 A1 | 2/2002 | Michaelis et al. |
| 2002/0023959 A1 | 2/2002 | Miller et al. |
| 2002/0029350 A1 | 3/2002 | Cooper et al. |
| 2002/0038456 A1 | 3/2002 | Hansen et al. |
| 2002/0049781 A1 | 4/2002 | Bengtson |
| 2002/0051262 A1 | 5/2002 | Nuttall et al. |
| 2002/0052747 A1 | 5/2002 | Sarukkai |
| 2002/0054059 A1 | 5/2002 | Schneiderman |
| 2002/0055906 A1 | 5/2002 | Katz et al. |
| 2002/0055919 A1 | 5/2002 | Mikheev |
| 2002/0067308 A1 | 6/2002 | Robertson |
| 2002/0073000 A1 | 6/2002 | Sage |
| 2002/0091569 A1 | 7/2002 | Kitaura et al. |
| 2002/0091671 A1 | 7/2002 | Prokoph |
| 2002/0091928 A1 | 7/2002 | Bouchard et al. |
| 2002/0099812 A1 | 7/2002 | Davis et al. |
| 2002/0102966 A1 | 8/2002 | Lev et al. |
| 2002/0111960 A1 | 8/2002 | Irons et al. |
| 2002/0125411 A1 | 9/2002 | Christy |
| 2002/0135815 A1 | 9/2002 | Finn |
| 2002/0138476 A1 | 9/2002 | Suwa et al. |
| 2002/0154817 A1 | 10/2002 | Katsuyama et al. |
| 2002/0169509 A1 | 11/2002 | Huang et al. |
| 2002/0191847 A1 | 12/2002 | Newman et al. |
| 2002/0194143 A1 | 12/2002 | Banerjee et al. |
| 2002/0199198 A1 | 12/2002 | Stonedahl |
| 2003/0001018 A1 | 1/2003 | Hussey et al. |
| 2003/0004724 A1 | 1/2003 | Kahn et al. |
| 2003/0004991 A1 | 1/2003 | Keskar et al. |
| 2003/0009495 A1 | 1/2003 | Adjaoute |
| 2003/0019939 A1 | 1/2003 | Sellen |
| 2003/0039411 A1 | 2/2003 | Nada |
| 2003/0040957 A1 | 2/2003 | Rodriguez et al. |
| 2003/0043042 A1 | 3/2003 | Moores, Jr. et al. |
| 2003/0093384 A1 | 5/2003 | Durst, Jr. et al. |
| 2003/0093400 A1 | 5/2003 | Santosuosso |
| 2003/0093545 A1 | 5/2003 | Liu et al. |
| 2003/0098352 A1 | 5/2003 | Schnee et al. |
| 2003/0144865 A1 | 7/2003 | Lin et al. |
| 2003/0149678 A1 | 8/2003 | Cook |
| 2003/0160975 A1 | 8/2003 | Skurdal et al. |
| 2003/0171910 A1 | 9/2003 | Abir |
| 2003/0173405 A1 | 9/2003 | Wilz, Sr. et al. |
| 2003/0182399 A1 | 9/2003 | Silber |
| 2003/0187751 A1 | 10/2003 | Watson et al. |
| 2003/0187886 A1 | 10/2003 | Hull et al. |
| 2003/0195851 A1 | 10/2003 | Ong |
| 2003/0200152 A1 | 10/2003 | Divekar |
| 2003/0212527 A1 | 11/2003 | Moore et al. |
| 2003/0214528 A1 | 11/2003 | Pierce et al. |
| 2003/0220835 A1 | 11/2003 | Barnes, Jr. |
| 2003/0223637 A1 | 12/2003 | Simske et al. |
| 2003/0225547 A1 | 12/2003 | Paradies |
| 2004/0001217 A1 | 1/2004 | Wu |
| 2004/0006509 A1 | 1/2004 | Mannik et al. |
| 2004/0006740 A1 | 1/2004 | Krohn et al. |
| 2004/0015437 A1 | 1/2004 | Choi et al. |
| 2004/0023200 A1 | 2/2004 | Blume |
| 2004/0028295 A1 | 2/2004 | Allen et al. |
| 2004/0036718 A1 | 2/2004 | Warren et al. |
| 2004/0044576 A1 | 3/2004 | Kurihara et al. |
| 2004/0044627 A1 | 3/2004 | Russell et al. |
| 2004/0044952 A1 | 3/2004 | Jiang et al. |
| 2004/0064453 A1 | 4/2004 | Ruiz et al. |
| 2004/0068483 A1 | 4/2004 | Sakurai et al. |
| 2004/0073874 A1 | 4/2004 | Poibeau et al. |
| 2004/0080795 A1 | 4/2004 | Bean et al. |
| 2004/0098165 A1 | 5/2004 | Butikofer |
| 2004/0128514 A1 | 7/2004 | Rhoads |
| 2004/0139106 A1 | 7/2004 | Bachman et al. |
| 2004/0139107 A1 | 7/2004 | Bachman et al. |
| 2004/0139400 A1 | 7/2004 | Allam et al. |
| 2004/0158492 A1 | 8/2004 | Lopez et al. |
| 2004/0181671 A1 | 9/2004 | Brundage et al. |

(56) References Cited

U.S. PATENT DOCUMENTS

| | | |
|---|---|---|
| 2004/0181688 A1 | 9/2004 | Wittkotter |
| 2004/0186766 A1 | 9/2004 | Fellenstein et al. |
| 2004/0186859 A1 | 9/2004 | Butcher |
| 2004/0189691 A1 | 9/2004 | Jojic et al. |
| 2004/0193488 A1 | 9/2004 | Khoo et al. |
| 2004/0204953 A1 | 10/2004 | Muir et al. |
| 2004/0205041 A1 | 10/2004 | Erol et al. |
| 2004/0205534 A1 | 10/2004 | Koelle |
| 2004/0206809 A1 | 10/2004 | Wood et al. |
| 2004/0229194 A1 | 11/2004 | Yang |
| 2004/0236791 A1 | 11/2004 | Kinjo |
| 2004/0250201 A1 | 12/2004 | Caspi |
| 2004/0254795 A1 | 12/2004 | Fujii et al. |
| 2004/0256454 A1 | 12/2004 | Kocher |
| 2004/0258274 A1 | 12/2004 | Brundage et al. |
| 2004/0260470 A1 | 12/2004 | Rast |
| 2004/0260618 A1 | 12/2004 | Larson |
| 2004/0267734 A1 | 12/2004 | Toshima |
| 2004/0268237 A1 | 12/2004 | Jones et al. |
| 2005/0005168 A1 | 1/2005 | Dick |
| 2005/0022114 A1 | 1/2005 | Shanahan et al. |
| 2005/0033713 A1 | 2/2005 | Bala et al. |
| 2005/0076095 A1 | 4/2005 | Mathew et al. |
| 2005/0091578 A1 | 4/2005 | Madan et al. |
| 2005/0097335 A1 | 5/2005 | Shenoy et al. |
| 2005/0108001 A1 | 5/2005 | Aarskog |
| 2005/0108195 A1 | 5/2005 | Yalovsky et al. |
| 2005/0132281 A1 | 6/2005 | Pan et al. |
| 2005/0136949 A1 | 6/2005 | Barnes, Jr. |
| 2005/0139649 A1 | 6/2005 | Metcalf et al. |
| 2005/0144074 A1 | 6/2005 | Fredregill et al. |
| 2005/0149538 A1 | 7/2005 | Singh et al. |
| 2005/0154760 A1 | 7/2005 | Bhakta et al. |
| 2005/0168437 A1 | 8/2005 | Carl et al. |
| 2005/0205671 A1 | 9/2005 | Gelsomini et al. |
| 2005/0214730 A1 | 9/2005 | Rines |
| 2005/0220359 A1 | 10/2005 | Sun et al. |
| 2005/0222801 A1 | 10/2005 | Wulff et al. |
| 2005/0228683 A1 | 10/2005 | Saylor et al. |
| 2005/0231746 A1 | 10/2005 | Parry et al. |
| 2005/0243386 A1 | 11/2005 | Sheng |
| 2005/0251448 A1 | 11/2005 | Gropper |
| 2005/0262058 A1 | 11/2005 | Chandrasekar et al. |
| 2005/0270358 A1 | 12/2005 | Kuchen et al. |
| 2005/0278314 A1 | 12/2005 | Buchheit |
| 2005/0288954 A1 | 12/2005 | McCarthy et al. |
| 2005/0289054 A1 | 12/2005 | Silverbrook et al. |
| 2006/0011728 A1 | 1/2006 | Frantz et al. |
| 2006/0023945 A1 | 2/2006 | King et al. |
| 2006/0036462 A1 | 2/2006 | King et al. |
| 2006/0041484 A1 | 2/2006 | King et al. |
| 2006/0041538 A1 | 2/2006 | King et al. |
| 2006/0041590 A1 | 2/2006 | King et al. |
| 2006/0041605 A1 | 2/2006 | King et al. |
| 2006/0045374 A1 | 3/2006 | Kim et al. |
| 2006/0048046 A1 | 3/2006 | Joshi et al. |
| 2006/0053097 A1 | 3/2006 | King et al. |
| 2006/0069616 A1 | 3/2006 | Bau |
| 2006/0075327 A1 | 4/2006 | Sriver |
| 2006/0081714 A1 | 4/2006 | King et al. |
| 2006/0085477 A1 | 4/2006 | Phillips et al. |
| 2006/0098900 A1 | 5/2006 | King et al. |
| 2006/0101285 A1 | 5/2006 | Chen et al. |
| 2006/0103893 A1 | 5/2006 | Azimi et al. |
| 2006/0104515 A1 | 5/2006 | King et al. |
| 2006/0119900 A1 | 6/2006 | King et al. |
| 2006/0122983 A1 | 6/2006 | King et al. |
| 2006/0136629 A1 | 6/2006 | King et al. |
| 2006/0138219 A1 | 6/2006 | Brzezniak et al. |
| 2006/0146169 A1 | 7/2006 | Segman |
| 2006/0173859 A1 | 8/2006 | Kim et al. |
| 2006/0195695 A1 | 8/2006 | Keys |
| 2006/0200780 A1 | 9/2006 | Iwema et al. |
| 2006/0224895 A1 | 10/2006 | Mayer |
| 2006/0229940 A1 | 10/2006 | Grossman |
| 2006/0239579 A1 | 10/2006 | Ritter |
| 2006/0256371 A1 | 11/2006 | King et al. |
| 2006/0259783 A1 | 11/2006 | Work et al. |
| 2006/0266839 A1 | 11/2006 | Yavid et al. |
| 2006/0283952 A1 | 12/2006 | Wang |
| 2007/0009245 A1 | 1/2007 | Ito |
| 2007/0050712 A1 | 3/2007 | Hull et al. |
| 2007/0061146 A1 | 3/2007 | Jaramillo et al. |
| 2007/0173266 A1 | 7/2007 | Barnes, Jr. |
| 2007/0194119 A1 | 8/2007 | Vinogradov et al. |
| 2007/0208561 A1 | 9/2007 | Choi et al. |
| 2007/0208732 A1 | 9/2007 | Flowers et al. |
| 2007/0219940 A1 | 9/2007 | Mueller et al. |
| 2007/0228306 A1 | 10/2007 | Gannon et al. |
| 2007/0233806 A1 | 10/2007 | Asadi |
| 2007/0238076 A1 | 10/2007 | Burstein et al. |
| 2007/0249406 A1 | 10/2007 | Andreasson |
| 2007/0279711 A1 | 12/2007 | King et al. |
| 2007/0300142 A1 | 12/2007 | King et al. |
| 2008/0023550 A1 | 1/2008 | Yu et al. |
| 2008/0046417 A1 | 2/2008 | Jeffery et al. |
| 2008/0063276 A1 | 3/2008 | Vincent et al. |
| 2008/0071775 A1 | 3/2008 | Gross |
| 2008/0072134 A1 | 3/2008 | Balakrishnan et al. |
| 2008/0082903 A1 | 4/2008 | McCurdy et al. |
| 2008/0091954 A1 | 4/2008 | Morris et al. |
| 2008/0093460 A1 | 4/2008 | Frantz et al. |
| 2008/0126415 A1 | 5/2008 | Chaudhury et al. |
| 2008/0137971 A1 | 6/2008 | King et al. |
| 2008/0141117 A1 | 6/2008 | King et al. |
| 2008/0170674 A1 | 7/2008 | Ozden et al. |
| 2008/0172365 A1 | 7/2008 | Ozden et al. |
| 2008/0177825 A1 | 7/2008 | Dubinko et al. |
| 2008/0195664 A1 | 8/2008 | Maharajh et al. |
| 2008/0222166 A1 | 9/2008 | Hultgren et al. |
| 2008/0235093 A1 | 9/2008 | Uland |
| 2008/0313172 A1 | 12/2008 | King et al. |
| 2009/0012806 A1 | 1/2009 | Ricordi et al. |
| 2009/0018990 A1 | 1/2009 | Moraleda |
| 2009/0077658 A1 | 3/2009 | King et al. |
| 2009/0247219 A1 | 10/2009 | Lin et al. |
| 2010/0092095 A1 | 4/2010 | King et al. |
| 2010/0121848 A1 | 5/2010 | Yaroslavskiy et al. |
| 2010/0177970 A1 | 7/2010 | King et al. |
| 2010/0182631 A1 | 7/2010 | King et al. |
| 2010/0183246 A1 | 7/2010 | King et al. |
| 2010/0185538 A1 | 7/2010 | King et al. |
| 2010/0185620 A1 | 7/2010 | Schiller |
| 2010/0278453 A1 | 11/2010 | King |
| 2010/0318797 A1 | 12/2010 | King et al. |
| 2011/0019020 A1 | 1/2011 | King et al. |
| 2011/0019919 A1 | 1/2011 | King et al. |
| 2011/0022940 A1 | 1/2011 | King et al. |
| 2011/0025842 A1 | 2/2011 | King et al. |
| 2011/0026838 A1 | 2/2011 | King et al. |
| 2011/0029443 A1 | 2/2011 | King et al. |
| 2011/0029504 A1 | 2/2011 | King et al. |
| 2011/0033080 A1 | 2/2011 | King et al. |
| 2011/0035289 A1 | 2/2011 | King et al. |
| 2011/0035656 A1 | 2/2011 | King et al. |
| 2011/0035662 A1 | 2/2011 | King et al. |
| 2011/0043652 A1 | 2/2011 | King et al. |
| 2011/0044547 A1 | 2/2011 | King et al. |
| 2011/0072012 A1 | 3/2011 | Ah-Pine et al. |
| 2011/0072395 A1 | 3/2011 | King et al. |
| 2011/0075228 A1 | 3/2011 | King et al. |
| 2011/0078585 A1 | 3/2011 | King et al. |
| 2011/0085211 A1 | 4/2011 | King et al. |
| 2011/0096174 A1 | 4/2011 | King et al. |
| 2011/0142371 A1 | 6/2011 | King et al. |
| 2011/0145068 A1 | 6/2011 | King et al. |
| 2011/0145102 A1 | 6/2011 | King et al. |
| 2011/0150335 A1 | 6/2011 | King et al. |
| 2011/0153653 A1 | 6/2011 | King et al. |
| 2011/0154507 A1 | 6/2011 | King et al. |
| 2011/0167075 A1 | 7/2011 | King et al. |
| 2011/0209191 A1 | 8/2011 | Shah |
| 2011/0227915 A1 | 9/2011 | Mandella et al. |
| 2011/0242617 A1 | 10/2011 | King et al. |

(56) References Cited

U.S. PATENT DOCUMENTS

| | | | |
|---|---|---|---|
| 2011/0295842 | A1 | 12/2011 | King et al. |
| 2011/0299125 | A1 | 12/2011 | King et al. |
| 2012/0038549 | A1 | 2/2012 | Mandella et al. |
| 2012/0041941 | A1 | 2/2012 | King et al. |
| 2012/0072274 | A1 | 3/2012 | King et al. |
| 2012/0095844 | A1* | 4/2012 | Barnes, Jr. ............. 705/14.69 |

FOREIGN PATENT DOCUMENTS

| | | |
|---|---|---|
| EP | 0596247 | 5/1994 |
| EP | 0697793 | 2/1996 |
| EP | 0887753 | 12/1998 |
| EP | 1054335 | 11/2000 |
| EP | 1087305 | 3/2001 |
| EP | 1318659 | 6/2003 |
| EP | 1398711 | 3/2004 |
| GB | 2 366 033 | 2/2002 |
| JP | 3260768 | 11/1991 |
| JP | 06-282375 | 10/1994 |
| JP | 06-289983 | 10/1994 |
| JP | 08-087378 | 4/1996 |
| JP | 10-133847 | 5/1998 |
| JP | 10-200804 | 7/1998 |
| JP | 11-212691 | 8/1999 |
| JP | H11-213011 | 8/1999 |
| JP | 2000-123114 | 4/2000 |
| JP | 2000-195735 | 7/2000 |
| JP | 2000-215213 | 8/2000 |
| JP | 2001-345710 | 12/2001 |
| JP | 2003-216631 | 7/2003 |
| JP | 2004-500635 | 1/2004 |
| JP | 2004-050722 | 2/2004 |
| JP | 2004-102707 | 4/2004 |
| JP | 2004-110563 | 4/2004 |
| KR | 10-2000-0054268 | 9/2000 |
| KR | 10-2000-0054339 | 9/2000 |
| KR | 10-2004-0029895 | 4/2004 |
| KR | 10-2007-0051217 | 5/2007 |
| KR | 10-0741368 | 7/2007 |
| KR | 10-0761912 | 9/2007 |
| WO | 94/19766 | 9/1994 |
| WO | 98/03923 | 1/1998 |
| WO | 00/41128 | 7/2000 |
| WO | 00/56055 | 9/2000 |
| WO | 00/67091 | 11/2000 |
| WO | 01/03017 | 1/2001 |
| WO | 01/24051 | 4/2001 |
| WO | 01/33553 | 5/2001 |
| WO | 02/11446 | 2/2002 |
| WO | 02/061730 | 8/2002 |
| WO | 02/091233 | 11/2002 |
| WO | 2004/084109 | 9/2004 |
| WO | 2005/071665 | 8/2005 |
| WO | 2005/096750 | 10/2005 |
| WO | 2005/096755 | 10/2005 |
| WO | 2005/098596 | 10/2005 |
| WO | 2005/098597 | 10/2005 |
| WO | 2005/098598 | 10/2005 |
| WO | 2005/098599 | 10/2005 |
| WO | 2005/098600 | 10/2005 |
| WO | 2005/098601 | 10/2005 |
| WO | 2005/098602 | 10/2005 |
| WO | 2005/098603 | 10/2005 |
| WO | 2005/098604 | 10/2005 |
| WO | 2005/098605 | 10/2005 |
| WO | 2005/098606 | 10/2005 |
| WO | 2005/098607 | 10/2005 |
| WO | 2005/098609 | 10/2005 |
| WO | 2005/098610 | 10/2005 |
| WO | 2005/101192 | 10/2005 |
| WO | 2005/101193 | 10/2005 |
| WO | 2005/106643 | 11/2005 |
| WO | 2005/114380 | 12/2005 |
| WO | 2006/014727 | 2/2006 |
| WO | 2006/023715 | 3/2006 |
| WO | 2006/023717 | 3/2006 |
| WO | 2006/023718 | 3/2006 |
| WO | 2006/023806 | 3/2006 |
| WO | 2006/023937 | 3/2006 |
| WO | 2006/026188 | 3/2006 |
| WO | 2006/029259 | 3/2006 |
| WO | 2006/036853 | 4/2006 |
| WO | 2006/037011 | 4/2006 |
| WO | 2006/093971 | 9/2006 |
| WO | 2006/124496 | 11/2006 |
| WO | 2007/141020 | 12/2007 |
| WO | 2008/002074 | 1/2008 |
| WO | 2008/014255 | 1/2008 |
| WO | 2008/028674 | 3/2008 |
| WO | 2008/031625 | 3/2008 |
| WO | 2008/072874 | 6/2008 |
| WO | 2010/096191 | 8/2010 |
| WO | 2010/096192 | 8/2010 |
| WO | 2010/096193 | 8/2010 |
| WO | 2010/105244 | 9/2010 |
| WO | 2010/105245 | 9/2010 |
| WO | 2010/105246 | 9/2010 |
| WO | 2010/108159 | 9/2010 |

OTHER PUBLICATIONS

AirClic, "With AirClic, there's a product to meet your needs today. And tomorrow.," 2005, pp. 1-3.

Arai et al., "PaperLink: A Technique for Hyperlinking from Real Paper to Electronic Content," Proceedings of the ACM Conference on Human Factors in Computing Systems (CHI 97), Addison-Wesley, pp. 327-334 (Apr. 1997).

Aust, "Augmenting Paper Documents with Digital Information in a Mobile Environment," Master's Thesis, University of Dortmund, Department of Computer Graphics, Sep. 3, 1996, pp. 1-44.

Babylon Ltd., "Babylon—Online Dictionary and Translation Software", (1999-2008), 1 page.

Bagley, et al., Editing Images of Text, Communications of the ACM, 37(12):63-72 (Dec. 1994) downloaded from Dialog Web on the Internet on Jun. 18, 2011 (14 pages).

Bahl, et al., "Font Independent Character Recognition by Cryptanalysis," IBM Technical Disclosure Bulletin, vol. 24, No. 3, pp. 1588-1589 (Aug. 1, 1981).

Bai et al., "An Approach to Extracting the Target Text Line from a Document Image Captured by a Pen Scanner," Proceedings of the Seventh International Conference on Document Analysis and Recognition (ICDAR 2003) Aug. 6, 2003, pp. 76-80.

Bell et al., "Modeling for Text Compression," ACM Computing Surveys, Dec. 1989, vol. 21, Issue 4, pp. 557-591.

Bentley et al., "Fast Algorithms for Sorting and Searching Strings," Proceedings of the 8th ACM-SIAM Symposium on Discrete Algorithms, CM Press, 360-369 (1997).

Black et al., "The Festival Speech Synthesis System, Edition 1.4, for Festival Version 1.4.0", Jun. 17, 1999, pp. 1-4.

Brickman et al., "Word Autocorrelation Redundancy Match (WARM) Technology," IBM J. Res. Develop., Nov. 1982, vol. 26, Issue 6, pp. 681-686.

Brin et al., "The Anatomy of a Large-Scale Hypertextual Web Search Engine," Computer Networks and ISDN Systems, vol. 30, Issue 1-7, Apr. 1, 1998, pp. 1-22.

Burle Technical Memorandum 100. "Fiber Optics: Theory and Applications," 2000, pp. 1-20.

C Technologies AB. "CPEN User's Guide," Jan. 2001, pp. 5-130.

C Technologies AB. "User's Guide for C-Pen 10," Aug. 2001, pp. 4-128.

Capobianco, Robert A., "Design Considerations for: Optical Coupling of Flashlamps and Fiber Optics," 1998-2003, 12 pages, PerkinElmer, Inc.

Casey et al., "An Autonomous Reading Machine," IEEE Transactions on Computers, V. C-17, No. 5, pp. 492-503 (May 1968).

Casio Computer Co. Ltd, "Alliance Agreement on Development and Mass Production of Fingerprint Scanner for Mobile Devices," Feb. 25, 2003, pp. 1-2.

(56) References Cited

OTHER PUBLICATIONS

Cenker, Christian, "Wavelet Packets and Optimization in Pattern Recognition," Proceedings of the 21st International Workshop of the AAPR, Hallstatt, Austria, (May 1997), pp. 49-58.
Clancy, Heather, "Cell Phones Get New Job: Portable Scanning", Feb. 12, 2005, pp. 1-3.
Computer Hope, "Creating a link without an underline in HTML:," Mar. 29, 2001, pp. 1-2.
Curtain, D.P. "Image Sensors—Capturing the Photograph," 2006, pp. 1-19.
Cybertracker Software (PTY) Ltd., "Welcome to CyberTracker," Oct. 3, 2005, pp. 1-2.
Digital Convergence Corp., "CueCat Barcode Scanner," Oct. 3, 2005, pp. 1-2.
International Bureau, International Search Report for PCT/US2007/074214 dated Sep. 9, 2008, pp. 1-3.
International Bureau, International Search Report for PCT/US2010/000497 dated Sep. 27, 2010, pp. 1-5.
International Bureau, International Search Report for PCT/US2010/000498 dated Aug. 2, 2010, pp. 1-2.
International Bureau, International Search Report for PCT/US2010/000499 dated Aug. 31, 2010, pp. 1-3.
International Bureau, International Search Report for PCT/US2010/027254 dated Oct. 22, 2010, pp. 1-6.
Kukich, Karen, "Techniques for Automatically Correcting Words in Text," ACM Computing Surveys, Dec. 1992, vol. 24, Issue 4, pp. 377-439.
Lee, Dar-Shyang, "Substitution Deciphering Based on HMMs with Applications to Compressed Document Processing," IEEE Transactions on Pattern Analysis and Machine Intelligence, Dec. 2002, vol. 24, Issue 12, pp. 1661-1666.
Lee et al., "Detecting duplicates among symbolically compressed images in a large document database," Pattern Recognition Letters, 2001, vol. 22, pp. 545-550.
Lee et al., "Duplicate Detection for Symbolically Compressed Documents," Fifth International Conference on Document Analysis and Recognition (ICDAR), pp. 305-308 (Sep. 20-22, 1999).
Lee et al., "Ultrahigh-resolution plastic graded-index fused image plates," Optics Letters, May 15, 2000, vol. 25, Issue 10, pp. 719-721.
Lee et al., "Voice Response Systems," ACM Computing Surveys, Dec. 1983, vol. 15, Issue 4, pp. 351-374.
Lesher et al., "Effects of Ngram Order and Training Text Size on Word Prediction," Proceedings of the RESNA '99 Annual Conference, 1999, pp. 1-3.
Liddy, Elizabeth, "How a Search Engine Works," Searcher, May 2001, pp. 1-7, vol. 9, No. 5, Information Today, Inc.
Lieberman, Henry, "Out of Many, One: Reliable Results from Unreliable Recognition," ACM Conference on Human Factors in Computing Systems (CHI 2002); 728-729 (Apr. 20-25, 2002).
Liu et al., "Adaptive Post-Processing of OCR Text Via Knowledge Acquisition," Proceedings of the ACM 1991 Conference on Computer Science, New York, NY: ACM Press, 558-569 (1991).
Ljungstrand et al., "WebStickers: Using Physical Tokens to Access, Manage and Share Bookmarks to the Web," Proceedings of Designing Augmented Reality Environments 2000, Elsinore, Denmark, pp. 23-31 (Apr. 12-14, 2000).
LTI Computer Vision Library, "LTI Image Processing Library Developer's Guide," Version 29.10.2003, Aachen, Germany, 2002, pp. 1-40 Aachen, Germany, 45 pp (2002).
Macholl et al., "Translation Pen Lacks Practicality," BYTE.com, Jan. 1998, pp. 1-2.
Manolescu, Dragos-Anton, "Feature Extraction—A Pattern for Information Retrieval," Proceedings of the 5th Pattern Languages of Programming Monticello, Illinois, Aug. 1998, pp. 1-18.
McNamee et al., "Haircut: A System for Multilingual Text Retrieval in Java," Journal of Computing Sciences in Small Colleges, Feb. 2002, vol. 17, Issue 2, pp. 8-22.
Miller et al., "How Children Learn Words," Scientific American, Sep. 1987, vol. 257, Issue 3, pp. 94-99.
Mind Like Water, Inc., "Collection Creator Version 2.0.1 Now Available!," 2004, pp. 1-3.
Muddu, Prashant, "A Study of Image Transmission Through a Fiber-Optic Conduit and its Enhancement Using Digital Image Processing Techniques," M.S. Thesis, Florida State College of Engineering, pp. 1-85 (Nov. 18, 2003).
Munich et al., "Visual Input for Pen-Based Computers," Proceedings of the International Conference on Pattern Recognition (ICPR '96) vol. III, pp. 33-37, IEEE CS Press, (Aug. 25-29, 1996).
Murdoch et al., "Mapping Physical Artifacts to their Web Counterparts: A Case Study with Products Catalogs," MHCI-2004 Workshop on Mobile and Ubiquitous Information Access, Strathclyde, UK, 2004, pp. 1-7.
Nabeshima et al., "MEMO-PEN: A New Input Device," CHI '95 Proceedings Short Papers, ACM Press, pp. 256-257 (May 7-11, 1995).
Nagy et al., "A Prototype Document Image Analysis System for Technical Journals," IEEE Computer, Jul. 1992, vol. 25, No. 7, pp. 10-22.
Nagy et al., "Decoding Substitution Ciphers by Means of Word Matching with Application to OCR," IEEE Transactions on Pattern Analysis and Machine Intelligence, Sep. 1987, vol. 9, No. 5, pp. 710-715.
Nautilus Hyosung, "New Software for Automated Teller Machines," 2002, pp. 1-3.
Neomedia Technologies, "Paperclick for Cellphones", 2004, pp. 1-2, brochure.
Neomedia Technologies, "Paperclick Linking Services", 2004, p. 1, brochure.
Neomedia Technologies, "For Wireless Communication Providers," 2004, p. 1, brochure.
Pellissippi Library, "Skills Guide #4, Setting up your netlibrary Account," Knoxville, TN, Sep. 21, 2001, pp. 1-9.
Neville, Sean "Project Atom, Amazon, Mobile Web Services, and Fireflies at Rest," Artima Weblogs, Oct. 24, 2003, pp. 1-4.
Newman et al. "Camworks: A Video-Based Tool for Efficient Capture from Paper Source Documents," Proceedings of the 1999 IEEE International Conference on Multimedia Computing and Systems, vol. 2, pp. 647-653 (1999).
Newman, William, "Document DNA: Camera Image Processing," Sep. 2003, pp. 1-4.
Newman et al., "A Desk Supporting Computer-based Interaction with Paper Documents," Proceedings of ACM CHI'92 Conference on Human Factors in Computing Systems, 587-592 (May 3-7, 1992).
NSG America Inc.., "SELFOC Lens Arrays for Line Scanning Applications," Intelligent Opto Sensor Designer's Notebook, No. 2, Revision B, 2002, pp. 1-5.
O'Gorman, Lawrence, "Image and Document Processing Techniques for the RightPages Electronic Library System," IEEE, 11th International Conference on Pattern Recognition, Aug. 30-Sep. 3, 1992, The Hague, The Netherlands, vol. II, pp. 260-263.
Onclick Corporation, "VIA Mouse VIA-251,1," 2003, pp. 1-2, brochure.
Pal et al., "Multi-Oriented Text Lines Detection and Their Skew Estimation," Indian Conference on Computer Vision, Graphics, and Image Processing, Ahmedabad, India, Dec. 16-18, 2002, pp. 270-275.
Peacocks MD&B, "Peacocks MD&B, Releases Latest hands and Eyes Free Voice Recognition Barcode Scanner," Oct. 4, 2005, pp. 1-2.
Peterson, James L., "Detecting and Correcting Spelling Errors," Communications of the ACM, Dec. 1980, vol. 23, Issue 12, pp. 676-687.
Planon Systems Solutions Inc., "Docupen 700", Oct. 3, 2005, pp. 1-4.
Podio, Fernando L., "Biometrics—Technologies for Highly Secure Personal Authentication," ITL Bulletin, National Institute of Standards and Technology, May 2001, pp. 1-7.
Abera Technologies Inc., "Abera Introduces Truly Portable & Wireless Color Scanners: Capture Images Anywhere in the World without Connection to PC," PR Newswire, Oct. 9, 2000, pp. 1-3.
Precise Biometrics Inc., "Precise 200 MC," 2005, pp. 1-2.
Price et al., "Linking by Inking: Trailblazing in a Paper-like Hypertext," Proceedings of Hypertext '98, Pittsburgh, PA: ACM Press, pp. 30-39 (1998).

(56) References Cited

OTHER PUBLICATIONS

Psion Teklogix Inc., "Workabout Pro," 2005, pp. 1-2.
Ramesh, R.S. et al., "An Automated Approach to Solve Simple Substitution Ciphers," Cryptologia, Apr. 1993, vol. 17. No. 2, pp. 202-218.
Rao et al., "Protofoil: Storing and Finding the Information Worker's Paper Documents in an Electronic File Cabinet," Proceedings of the ACM SIGCHI Conference on Human Factors in Computing Systems, ACM Press, pp. 180-185, 477 (Apr. 24-28, 1994).
Roberts et al., "1D and 2D laser line scan generation using a fibre optic resonant scanner," EOS/SPIE Symposium on Applied Photonics (ISAP 2000), Glasgow, SPIE Proc., May 21-25, 2000, vol. 4075, pp. 62-73.
Rus et al., "Multi-media RISSC Informatics: Retrieving Information with Simple Structural Components," Proceedings of the Second International Conference on Information and Knowledge Management, New York, NY, pp. 283-294 (1993).
Samet, Hanan, "Data Structures for Quadtree Approximation and Compression," Communications of the ACM, Sep. 1985, vol. 28, Issue 9, pp. 973-993.
Sanderson et al., "The Impact on Retrieval Effectiveness of Skewed Frequency Distributions," ACM Transactions on Information Systems, Oct. 1999, vol. 17, Issue 4, pp. 440-465.
European Patent Office, European Search Report for EP Application No. 05733819 dated Mar. 31, 2009, pp. 1-4.
European Patent Office, European Search Report for EP Application No. 05733851 dated Sep. 2, 2009, pp. 1-5.
European Patent Office, European Search Report for EP Application No. 05733915 dated Dec. 30, 2009, pp. 1-5.
European Patent Office, European Search Report for EP Application No. 05734996 dated Mar. 23, 2009, pp. 1-3.
European Patent Office, European Search Report for EP Application No. 05735008 dated Feb. 16, 2011, pp. 1-6.
European Patent Office, European Search Report for EP Application No. 05737714 dated Mar. 31, 2009, pp. 1-4.
European Patent Office, European Search Report for EP Application No. 05734796 dated Apr. 22, 2009, pp. 1-3.
European Patent Office, European Search Report for EP Application No. 05734947 dated Mar. 20, 2009, pp. 1-3.
European Patent Office, European Search Report for EP Application No. 05742065 dated Mar. 23, 2009, pp. 1-6.
European Patent Office, European Search Report for EP Application No. 05745611 dated Mar. 23, 2009, pp. 1-3.
European Patent Office, European Search Report for EP Application No. 05746428 dated Mar. 24, 2009, pp. 1-3.
European Patent Office, European Search Report for EP Application No. 05746830 dated Mar. 23, 2009, pp. 1-3.
European Patent Office, European Search Report for EP Application No. 05753019 dated Mar. 31, 2009, pp. 1-4.
European Patent Office, European Search Report for EP Application No. 05789280 dated Mar. 23, 2009, pp. 1-3.
European Patent Office, European Search Report for EP Application No. 05812073 dated Mar. 23, 2009, pp. 1-3.
European Patent Office, European Search Report for EP Application No. 07813283 dated Dec. 10, 2010, pp. 1-3.
International Bureau, International Search Report for PCT/EP2007/005038 dated Sep. 17, 2007, pp. 1-3.
International Bureau, International Search Report for PCT/EP2007/007824 dated May 25, 2009, pp. 1-6.
International Bureau, International Search Report for PCT/EP2007/008075 dated Oct. 10, 2008, pp. 1-6.
International Bureau, International Search Report for PCT/US2005/011012 dated Sep. 29, 2006, pp. 1-4.
International Bureau, International Search Report for PCT/US2005/011013 dated Oct. 19, 2007, pp. 1-4.
International Bureau, International Search Report for PCT/US2005/011014 dated May 16, 2007, pp. 1-3.
International Bureau, International Search Report for PCT/US2005/011015 dated Dec. 1, 2006, pp. 1-3.
International Bureau, International Search Report for PCT/US2005/011016 dated May 29, 2007, pp. 1-3.
International Bureau, International Search Report for PCT/US2005/011017 dated Jul. 15, 2008, pp. 1-3.
International Bureau, International Search Report for PCT/US2005/011026 dated Jun. 11, 2007 , pp. 1-3.
International Bureau, International Search Report for PCT/US2005/011042 dated Sep. 10, 2007, pp. 1-4.
International Bureau, International Search Report for PCT/US2005/011043 dated Sep. 20, 2007, pp. 1-3.
International Bureau, International Search Report for PCT/US2005/011084 dated Aug. 8, 2008, pp. 1-3.
International Bureau, International Search Report for PCT/US2005/011085 dated Sep. 14, 2006, pp. 1-3.
International Bureau, International Search Report for PCT/US2005/011088 dated Aug. 29, 2008, pp. 1-3.
International Bureau, International Search Report for PCT/US2005/011089 dated Jul. 8, 2008, pp. 1-4.
International Bureau, International Search Report for PCT/US2005/011090 dated Sep. 27, 2006, pp. 1-4.
International Bureau, International Search Report for PCT/US2005/011533 dated Jun. 4, 2007, pp. 1-3.
International Bureau, International Search Report for PCT/US2005/011534 dated Nov. 9, 2006, pp. 1-3.
International Bureau, International Search Report for PCT/US2005/012510 dated Jan. 6, 2011, pp. 1-4.
International Bureau, International Search Report for PCT/US2005/013297 dated Aug. 14, 2007, pp. 1-3.
International Bureau, International Search Report for PCT/US2005/013586 dated Aug. 7, 2009, pp. 1-5.
International Bureau, International Search Report for PCT/US2005/017333 dated Jun. 4, 2007, pp. 1-3.
International Bureau, International Search Report for PCT/US2005/025732 dated Dec. 5, 2005, p. 1.
International Bureau, International Search Report for PCT/US2005/029534 dated May 15, 2007, pp. 1-4.
International Bureau, International Search Report for PCT/US2005/029536 dated Apr. 19, 2007, pp. 1-3.
International Bureau, International Search Report for PCT/US2005/029537 dated Sep. 28, 2007, pp. 1-3.
International Bureau, International Search Report for PCT/US2005/029539 dated Sep. 29, 2008, pp. 1-4.
International Bureau, International Search Report for PCT/US2005/029680 dated Jul. 13, 2010, pp. 1-3.
International Bureau, International Search Report for PCT/US2005/030007 dated Mar. 11, 2008, pp. 1-6.
International Bureau, International Search Report for PCT/US2005/034319 dated Apr. 17, 2006, pp. 1-3.
International Bureau, International Search Report for PCT/US2005/034734 dated Apr. 4, 2006, pp. 1-3.
International Bureau, International Search Report for PCT/US2006/007108 dated Oct. 30, 2007, pp. 1-3.
International Bureau, International Search Report for PCT/US2006/018198 dated Sep. 25, 2007, pp. 1-4.
Hjaltason et al., "Distance Browsing in Spatial Databases," ACM Transactions on Database Systems, 24 (2):265-318 (Jun. 1999).
Hong et al., "Degraded Text Recognition Using Word Collocation and Visual Inter-Word Constraints," Fourth ACL Conference on Applied Natural Language Processing, Stuttgart, Germany, pp. 186-187 (1994).
Hopkins et al., "A Semi-Imaging Light Pipe for Collecting Weakly Scattered Light," HPL-98-116 Hewlett Packard Company, Jun. 1998, pp. 1-6.
Hu et al., "Comparison and Classification of Documents Based on Layout Similarity," (Information Retrieval, vol. 2, Issues 2-3, May 2000) pp. 227-243.
Hull et al., "Simultaneous Highlighting of Paper and Electronic Documents," Proceedings of the 15th International Conference on Pattern Recognition (ICPR '00), Sep. 3, 2000, vol. 4, IEEE, Barcelona, 401-404 (2000).
Hull et al., "Document Analysis Techniques for the Infinite Memory Multifunction Machine," Proceedings of the 10th International

(56) References Cited

OTHER PUBLICATIONS

Workshop in Database and Expert Systems Applications, Florence, Italy, Sep. 1-3, 1999) pp. 561-565.
Inglis et al., "Compression-Based Template Matching," Data Compression Conference, Mar. 29-31, 1994, Snowbird, UT, pp. 106-115.
IPVALUE Management, Inc., "Technology Licensing Opportunity: Xerox Mobile Camera Document Imaging," Slideshow, Mar. 1, 2004, pp. 1-11.
IRIS, Inc., "IRIS Business Card Reader II," Brochure, 2000, pp. 1-2.
IRIS, Inc., "IRIS Pen Executive," Brochure, 2000, pp. 1-2.
ISRI Staff, "OCR Accuracy Produced by the Current DOE Document Conversion System," Technical report 2002-06, Information Science Research Institute at the University of Nevada, Las Vegas, May 2002, pp. 1-16.
Jacobson et al., "The last book," IBM Systems Journal, 1997, vol. 36, Issue 3, pp. 457-463.
Jainschigg et al., "M-Commerce Alternatives," Communications Convergence.com, May 7, 2001, pp. 1-14.
Janesick, James, "Dueling Detectors," Spie's OE Magazine, 30-33 (Feb. 2002).
Jenny, Reinhard, "Fundamentals of Fiber Optics An Introduction for Beginners," Volpi Manufacturing USA Co., Inc. Auburn, NY, Apr. 26, 2000, pp. 1-22.
Jones, R., "Physics and the Visual Arts Notes on Lesson 4", University of South Carolina, Sep. 12, 2004, pp. 1-4.
Kahan et al., "Annotea: An Open RDF Infrastructure for Shared Web Annotations," Proceedings of the 10th International World Wide Web Conference, Hong Kong, pp. 623-632 (May 1-5, 2001).
Kasabach et al., "Digital Ink: A Familiar Idea with Technological Might!" CHI 1998 Conference, New York, NY: ACM Press, 175-176 (1997).
Keytronic, "F-SCAN-S001US Stand Alone Fingerprint Scanner," Oct. 4, 2005, pp. 1-2.
Khoubyari, Siamak, "The Application of Word Image Matching in Text Recognition," MS Thesis, State University of New York at Buffalo, pp. 2-101 (Jun. 1992).
Kia, Omid E., "Document Image Compression and Analysis," PhD Thesis, University of Maryland at College Park, pp. 1-64 (1997).
Kia et al., "Integrated Segmentation and Clustering for Enhanced Compression of Document Images," International Conference on Document Analysis and Recognition, Ulm, Germany, Aug. 18-20, 1997, vol. 1, pp. 406-411.
Kia et al., "Symbolic Compression and Processing of Document Images," Technical Report: LAMP-TR-004/CFAR-TR-849/CS-TR-3734., University of Maryland, College Park, Jan. 1997, 36 pp.
Kopec, Gary E., "Multilevel Character Templates for Document Image Decoding," IS&T/SPIE Proceedings, Apr. 3, 1997, vol. 3027, pp. 168-177.
Kopec et al., "N-Gram Language Models for Document Image Decoding," IS&T/SPIE Proceedings, Dec. 18, 2001, vol. 4670, 191-202.
U.S. Patent Office, Final Office Action for U.S. Appl. No. 11/097,089 dated Sep. 23, 2010, pp. 1-15.
U.S. Patent Office, Non-Final Office Action for U.S. Appl. No. 11/097,089 dated Apr. 7, 2011, pp. 1-15.
U.S. Patent Office, Non-Final Office Action for U.S. Appl. No. 11/097,093 dated Jul. 10, 2007, pp. 1-10.
U.S. Patent Office, Non-Final Office Action for U.S. Appl. No. 11/097,103 dated Jun. 25, 2007, pp. 1-13.
U.S. Patent Office, Non-Final Office Action for U.S. Appl. No. 11/097,103 dated Jan. 28, 2008, pp. 1-13.
U.S. Patent Office, Non-Final Office Action for U.S. Appl. No. 11/097,103 dated Dec. 31, 2008, p. 1-4.
U.S. Patent Office, Notice of Allowance for U.S. Appl. No. 11/097,103 dated May 14, 2009, pp. 1-5.
U.S. Patent Office, Non-Final Office Action for U.S. Appl. No. 11/097,828 dated May 22, 2008, pp. 1-9.
U.S. Patent Office, Final Office Action for U.S. Appl. No. 11/097,828 dated Feb. 4, 2009, pp. 1-8.
U.S. Patent Office, Notice of Allowance for U.S. Appl. No. 11/097,828 dated Feb. 5, 2010, pp. 1-9.
U.S. Patent Office, Non-Final Office Action for U.S. Appl. No. 11/097,833 dated Jun. 25, 2008, pp. 1-16.
U.S. Patent Office, Final Office Action for U.S. Appl. No. 11/097,833 dated Jul. 7, 2009, pp. 1-9.
U.S. Patent Office, Notice of Allowance for U.S. Appl. No. 11/097,833 dated Jan. 10, 2011, pp. 1-8.
U.S. Patent Office, Non-Final Office Action for U.S. Appl. No. 11/097,835 dated Oct. 9, 2007, pp. 1-22.
U.S. Patent Office, Final Office Action for U.S. Appl. No. 11/097,835 dated Jun. 23, 2008, pp. 1-25.
U.S. Patent Office, Non-Final Office Action for U.S. Appl. No. 11/097,835 dated Feb. 19, 2009, pp. 1-11.
U.S. Patent Office, Final Office Action for U.S. Appl. No. 11/097,835 dated Dec. 29, 2009, pp. 1-12.
U.S. Patent Office, Notice of Allowance for U.S. Appl. No. 11/097,835 dated Sep. 1, 2010, pp. 1-13.
U.S. Patent Office, Non-Final Office Action for U.S. Appl. No. 11/097,836 dated May 13, 2008, pp. 1-13.
U.S. Patent Office, Final Office Action for U.S. Appl. No. 11/097,836 dated Jan. 6, 2009, pp. 1-27.
U.S. Patent Office, Non-Final Office Action for U.S. Appl. No. 11/097,836 dated Jul. 30, 2009, pp. 1-32.
U.S. Patent Office, Final Office Action for U.S. Appl. No. 11/097,836 dated May 13, 2010, pp. 1-13.
U.S. Patent Office, Non-Final Office Action for U.S. Appl. No. 11/097,961 dated Sep. 15, 2008, pp. 1-10.
U.S. Patent Office, Non-Final Office Action for U.S. Appl. No. 11/097,961 dated Mar. 5, 2009, pp. 1-10.
U.S. Patent Office, Final Office Action for U.S. Appl. No. 11/097,961 dated Dec. 9, 2009, pp. 1-11.
U.S. Patent Office, Non-Final Office Action for U.S. Appl. No. 11/097,961 dated Jul. 9, 2010, pp. 1-13.
U.S. Patent Office, Non-Final Office Action for U.S. Appl. No. 11/097,981 dated Jan. 16, 2009, pp. 1-13.
U.S. Patent Office, Notice of Allowance for U.S. Appl. No. 11/097,981 dated Jul. 31, 2009, pp. 1-11.
U.S. Patent Office, Non-Final Office Action for U.S. Appl. No. 11/098,014, dated Jun. 18, 2008, pp. 1-8.
U.S. Patent Office, Final Office Action for U.S. Appl. No. 11/098,014 dated Jan. 23, 2009, pp. 1-8.
U.S. Patent Office, Non-Final Office Action for U.S. Appl. No. 11/098,014 dated Jun. 30, 2009, pp. 1-10.
U.S. Patent Office, Final Office Action for U.S. Appl. No. 11/098,014 dated Mar. 26, 2010, pp. 1-12.
U.S. Patent Office, Non-Final Office Action for U.S. Appl. No. 11/098,014 dated Nov. 3, 2010, pp. 1-8.
U.S. Patent Office, Notice of Allowance for U.S. Appl. No. 11/098,014 dated Mar. 16, 2011, pp. 1-9.
U.S. Patent Office, Non-Final Office Action for U.S. Appl. No. 11/098,016 dated Apr. 24, 2007, pp. 1-22.
U.S. Patent Office, Notice of Allowance for U.S. Appl. No. 11/098,016 dated Apr. 22, 2008, pp. 1-5.
U.S. Patent Office, Non-Final Office Action for U.S. Appl. No. 11/098,038 dated Aug. 28, 2006, pp. 1-9.
U.S. Patent Office, Final Office Action for U.S. Appl. No. 11/098,038 dated Jun. 7, 2007, pp. 1-10.
U.S. Patent Office, Non-Final Office Action for U.S. Appl. No. 11/098,038 dated Apr. 3, 2008, pp. 1-7.
U.S. Patent Office, Notice of Allowance for U.S. Appl. No. 11/098,038 dated Mar. 11, 2009, pp. 1-6.
U.S. Patent Office, Notice of Allowance for U.S. Appl. No. 11/098,038 dated May 29, 2009, pp. 1-6.
U.S. Patent Office, Non-Final Office Action for U.S. Appl. No. 11/098,042 dated Dec. 5, 2008, pp. 1-10.
U.S. Patent Office, Notice of Allowance for U.S. Appl. No. 11/098,042 dated Apr. 13, 2009, pp. 1-8.
U.S. Patent Office, Non-Final Office Action for U.S. Appl. No. 11/098,043 dated Jul. 23, 2007, pp. 1-31.
U.S. Patent Office, Final Office Action for U.S. Appl. No. 11/098,043 dated Apr. 17, 2008, pp. 1-36.

(56) References Cited

OTHER PUBLICATIONS

U.S. Patent Office, Non-Final Office Action for U.S. Appl. No. 11/098,043 dated Dec. 23, 2008, pp. 1-35.
U.S. Patent Office, Final Office Action for U.S. Appl. No. 11/098,043 dated Jul. 21, 2009, pp. 1-45.
U.S. Patent Office, Non-Final Office Action for U.S. Appl. No. 11/110,353 dated Jul. 27, 2007, pp. 1-9.
U.S. Patent Office, Non-Final Office Action for U.S. Appl. No. 11/110,353 dated Jun. 11, 2008, pp. 1-17.
U.S. Patent Office, Final Office Action for U.S. Appl. No. 11/110,353 dated Jan. 6, 2009, pp. 1-9.
Sarre et al. "HyperTex—a system for the automatic generation of Hypertext Textbooks from Linear Texts," Database and Expert Systems Applications, Proceedings of the International Conference, Abstract, 1990, p. 1.
Schilit et al., "Beyond Paper: Supporting Active Reading with Free Form Digital Ink Annotations," Proceedings of CHI 98, ACM Press, 1998, pp. 249-256.
Schott North America, Inc., "Clad Rod/ Image Conduit," Version 10/01, Nov. 2004 p. 1.
Schuuring, Daniel, "Best practices in e-discovery and e-disclosure White Paper," ZyLAB Information Access Solutions, Feb. 17, 2006, pp. 5-72.
Selberg et al., "On the Instability of Web Search Engines," In the Proceedings of Recherche d'Information Assistee par Ordinateur (RIAO), Paris, pp. 223-235 (Apr. 2000).
Sheridon et al., "The Gyricon—A Twisting Ball Display," Proceedings of the Society for Information Display, vol. 18/3 & 4, Third and Fourth Quarter, pp. 289-293 (May 1977).
Smithwick et al., "54.3: Modeling and Control of the Resonant Fiber Scanner for Laser Scanning Display or Acquisition," SID Symposium Digest of Technical Papers, 34, 1455-1457 (May 2003).
Solutions Software Corp., "Environmental Code of Federal Regulations (CFRs) including TSCA and SARA," Solutions Software Corp., Enterprise, FL Abstract, Apr. 1994, pp. 1-2.
Sonka et al, Image Processing, Analysis, and Machine Vision: (Second Edition), Contents, Preface and Index, 1998, pp. v-xxiv and 755-770, International Thomson Publishing.
Sony Electronics Inc., "Sony Puppy Fingerprint Identity Products," 2002, pp. 1.
Spitz, A. Lawrence, "Progress in Document Reconstruction," 16th International Conference on Pattern Recognition (ICPR '02) pp. 464-467 (2002).
Spitz, A. Lawrence, "Shape-based Word Recognition," International Journal on Document Analysis and Recognition, pp. 178-190 (Oct. 20, 1998).
Srihari et al., "Integrating Diverse Knowledge Sources in Text Recognition," ACM Transactions in Office Information Systems, Jan. 1983, vol. 1, Issue 1, pp. 66-87.
Stevens et al., "Automatic Processing of Document Annotations," British Machine Vision Conference 1998, 1998, pp. 438-448.
Stifelman, Lisa J., "Augmenting Real-World Objects: A Paper-Based Audio Notebook," Proceedings of CHI '96, 199-200 (1996).
Story et al., "The RightPages Image-Based Electronic Library for Alerting and Browsing," IEEE, Computer, pp. 17-26 (Sep. 1992).
Su et al., "Optical Scanners Realized by Surface-Micromachined Vertical Torsion Mirror," IEEE Photonics Technology Letters, May 1999, vol. 11, Issue 5, pp. 587-589.
Syscan Imaging, "Travelscan 464," Oct. 3, 2005, pp. 1-2.
Taghva et al., "Results of Applying Probabilistic IR to OCR Text," Proceedings of the 17th Annual International ACM-SIGIR Conference on Research and Development in Information Retrieval, pp. 202-211 (1994).
Tan et al., "Text Retrieval from Document Images Based on N-Gram Algorithm," PRICAI Workshop on Text and Web Mining, pp. 1-20 (2000).
Trusted Reviews, "Digital Pen Roundup," Jan. 24, 2004, pp. 1-5.
TYI Systems Ltd., "Bellus iPen," 2005, pp. 1-3, accessed Oct. 3, 2005.
U.S. Precision Lens, "The Handbook of Plastic Optics", pp. 1-145, 1983, 2nd Edition.
Van Eijkelenborg, Martijn A., "Imaging with Microstructured Polymer Fibre," Optics Express, Jan. 26, 2004, vol. 12, Issue 2, pp. 342-346.
Vervoort, Marco, "Emile 4.1.6 User Guide," University of Amsterdam, Jun. 12, 2003, pp. 5-81.
Vocollect, "Vocollect Voice for Handhelds," 2005, pp. 1-2, accessed Oct. 3, 2005.
Vossler et al., "The Use of Context for Correcting Garbled English Text," Cornell Aeronautical Laboratory, Proceedings of the 1964 19th ACM National Conference, ACM Press, pp. D2.4-1 to D2.4-13 (1964).
Wang et al., "Segmentation of Merged Characters by Neural Network and Shortest-Path," Proceedings of the 1993 ACM/SIGAPP Symposium on Applied Computing: States of the Art and Practice, ACM Press, 762-769 (1993).
Wang et al., "Micromachined Optical Waveguide Cantilever as a Resonant Optical Scanner," Sensors and Actuators A (Physical), 2002, vol. 102, Issues 1-2:165-175.
Wang et al., "A Study on the Document Zone Content Classification Problem," Proceedings of the 5th International Workshop on Document Analysis Systems, Long, pp. 212-223 (2002).
Whittaker et al., "Filochat: Handwritten Notes Provide Access to Recorded Conversations," Human Factors in Computing Systems, CHI '94 Conference Proceedings, pp. 271-277, Apr. 24-28, 1994.
Whittaker, Steve, "Using Cognitive Artifacts in the Design of Multimodal Interfaces," AT&T Labs-Research, May 24, 2004, pp. 1-63.
Wilcox et al., "Dynomite: A Dynamically Organized Ink and Audio Notebook," Conference on Human Factors in Computing Systems, 1997, pp. 186-193.
Wizcom Technologies, "QuickLink-Pen Elite," 2004, pp. 1-2.
Wizcom Techonologies, "SuperPen Professional Product Page," 2004, pp. 1-2.
Wood et al., "Implementing a faster string search algorithm in Ada," ACM SIGADA Ada Letters, May 1, 1988, vol. 8, No. 3, pp. 87-97.
Centre for Speech Technology Research, "The Festival Speech Synthesis System," Jul. 25, 2000, pp. 1-2.
Ficstar Software Inc., "Welcome to Ficstar Software," 2005, pp. 1.
Lingolex, "Automatic Computer Translation" Aug. 6, 2000, pp. 1-2.
Xerox, "Patented Technology Could Turn Camera Phone Into Portable Scanner," Nov. 15, 2004, pp. 1-2, Press Release.
U.S. Patent Office, Non-Final Office Action for U.S. Appl. No. 11/004,637 dated Dec. 21, 2007, pp. 1-13.
U.S. Patent Office, Final Office Action for U.S. Appl. No. 11/004,637 dated Oct. 2, 2008, pp. 1-8.
U.S. Patent Office, Non-Final Office Action for U.S. Appl. No. 11/004,637 dated Apr. 2, 2009, pp. 1-14.
U.S. Patent Office, Notice of Allowance for U.S. Appl. No. 11/004,637 dated Dec. 11, 2009, pp. 1-4.
U.S. Patent Office, Non-Final Office Action for U.S. Appl. No. 11/096,704 dated Sep. 10, 2008, pp. 1-15.
U.S. Patent Office, Notice of Allowance for U.S. Appl. No. 11/096,704 dated Mar. 11, 2009, pp. 1-5.
U.S. Patent Office, Notice of Allowance for U.S. Appl. No. 11/096,704 dated Jun. 5, 2009, pp. 1-4.
U.S. Patent Office, Non-Final Office Action for U.S. Appl. No. 11/097,089 dated Aug. 13, 2008, pp. 1-12.
U.S. Patent Office, Final Office Action for U.S. Appl. No. 11/097,089 dated Mar. 17, 2009, pp. 1-14.
U.S. Patent Office, Non-Final Office Action for U.S. Appl. No. 11/097,089 dated Dec. 23, 2009, pp. 1-17.
Docuport Inc., "DocuPen Operating Manual." 2004, pp. 1-48, Montreal, Quebec.
Doermann et al., "The Detection of Duplicates in Document Image Databases," Technical Report. LAMP-TR-005/CAR-TR-850/CS-TR-3739, University of Maryland College Park, Feb. 1997, pp. 1-37.
Doermann et al., "The Development of a General Framework for Intelligent Document Image Retrieval," Series in Machine Perception and Artificial Intelligence, vol. 29: Document Analysis Systems II., 1997, pp. 1-28, Washington DC: World Scientific Press.

(56) References Cited

OTHER PUBLICATIONS

Doermann, David, "The Indexing and Retrieval of Document Images: A Survey," Technical Report. LAMP-TR-0013/CAR-TR-878/CS-TR-3876. University of Maryland College Park (Feb. 1998).
Duong et al., "Extraction of Text Areas in Printed Document Images," Proceedings of the 2001 ACM Symposium on Document Engineering, New York, NY: ACM Press, pp. 157-164.
ebooks, eBooks Quickstart Guide, nl-487, 2001, pp. 1-2.
Erol et al., "Linking Multimedia Presentations with their Symbolic Source Documents: Algorithm and Applications," Proceedings of the Eleventh ACM International Conference on Multimedia, Nov. 2-8, 2003, Berkeley, CA, pp. 498-507.
Fall et al., "Automated Categorization in the International Patent Classification," ACM SIGIR Forum, Spring 2003, vol. 37, Issue 1, pp. 10-25.
Fehrenbacher, Katie, "Quick Frucall Could Save You Pennies (or $$$)", GigaOM, Jul. 10, 2006, pp. 1-2.
Feldman, Susan, "The Answer Machine," Searcher: The Magazine for Database Professionals, Jan. 2000, vol. 8, Issue 1, p. 58.
Fitzgibbon et al., "'Memories for life' Managing information over a human lifetime," UK Computing Research Committee's Grand Challenges in Computing Workshop, May 22, 2003, pp. 1-8.
Garain et al., "Compression of Scan-Digitized Indian Language Printed Text: A Soft Pattern Matching Technique," Proceedings of the 2003 ACM Symposium on Document Engineering, Nov. 20-22, 2003, pp. 185-192.
Ghaly et al., "Sams Teach Yourself EJB in 21 Days," Sams Publishing, pp. 1-2, 123 and 125 (2002-2003).
Ghani et al., "Mining the Web to Create Minority Language Corpora," Proceedings of the 10th International Conference on Information and Knowledge Management (CIKM) Nov. 5-10, 2001, pp. 279-286.
Globalink, Inc. "Globalink, Inc. announces Talk to Me, an interactive language learning software program," The Free Library by Farlex, Jan. 21, 1997, pp. 1-4.
Google Inc. "Google Search Appliance—Intranets," 2004, pp. 1-2.
Google Inc. "Simplicity and Enterprise Search." 2003, pp. 1-8.
Graham et al., "The Video Paper Multimedia Playback System," Proceedings of the Eleventh ACM International Conference on Multimedia Nov. 2-8, 2003, Berkeley, CA, USA, pp. 94-95.
Grossman et al., "Token Identification" Slideshow, 2002, pp. 1-15.
Guimbretiere, Francois, "Paper Augmented Digital Documents," Proceedings of 16th Annual ACM Symposium on User Interface Software and Technology, New York, NY: ACM Press, pp. 51-60 (2003).
Hand Held Products, "The HHP Imageteam (IT) 4410 and 4410ESD" Brochure, 2 pp.
Hansen, Jesse "A Matlab Project in Optical Character Recognition (OCR)," DSP Lab, University of Rhode Island, 6 pp (May 15, 2002).
Heiner et al., "Linking and Messaging from Real Paper in the Paper PDA," ACM Symposium on User Interface Software and Technology, New York, NY: ACM Press, pp. 179-186 (1999).
Henseler, Dr. Hans, "ZyIMAGE Security Whitepaper Functional and Document Level Security in ZyIMAGE," Zylab Technologies B.V., Apr. 9, 2004, pp. 1-27.
Hewlett-Packard Company, "HP Capshare 920 Portable E-Copier and Information Appliance User Guide, First Edition," 42 pp. (1999).
International Bureau, International Search Report for PCT/US2010/027255 dated Nov. 16, 2010, pp. 1-5.
International Bureau, International Search Report for PCT/US2010/027256 dated Nov. 15, 2010, pp. 1-4.
International Bureau, International Search Report for PCT/US2010/028066 dated Oct. 26, 2010, pp. 1-4.
U.S. Patent Office, Non-Final Office Action for U.S. Appl. No. 11/110,353 dated Sep. 15, 2009, pp. 1-15.
U.S. Patent Office, Notice of Allowance for U.S. Appl. No. 11/110,353 dated Dec. 2, 2009, pp. 1-6.
U.S. Patent Office, Non-Final Office Action for U.S. Appl. No. 11/131,945 dated Jan. 8, 2009, pp. 1-12.
U.S. Patent Office, Notice of Allowance for U.S. Appl. No. 11/131,945 dated Oct. 30, 2009, pp. 1-4.
U.S. Patent Office, Non-Final Office Action for U.S. Appl. No. 11/185,908 dated Dec. 14, 2009 (as revised Feb. 5, 2010), pp. 1-8.
U.S. Patent Office, Final Office Action for U.S. Appl. No. 11/185,908 dated Jun. 28, 2010, pp. 1-20.
U.S. Patent Office, Non-Final Office Action for U.S. Appl. No. 11/208,408 dated Oct. 7, 2008, pp. 1-25.
U.S. Patent Office, Final Office Action for U.S. Appl. No. 11/208,408 dated May 11, 2009, pp. 1-23.
U.S. Patent Office, Non-Final Office Action for U.S. Appl. No. 11/208,408 dated Apr. 23, 2010, pp. 1-10.
U.S. Patent Office, Non-Final Office Action for U.S. Appl. No. 11/208,457 dated Oct. 9, 2007, pp. 1-18.
U.S. Patent Office, Non-Final Office Action for U.S. Appl. No. 11/208,458 dated Mar. 21, 2007, pp. 1-12.
U.S. Patent Office, Notice of Allowance for U.S. Appl. No. 11/208,458 dated Jun. 2, 2008, pp. 1-6.
U.S. Patent Office, Non-Final Office Action for U.S. Appl. No. 11/208,461 dated Sep. 29, 2009, pp. 1-11.
U.S. Patent Office, Non-Final Office Action for U.S. Appl. No. 11/208,461 dated Nov. 3, 2010, pp. 1-7.
U.S. Patent Office, Notice of Allowance for U.S. Appl. No. 11/208,461 dated Mar. 15, 2011, pp. 1-10.
U.S. Patent Office, Non-Final Office Action for U.S. Appl. No. 11/209,333 dated Apr. 29, 2010, pp. 1-12.
U.S. Patent Office, Notice of Allowance for U.S. Appl. No. 11/210,260 dated Jan. 13, 2010, pp. 1-8.
U.S. Patent Office, Non-Final Office Action for U.S. Appl. No. 11/236,330 dated Dec. 2, 2009, pp. 1-7.
U.S. Patent Office, Notice of Allowance for U.S. Appl. No. 11/236,330 dated Jun. 22, 2010, pp. 1-4.
U.S. Patent Office, Non-Final Office Action for U.S. Appl. No. 11/236,440 dated Jan. 22, 2009, pp. 1-16.
U.S. Patent Office, Final Office Action for U.S. Appl. No. 11/236,440 dated Jul. 22, 2009, pp. 1-26.
U.S. Patent Office, Non-Final Office Action for U.S. Appl. No. 11/365,983 dated Jan. 26, 2010, pp. 1-36.
U.S. Patent Office, Final Office Action for U.S. Appl. No. 11/365,983 dated Sep. 14, 2010, pp. 1-34.
U.S. Patent Office, Non-Final Office Action for U.S. Appl. No. 11/547,835 dated Dec. 29, 2010, pp. 1-16.
U.S. Patent Office, Non-Final Office Action for U.S. Appl. No. 11/672,014 dated May 6, 2010, pp. 1-7.
U.S. Patent Office, Notice of Allowance for U.S. Appl. No. 11/672,014 dated Feb. 28, 2011, pp. 1-7.
U.S. Patent Office, Non-Final Office Action for U.S. Appl. No. 11/758,866 dated Jun. 14, 2010, pp. 1-39.
U.S. Patent Office, Non-Final Office Action for U.S. Appl. No. 11/972,562 dated Apr. 21, 2010, pp. 1-11.
U.S. Patent Office, Non-Final Office Action for U.S. Appl. No. 12/538,731 dated Jun. 28, 2010, pp. 1-6.
U.S. Patent Office, Notice of Allowance for U.S. Appl. No. 12/538,731 dated Oct. 18, 2010, pp. 1-5.
U.S. Patent Office, Non-Final Office Action for U.S. Appl. No. 12/541,891 dated Dec. 9, 2010, pp. 1-7.
U.S. Patent Office, Non-Final Office Action for U.S. Appl. No. 12/542,816 dated Jun. 18, 2010, pp. 1-12.
U.S. Patent Office, Notice of Allowance for U.S. Appl. No. 12/542,816 dated Jan. 3, 2011, pp. 1-7.
U.S. Patent Office, Notice of Allowance for U.S. Appl. No. 12/542,816 dated Apr. 27, 2011, pp. 1-5.
U.S. Patent Office, Non-Final Office Action for U.S. Appl. No. 12/721,456 dated Mar. 1, 2011, pp. 1-9.
U.S. Patent Office, Non-Final Office Action for U.S. Appl. No. 12/887,473 dated Feb. 4, 2011, pp. 1-12.
U.S. Patent Office, Non-Final Office Action for U.S. Appl. No. 12/889,321 dated Mar. 31, 2011, pp. 1-23.
U.S. Patent Office, Non-Final Office Action for U.S. Appl. No. 12/904,064 dated Mar. 30, 2011, pp. 1-12.
King et al., U.S. Appl. No. 11/432,731, filed May 11, 2006, pp. 1-116.
King et al., U.S. Appl. No. 11/933,204, filed Oct. 31, 2007, pp. 1-98.
King et al., U.S. Appl. No. 11/952,885, filed Dec. 7, 2007, pp. 1-108.

(56) References Cited

OTHER PUBLICATIONS

King et al., U.S. Appl. No. 12/517,352, filed Jun. 2, 2009, pp. 1-39.
King et al., U.S. Appl. No. 12/517,541, filed Jun. 3, 2009, pp. 1-116.
King et al., U.S. Appl. No. 13/253,632, filed Oct. 5, 2011, pp. 1-101.
King et al., U.S. Appl. No. 13/614,473, filed Sep. 13, 2012, pp. 1-120.
King et al., U.S. Appl. No. 13/614,770, filed Sep. 13, 2012, pp. 1-102.
European Patent Office, European Search Report for EP Application No. 05731509 dated Apr. 23, 2009, pp. 1-7.
European Patent Office, European Search Report for EP Application No. 05732913 dated Mar. 31, 2009, pp. 1-4.
European Patent Office, European Search Report for EP Application No. 05733191 dated Apr. 23, 2009, pp. 1-5.

* cited by examiner

PROCESSING TECHNIQUES FOR TEXT CAPTURE FROM A RENDERED DOCUMENT

CROSS-REFERENCE TO RELATED APPLICATIONS

This application is a continuation of U.S. patent application Ser. No. 12/696,599, entitled "Processing Techniques for Text Capture from a Rendered Document", filed Jan. 29, 2010, which is a continuation of U.S. patent application Ser. No. 11/131,945, entitled "Processing Techniques for Text Capture from a Rendered Document", filed May 17, 2005, which is a Continuation-In-Part of the following, each of which is hereby incorporated by reference in its entirety: U.S. patent application Ser. No. 11/004,637 filed on Dec. 3, 2004, and the following U.S. Patent Applications. each filed Apr. 1, 2005: U.S. patent application Ser. No. 11/097,961, entitled METHODS AND SYSTEMS FOR INITIATING APPLICATION PROCESSES BY DATA CAPTURE FROM RENDERED DOCUMENTS, U.S. patent application Ser. No. 11/097,093, entitled DETERMINING ACTIONS INVOLVING CAPTURED INFORMATION AND ELECTRONIC CONTENT ASSOCIATED WITH RENDERED DOCUMENTS, U.S. patent application Ser. No. 11/098,038, entitled CONTENT ACCESS WITH HANDHELD DOCUMENT DATA CAPTURE DEVICES, U.S. patent application Ser. No. 11/098,014, entitled SEARCH ENGINES AND SYSTEMS WITH HANDHELD DOCUMENT DATA CAPTURE DEVICES, U.S. patent application Ser. No. 11/097,103, entitled TRIGGERING ACTIONS IN RESPONSE TO OPTICALLY OR ACOUSTICALLY CAPTURING KEYWORDS FROM A RENDERED DOCUMENT, U.S. patent application Ser. No. 11/098,043, entitled SEARCHING AND ACCESSING DOCUMENTS ON PRIVATE NETWORKS FOR USE WITH CAPTURES FROM RENDERED DOCUMENTS, U.S. patent application Ser. No. 11/097,981, entitled INFORMATION GATHERING SYSTEM AND METHOD, U.S. patent application Ser. No. 11/097,089, entitled DOCUMENT ENHANCEMENT SYSTEM AND METHOD, U.S. patent application Ser. No. 11/097,835, entitled PUBLISHING TECHNIQUES FOR ADDING VALUE TO A RENDERED DOCUMENT, U.S. patent application Ser. No. 11/098,016, entitled ARCHIVE OF TEXT CAPTURES FROM RENDERED DOCUMENTS, U.S. patent application Ser. No. 11/097,828, entitled ADDING INFORMATION OR FUNCTIONALITY TO A RENDERED DOCUMENT VIA ASSOCIATION WITH AN ELECTRONIC COUNTERPART, U.S. patent application Ser. No. 11/097,833, entitled AGGREGATE ANALYSIS OF TEXT CAPTURES PERFORMED BY MULTIPLE USERS FROM RENDERED DOCUMENTS, U.S. patent application Ser. No. 11/097,836, entitled ESTABLISHING AN INTERACTIVE ENVIRONMENT FOR RENDERED DOCUMENTS, U.S. patent application Ser. No. 11/098,042, entitled DATA CAPTURE FROM RENDERED DOCUMENTS USING HANDHELD DEVICE, U.S. patent application Ser. No. 11/096,704, entitled CAPTURING TEXT FROM RENDERED DOCUMENTS USING SUPPLEMENTAL INFORMATION, and U.S. patent application Ser. No. 11/110,353, filed Apr. 19, 2005, entitled PROCESSING TECHNIQUES FOR VISUAL CAPTURE DATA FROM A RENDERED DOCUMENT.

This application claims priority to, and incorporates by reference in their entirety, the following U.S. Provisional Patent Applications: Application No. 60/571,715 filed on May 17, 2004, Application No. 60/589,203 filed on Jul. 19, 2004, Application No. 60/589,201 filed on Jul. 19, 2004, Application No. 60/589,202 filed on Jul. 19, 2004, Application No. 60/598,821 filed on Aug. 2, 2004, Application No. 60/602,956 filed on Aug. 18, 2004, Application No. 60/602,925 filed on Aug. 18, 2004, Application No. 60/602,947 filed on Aug. 18, 2004, Application No. 60/602,897 filed on Aug. 18, 2004, Application No. 60/602,896 filed on Aug. 18, 2004, Application No. 60/602,930 filed on Aug. 18, 2004, Application No. 60/602,898 filed on Aug. 18, 2004, Application No. 60/603,466 filed on Aug. 19, 2004, Application No. 60/603,082 filed on Aug. 19, 2004, Application No. 60/603,081 filed on Aug. 19, 2004, Application No. 60/603,498 filed on Aug. 20, 2004, Application No. 60/603,358 filed on Aug. 20, 2004, Application No. 60/604,103 filed on Aug. 23, 2004, Application No. 60/604,098 filed on Aug. 23, 2004, Application No. 60/604,100 filed on Aug. 23, 2004, Application No. 60/604,102 filed on Aug. 23, 2004, Application No. 60/605,229 filed on Aug. 27, 2004, Application No. 60/605,105 filed on Aug. 27, 2004, Application No. 60/613,243 filed on Sep. 27, 2004, Application No. 60/613,628 filed on Sep. 27, 2004, Application No. 60/613,632 filed on Sep. 27, 2004, Application No. 60/613,589 filed on Sep. 27, 2004, Application No. 60/613,242 filed on Sep. 27, 2004, Application No. 60/613,602 filed on Sep. 27, 2004, Application No. 60/613,340 filed on Sep. 27, 2004, Application No. 60/613,634 filed on Sep. 27, 2004, Application No. 60/613,461 filed on Sep. 27, 2004, Application No. 60/613,455 filed on Sep. 27, 2004, Application No. 60/613,460 filed on Sep. 27, 2004, Application No. 60/613,400 filed on Sep. 27, 2004, Application No. 60/613,456 filed on Sep. 27, 2004, Application No. 60/613,341 filed on Sep. 27, 2004, Application No. 60/613,361 filed on Sep. 27, 2004, Application No. 60/613,454 filed on Sep. 27, 2004, Application No. 60/613,339 filed on Sep. 27, 2004, Application No. 60/613,633 filed on Sep. 27, 2004, Application No. 60/615,378 filed on Oct. 1, 2004, Application No. 60/615,112 filed on Oct. 1, 2004, Application No. 60/615,538 filed on Oct. 1, 2004, Application No. 60/617,122 filed on Oct. 7, 2004, Application No. 60/622,906 filed on Oct. 28, 2004, Application No. 60/633,452 filed on Dec. 6, 2004, Application No. 60/633,678 filed on Dec. 6, 2004, Application No. 60/633,486 filed on Dec. 6, 2004, Application No. 60/633,453 filed on Dec. 6, 2004, Application No. 60/634,627 filed on Dec. 9, 2004, Application No. 60/634,739 filed on Dec. 9, 2004, Application No. 60/647,684 filed on Jan. 26, 2005, Application No. 60/648,746 filed on Jan. 31, 2005, Application No. 60/653,372 filed on Feb. 15, 2005, Application No. 60/653,663 filed on Feb. 16, 2005, Application No. 60/653,669 filed on Feb. 16, 2005, Application No. 60/653,899 filed on Feb. 16, 2005, Application No. 60/653,679 filed on Feb. 16, 2005, Application No. 60/653,847 filed on Feb. 16, 2005, Application No. 60/654,379 filed on Feb. 17, 2005, Application No. 60/654,368 filed on Feb. 18, 2005, Application No. 60/654,326 filed on Feb. 18, 2005, Application No. 60/654,196 filed on Feb. 18, 2005, Application No. 60/655,279 filed on Feb. 22, 2005, Application No. 60/655,280 filed on Feb. 22, 2005, Application No. 60/655,987 filed on Feb. 22, 2005, Application No. 60/655,697 filed on Feb. 22, 2005, Application No. 60/655,281 filed on Feb. 22, 2005, and Application No. 60/657,309 filed on Feb. 28, 2005.

This application incorporates by reference in their entirety, the following U.S. Provisional Patent Applications: Application No. 60/563,520 filed on Apr. 19, 2004, Application No. 60/563,485 filed on Apr. 19, 2004, Application No. 60/564,688 filed on Apr. 23, 2004, Application No. 60/564,846 filed on Apr. 23, 2004, Application No. 60/566,667, filed on Apr.

30, 2004, Application No. 60/571,381 filed on May 14, 2004, Application No. 60/571,560 filed on May 14, 2004.

TECHNICAL FIELD

The described technology is directed to the field of document processing.

BACKGROUND

Paper documents have an enduring appeal, as can be seen by the proliferation of paper documents in the computer age. It has never been easier to print and publish paper documents than it is today. Paper documents prevail even though electronic documents are easier to duplicate, transmit, search and edit.

Given the popularity of paper documents and the advantages of electronic documents, it would be useful to combine the benefits of both.

DETAILED DESCRIPTION

Overview

Figure 1:
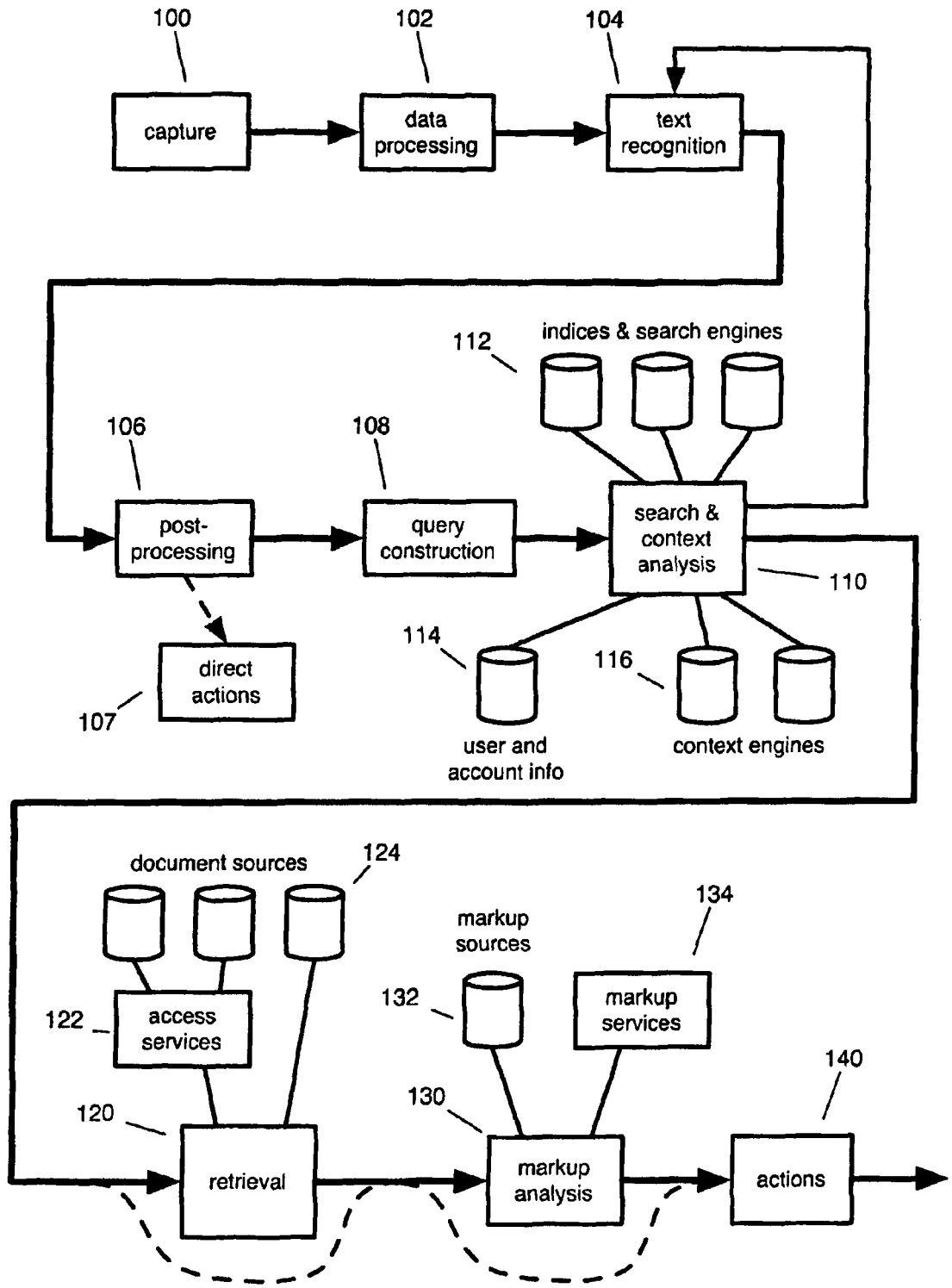
FIG. 1 is a data flow diagram that illustrates the flow of information in one embodiment of the core system.

A system for interpreting and interacting with rendered documents (e.g., printed or displayed documents), and related digital "source," "counterpart," or "reference" versions of these documents ("the system") is described. In some embodiments, the system is not directly concerned with recognizing and interpreting characters per se; it does not concern itself with recognizing and understanding printed characters, though it may in some cases perform this function. Rather, the system assumes that a version of the document is already known, that machine-readable (e.g., ASCII or some other machine-readable text) source or reference version document is at hand, or is machine-accessible, or will be made available in the future. The system uses various features (including text) in rendered documents for navigation (i.e., determining location within a document). The location is in turn used to enable a rich set of user functions and interactions, some of which will be described below.

The system is based in part on the process of interpreting and deciphering the patterns of marks (e.g., the text and any rendered supplemental informational marks) in documents to determine location information. In various embodiments, this location information is with reference to the document itself—e.g., location within the document, often down to a single paragraph, sentence, word and even single character. However, in cases where the physical lay-out of a specific rendering of a document is also known, the location information can be converted to location on a display screen, a printed page, etc.

In discussing various embodiments of the system, the term "printed text" is employed. "Printed" is used in its generic sense to documents rendering in any form that is readable to a human (e.g., on paper, on a display screen, in Braille format, etc.). It should be understood that in many cases various of the features and applications of system apply quite well to non-alphanumeric rendered content—such as punctuation, graphics and images, special marks, etc. Embodiments of the system include these additional uses.

Part I—Introduction

1. Nature of the System

A system that processes text captured from a paper document, such as by using a hand held scanner, is described. In some embodiments, the system enables the user of the scanner to purchase a product related to the contents of the captured text, either contemporaneously with the capture or at a later time. In some embodiments, the system derives context information about the user and the user's behavior based upon text capture information, as well as related information that can be associated with the user and/or text capture information. In some embodiments, the system represents and/or conveys such context information using a series of parameters.

1.1. A Quick Overview of the Future

Once the system has associated a piece of text in a paper document with a particular digital entity has been established, the system is able to build a huge amount of functionality on that association.

It is increasingly the case that most paper documents have an electronic counterpart that is accessible on the World Wide Web or from some other online database or document corpus, or can be made accessible, such as in response to the payment of a fee or subscription. At the simplest level, then, when a user scans a few words in a paper document, the system can retrieve that electronic document or some part of it, or display it, email it to somebody, purchase it, print it or post it to a web page. As additional examples, scanning a few words of a book that a person is reading over breakfast could cause the audio-book version in the person's car to begin reading from that point when s/he starts driving to work, or scanning the serial number on a printer cartridge could begin the process of ordering a replacement.

The system implements these and many other examples of "paper/digital integration" without requiring changes to the current processes of writing, printing and publishing documents, giving such conventional rendered documents a whole new layer of digital functionality.

1.2. Terminology

A typical use of the system begins with using an optical scanner to scan text from a paper document, but it is important to note that other methods of capture from other types of document are equally applicable. The system is therefore sometimes described as scanning or capturing text from a rendered document, where those terms are defined as follows:

A rendered document is a printed document or a document shown on a display or monitor. It is a document that is perceptible to a human, whether in permanent form or on a transitory display.

Scanning or capturing is the process of systematic examination to obtain information from a rendered document. The process may involve optical capture using a scanner or camera (for example a camera in a cellphone), or it may involve reading aloud from the document into an audio capture device or typing it on a keypad or keyboard. For more examples, see Section 15.

2. Introduction to the System

This section describes some of the devices, processes and systems that constitute a system for paper/digital integration. In various embodiments, the system builds a wide variety of services and applications on this underlying core that provides the basic functionality.

2.1. The Processes

FIG. 1 is a data flow diagram that illustrates the flow of information in one embodiment of the core system. Other embodiments may not use all of the stages or elements illustrated here, while some will use many more.

Text from a rendered document is captured 100, typically in optical form by an optical scanner or audio form by a voice recorder, and this image or sound data is then processed 102, for example to remove artifacts of the capture process or to improve the signal-to-noise ratio. A recognition process 104 such as OCR, speech recognition, or autocorrelation then converts the data into a signature, comprised in some embodiments of text, text offsets, or other symbols. Alternatively, the system performs an alternate form of extracting document signature from the rendered document. The signature represents a set of possible text transcriptions in some embodiments. This process may be influenced by feedback from other stages, for example, if the search process and context analysis 110 have identified some candidate documents from which the capture may originate, thus narrowing the possible interpretations of the original capture.

A post-processing 106 stage may take the output of the recognition process and filter it or perform such other operations upon it as may be useful. Depending upon the embodiment implemented, it may be possible at this stage to deduce some direct actions 107 to be taken immediately without reference to the later stages, such as where a phrase or symbol has been captured which contains sufficient information in itself to convey the user's intent. In these cases no digital counterpart document need be referenced, or even known to the system.

Typically, however, the next stage will be to construct a query 108 or a set of queries for use in searching. Some aspects of the query construction may depend on the search process used and so cannot be performed until the next stage, but there will typically be some operations, such as the removal of obviously misrecognized or irrelevant characters, which can be performed in advance.

The query or queries are then passed to the search and context analysis stage 110. Here, the system optionally attempts to identify the document from which the original data was captured. To do so, the system typically uses search indices and search engines 112, knowledge about the user 114 and knowledge about the user's context or the context in which the capture occurred 116. Search engine 112 may employ and/or index information specifically about rendered documents, about their digital counterpart documents, and about documents that have a web (internet) presence). It may write to, as well as read from, many of these sources and, as has been mentioned, it may feed information into other stages of the process, for example by giving the recognition system 104 information about the language, font, rendering and likely next words based on its knowledge of the candidate documents.

In some circumstances the next stage will be to retrieve 120 a copy of the document or documents that have been identified. The sources of the documents 124 may be directly accessible, for example from a local filing system or database or a web server, or they may need to be contacted via some access service 122 which might enforce authentication, security or payment or may provide other services such as conversion of the document into a desired format.

Applications of the system may take advantage of the association of extra functionality or data with part or all of a document. For example, advertising applications discussed in Section 10.4 may use an association of particular advertising messages or subjects with portions of a document. This extra associated functionality or data can be thought of as one or more overlays on the document, and is referred to herein as "markup." The next stage of the process 130, then, is to identify any markup relevant to the captured data. Such markup may be provided by the user, the originator, or publisher of the document, or some other party, and may be directly accessible from some source 132 or may be generated by some service 134. In various embodiments, markup can be associated with, and apply to, a rendered document and/or the digital counterpart to a rendered document, or to groups of either or both of these documents.

Lastly, as a result of the earlier stages, some actions may be taken 140. These may be default actions such as simply recording the information found, they may be dependent on the data or document, or they may be derived from the markup analysis. Sometimes the action will simply be to pass the data to another system. In some cases the various possible actions appropriate to a capture at a specific point in a rendered document will be presented to the user as a menu on an associated display, for example on a local display 332, on a computer display 212 or a mobile phone or PDA display 216. If the user doesn't respond to the menu, the default actions can be taken.

2.2. The Components

Figure 2:
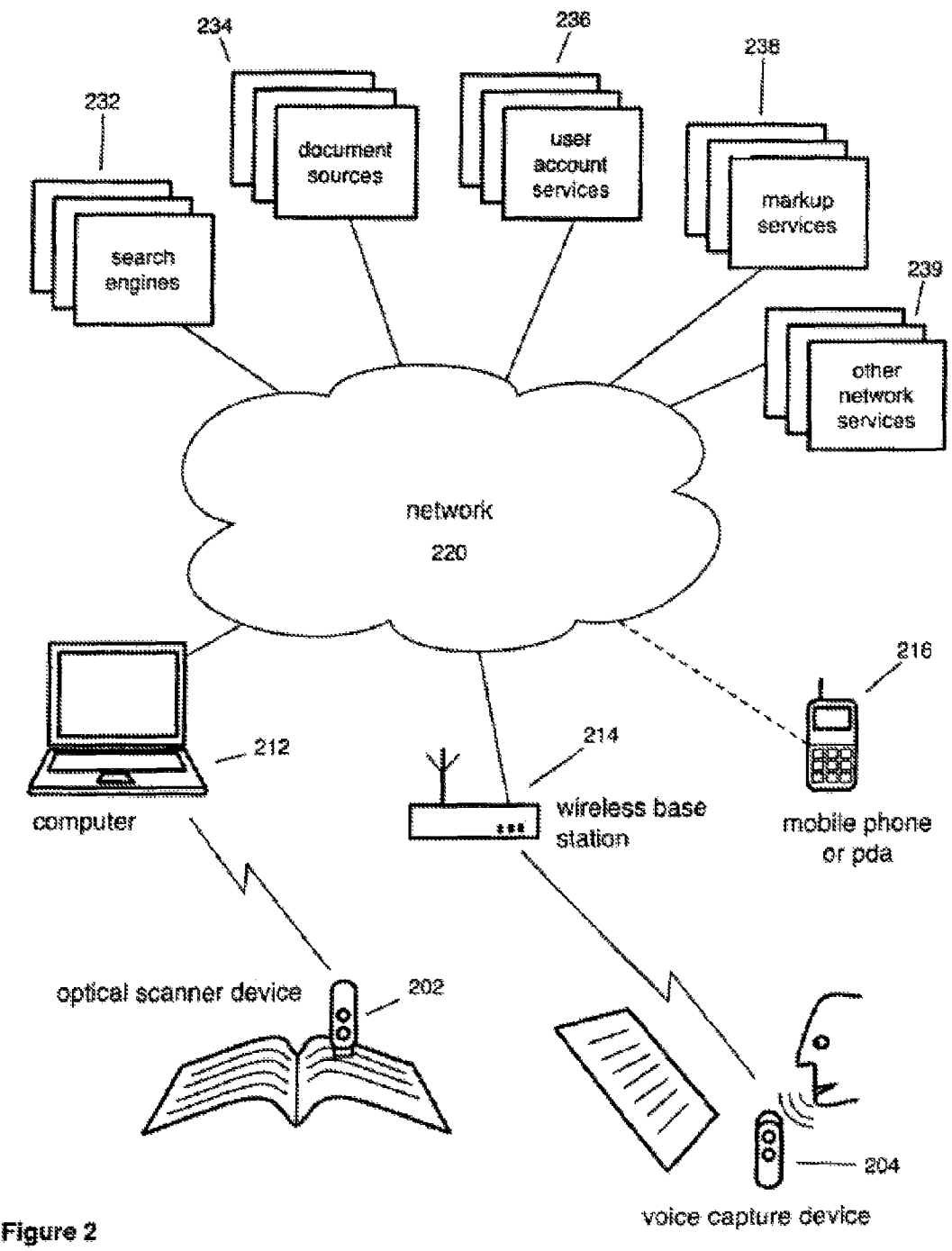
FIG. 2 is a component diagram of components included in a typical implementation of the system in the context of a typical operating environment.

FIG. 2 is a component diagram of components included in a typical implementation of the system in the context of a typical operating environment. As illustrated, the operating environment includes one or more optical scanning capture devices 202 or voice capture devices 204. In some embodiments, the same device performs both functions. Each capture device is able to communicate with other parts of the system such as a computer 212 and a mobile station 216 (e.g., a mobile phone or PDA) using either a direct wired or wireless connection, or through the network 220, with which it can communicate using a wired or wireless connection, the latter typically involving a wireless base station 214. In some embodiments, the capture device is integrated in the mobile station, and optionally shares some of the audio and/or optical components used in the device for voice communications and picture-taking.

Computer 212 may include a memory containing computer executable instructions for processing an order from scanning devices 202 and 204. As an example, an order can include an identifier (such as a serial number of the scanning device 202/204 or an identifier that partially or uniquely identifies the user of the scanner), scanning context information (e.g., time of scan, location of scan, etc.) and/or scanned information (such as a text string) that is used to uniquely identify the document being scanned. In alternative embodiments, the operating environment may include more or less components.

Also available on the network 220 are search engines 232, document sources 234, user account services 236, markup services 238 and other network services 239. The network 220 may be a corporate intranet, the public Internet, a mobile phone network or some other network, or any interconnection of the above.

Regardless of the manner by which the devices are coupled to each other, they may all may be operable in accordance with well-known commercial transaction and communication protocols (e.g., Internet Protocol (IP)). In various embodiments, the functions and capabilities of scanning device 202, computer 212, and mobile station 216 may be wholly or partially integrated into one device. Thus, the terms scanning device, computer, and mobile station can refer to the same device depending upon whether the device incorporates functions or capabilities of the scanning device 202, computer 212 and mobile station 216. In addition, some or all of the functions of the search engines 232, document sources 234, user account services 236, markup services 238 and other network services 239 may be implemented on any of the devices and/or other devices not shown.

2.3. The Capture Device

As described above, the capture device may capture text using an optical scanner that captures image data from the rendered document, or using an audio recording device that captures a user's spoken reading of the text, or other methods. Some embodiments of the capture device may also capture images, graphical symbols and icons, etc., including machine readable codes such as barcodes. The device may be exceedingly simple, consisting of little more than the transducer, some storage, and a data interface, relying on other functionality residing elsewhere in the system, or it may be a more full-featured device. For illustration, this section describes a device based around an optical scanner and with a reasonable number of features.

Scanners are well known devices that capture and digitize images. An offshoot of the photocopier industry, the first scanners were relatively large devices that captured an entire document page at once. Recently, portable optical scanners have been introduced in convenient form factors, such as a pen-shaped handheld device.

In some embodiments, the portable scanner is used to scan text, graphics, or symbols from rendered documents. The portable scanner has a scanning element that captures text, symbols, graphics, etc, from rendered documents. In addition to documents that have been printed on paper, in some embodiments, rendered documents include documents that have been displayed on a screen such as a CRT monitor or LCD display.

Figure 3:
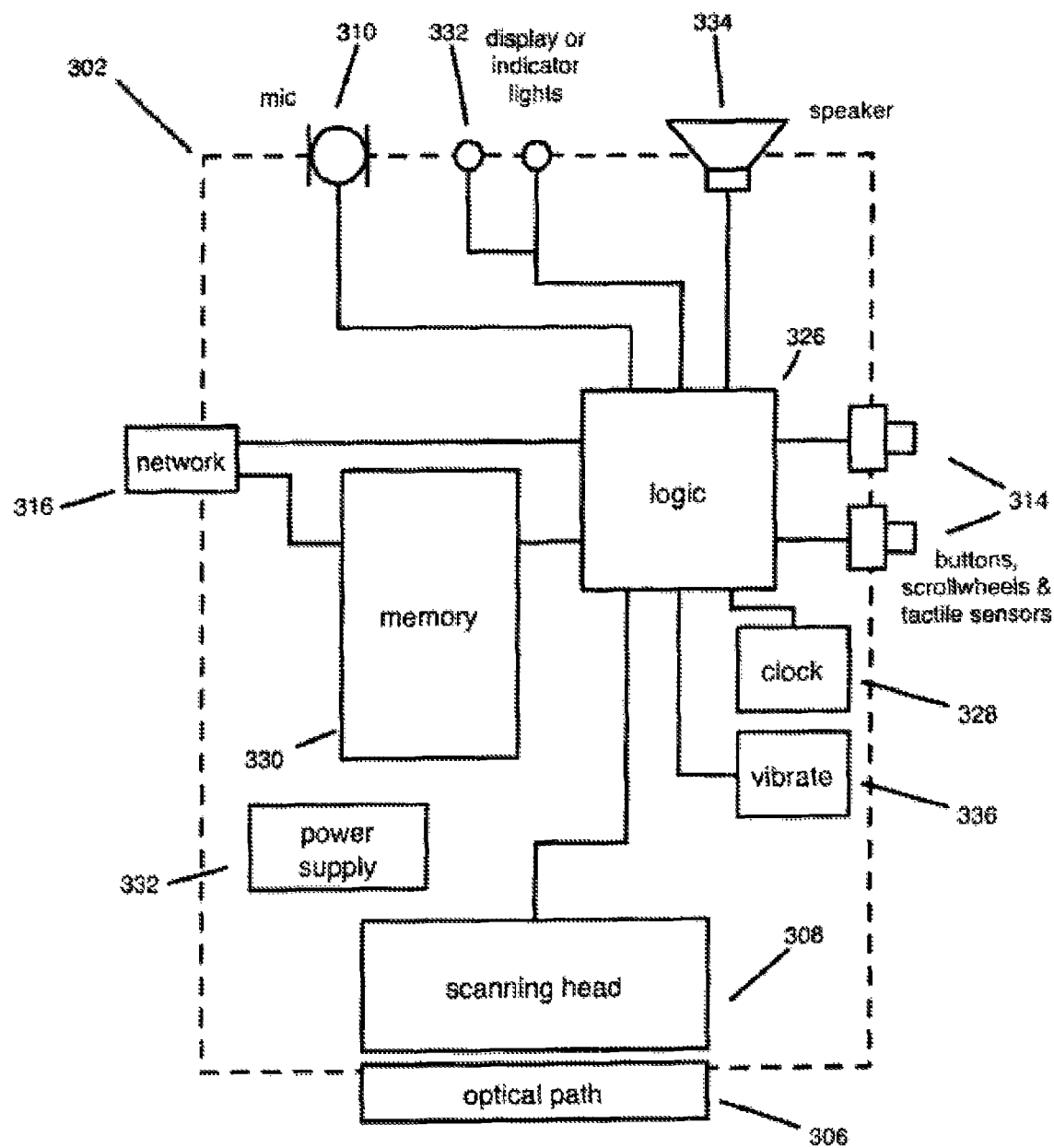
FIG. 3 is a block diagram of an embodiment of a scanner.

FIG. 3 is a block diagram of an embodiment of a scanner 302. The scanner 302 comprises an optical scanning head 308 to scan information from rendered documents and convert it to machine-compatible data, and an optical path 306, typically a lens, an aperture or an image conduit to convey the image from the rendered document to the scanning head. The scanning head 308 may incorporate a Charge-Coupled Device (CCD), a Complementary Metal Oxide Semiconductor (CMOS) imaging device, or an optical sensor of another type.

A microphone 310 and associated circuitry convert the sound of the environment (including spoken words) into machine-compatible signals, and other input facilities exist in the form of buttons, scroll-wheels or other tactile sensors such as touch-pads 314.

Feedback to the user is possible through a visual display or indicator lights 332, through a loudspeaker or other audio transducer 334 and through a vibrate module 336.

The scanner 302 comprises logic 326 to interact with the various other components, possibly processing the received signals into different formats and/or interpretations. Logic 326 may be operable to read and write data and program instructions stored in associated storage 330 such as RAM, ROM, flash, or other suitable memory. It may read a time signal from the clock unit 328. The scanner 302 also includes an interface 316 to communicate scanned information and other signals to a network and/or an associated computing device. In some embodiments, the scanner 302 may have an on-board power supply 332. In other embodiments, the scanner 302 may be powered from a tethered connection to another device, such as a Universal Serial Bus (USB) connection.

As an example of one use of scanner 302, a reader may scan some text from a newspaper article with scanner 302. The text is scanned as a bit-mapped image via the scanning head 308. Logic 326 causes the bit-mapped image to be stored in memory 330 with an associated time-stamp read from the clock unit 328. Logic 326 may also perform optical character recognition (OCR) or other post-scan processing on the bit-mapped image to convert it to text. Logic 326 may optionally extract a signature from the image, for example by performing a convolution-like process to locate repeating occurrences of characters, symbols or objects, and determine the distance or number of other characters, symbols, or objects between these repeated elements. The reader may then upload the bit-mapped image (or text or other signature, if post-scan processing has been performed by logic 326) to an associated computer via interface 316.

As an example of another use of scanner 302, a reader may capture some text from an article as an audio file by using microphone 310 as an acoustic capture port. Logic 326 causes audio file to be stored in memory 328. Logic 326 may also perform voice recognition or other post-scan processing on the audio file to convert it to text. As above, the reader may then upload the audio file (or text produced by post-scan processing performed by logic 326) to an associated computer via interface 316.

Part II—Overview of the Areas of the Core System

As paper-digital integration becomes more common, there are many aspects of existing technologies that can be changed to take better advantage of this integration, or to enable it to be implemented more effectively. This section highlights some of those issues.

3. Search

Searching a corpus of documents, even so large a corpus as the World Wide Web, has become commonplace for ordinary users, who use a keyboard to construct a search query which is sent to a search engine. This section and the next discuss the aspects of both the construction of a query originated by a capture from a rendered document, and the search engine that handles such a query.

3.1. Scan/Speak/Type as Search Query

Use of the described system typically starts with a few words being captured from a rendered document using any of several methods, including those mentioned in Section 1.2 above. Where the input needs some interpretation to convert it to text, for example in the case of OCR or speech input, there may be end-to-end feedback in the system so that the document corpus can be used to enhance the recognition process. End-to-end feedback can be applied by performing an approximation of the recognition or interpretation, identifying a set of one or more candidate matching documents, and then using information from the possible matches in the candidate documents to further refine or restrict the recognition or interpretation. Candidate documents can be weighted according to their probable relevance (for example, based on then number of other users who have scanned in these documents, or their popularity on the Internet), and these weights can be applied in this iterative recognition process.

3.2. Short Phrase Searching

Because the selective power of a search query based on a few words is greatly enhanced when the relative positions of these words are known, only a small amount of text need be captured for the system to identify the text's location in a corpus. Most commonly, the input text will be a contiguous sequence of words, such as a short phrase.

3.2.1. Finding Document and Location in Document from Short Capture

In addition to locating the document from which a phrase originates, the system can identify the location in that document and can take action based on this knowledge.

3.2.2. Other Methods of Finding Location

The system may also employ other methods of discovering the document and location, such as by using watermarks or other special markings on the rendered document.

3.3. Incorporation of Other Factors in Search Query

In addition to the captured text, other factors (i.e., information about user identity, profile, and context) may form part of the search query, such as the time of the capture, the identity and geographical location of the user, knowledge of the user's habits and recent activities, etc.

The document identity and other information related to previous captures, especially if they were quite recent, may form part of a search query.

The identity of the user may be determined from a unique identifier associated with a capturing device, and/or biometric or other supplemental information (speech patterns, fingerprints, etc.).

3.4. Knowledge of Nature of Unreliability in Search Query (OCR Errors, Etc.)

The search query can be constructed taking into account the types of errors likely to occur in the particular capture method used. One example of this is an indication of suspected errors in the recognition of specific characters; in this instance a search engine may treat these characters as wildcards, or assign them a lower priority.

3.5. Local Caching of Index for Performance/Offline Use

Sometimes the capturing device may not be in communication with the search engine or corpus at the time of the data capture. For this reason, information helpful to the offline use of the device may be downloaded to the device in advance, or to some entity with which the device can communicate. In some cases, all or a substantial part of an index associated with a corpus may be downloaded. This topic is discussed further in Section 15.3.

3.6. Queries, in Whatever Form, May be Recorded and Acted on Later

If there are likely to be delays or cost associated with communicating a query or receiving the results, this preloaded information can improve the performance of the local device, reduce communication costs, and provide helpful and timely user feedback.

In the situation where no communication is available (the local device is "offline"), the queries may be saved and transmitted to the rest of the system at such a time as communication is restored.

In these cases it may be important to transmit a timestamp with each query. The time of the capture can be a significant factor in the interpretation of the query. For example, Section 13.1 discusses the importance of the time of capture in relation to earlier captures. It is important to note that the time of capture will not always be the same as the time that the query is executed.

3.7. Parallel Searching

For performance reasons, multiple queries may be launched in response to a single capture, either in sequence or in parallel. Several queries may be sent in response to a single capture, for example as new words are added to the capture, or to query multiple search engines in parallel.

For example, in some embodiments, the system sends queries to a special index for the current document, to a search engine on a local machine, to a search engine on the corporate network, and to remote search engines on the Internet.

The results of particular searches may be given higher priority than those from others.

The response to a given query may indicate that other pending queries are superfluous; these may be cancelled before completion.

4. Paper and Search Engines

Often it is desirable for a search engine that handles traditional online queries also to handle those originating from rendered documents. Conventional search engines may be enhanced or modified in a number of ways to make them more suitable for use with the described system.

The search engine and/or other components of the system may create and maintain indices that have different or extra features. The system may modify an incoming paper-originated query or change the way the query is handled in the resulting search, thus distinguishing these paper-originated queries from those coming from queries typed into web browsers and other sources. And the system may take different actions or offer different options when the results are returned by the searches originated from paper as compared to those from other sources. Each of these approaches is discussed below.

4.1. Indexing

Often, the same index can be searched using either paper-originated or traditional queries, but the index may be enhanced for use in the current system in a variety of ways.

4.1.1. Knowledge about the Paper Form

Extra fields can be added to such an index that will help in the case of a paper-based search.

Index Entry Indicating Document Availability in Paper Form

The first example is a field indicating that the document is known to exist or be distributed in paper form. The system may give such documents higher priority if the query comes from paper.

Knowledge of Popularity Paper Form

In this example statistical data concerning the popularity of paper documents (and, optionally, concerning sub-regions within these documents)—for example the amount of scanning activity, circulation numbers provided by the publisher or other sources, etc—is used to give such documents higher priority, to boost the priority of digital counterpart documents (for example, for browser-based queries or web searches), etc.

Knowledge of Rendered Format

Another important example may be recording information about the layout of a specific rendering of a document.

For a particular edition of a book, for example, the index may include information about where the line breaks and page breaks occur, which fonts were used, any unusual capitalization.

The index may also include information about the proximity of other items on the page, such as images, text boxes, tables and advertisements.

Use of Semantic Information in Original

Lastly, semantic information that can be deduced from the source markup but is not apparent in the paper document, such as the fact that a particular piece of text refers to an item offered for sale, or that a certain paragraph contains program code, may also be recorded in the index.

4.1.2. Indexing in the Knowledge of the Capture Method

A second factor that may modify the nature of the index is the knowledge of the type of capture likely to be used. A search initiated by an optical scan may benefit if the index takes into account characters that are easily confused in the OCR process, or includes some knowledge of the fonts used in the document. Similarly, if the query is from speech recognition, an index based on similar-sounding phonemes may be much more efficiently searched. An additional factor that may affect the use of the index in the described model is the importance of iterative feedback during the recognition process. If the search engine is able to provide feedback from the index as the text is being captured, it can greatly increase the accuracy of the capture.

Indexing Using Offsets

If the index is likely to be searched using the offset-based/autocorrelation OCR methods described in Section 9, in some embodiments, the system stores the appropriate offset or signature information in an index.

4.1.3. Multiple Indices

Lastly, in the described system, it may be common to conduct searches on many indices. Indices may be maintained on several machines on a corporate network. Partial indices may be downloaded to the capture device, or to a machine close to the capture device. Separate indices may be created for users or groups of users with particular interests, habits or permissions. An index may exist for each filesystem, each directory, even each file on a user's hard disk. Indexes are published and subscribed to by users and by systems. It will be important, then, to construct indices that can be distributed, updated, merged and separated efficiently.

4.2. Handling the Queries

4.2.1. Knowing the Capture is from Paper

A search engine may take different actions when it recognizes that a search query originated from a paper document. The engine might handle the query in a way that is more tolerant to the types of errors likely to appear in certain capture methods, for example.

It may be able to deduce this from some indicator included in the query (for example a flag indicating the nature of the capture), or it may deduce this from the query itself (for example, it may recognize errors or uncertainties typical of the OCR process).

Alternatively, queries from a capture device can reach the engine by a different channel or port or type of connection than those from other sources, and can be distinguished in that way. For example, some embodiments of the system will route queries to the search engine by way of a dedicated gateway. Thus, the search engine knows that all queries passing through the dedicated gateway were originated from a paper document.

4.2.2. Use of Context

Section 13 below describes a variety of different factors which are external to the captured text itself, yet which can be a significant aid in identifying a document. These include such things as the history of recent scans, the longer-term reading habits of a particular user, the geographic location of a user and the user's recent use of particular electronic documents. Such factors are referred to herein as "context."

Some of the context may be handled by the search engine itself, and be reflected in the search results. For example, the search engine may keep track of a user's scanning history, and may also cross-reference this scanning history to conventional keyboard-based queries. In such cases, the search engine maintains and uses more state information about each individual user than do most conventional search engines, and each interaction with a search engine may be considered to extend over several searches and a longer period of time than is typical today.

Some of the context may be transmitted to the search engine in the search query (Section 3.3), and may possibly be stored at the engine so as to play a part in future queries. Lastly, some of the context will best be handled elsewhere, and so becomes a filter or secondary search applied to the results from the search engine.

Data-Stream Input to Search

An important input into the search process is the broader context of how the community of users is interacting with the rendered version of the document—for example, which documents are most widely read and by whom. There are analogies with a web search returning the pages that are most frequently linked to, or those that are most frequently selected from past search results. For further discussion of this topic, see Sections 13.4 and 14.2.

4.2.3. Document Sub-Regions

The described system can emit and use not only information about documents as a whole, but also information about sub-regions of documents, even down to individual words. Many existing search engines concentrate simply on locating a document or file that is relevant to a particular query. Those that can work on a finer grain and identify a location within a document will provide a significant benefit for the described system.

4.3. Returning the Results

The search engine may use some of the further information it now maintains to affect the results returned.

The system may also return certain documents to which the user has access only as a result of being in possession of the paper copy (Section 7.4).

The search engine may also offer new actions or options appropriate to the described system, beyond simple retrieval of the text.

5. Markup, Annotations and Metadata

In addition to performing the capture-search-retrieve process, the described system also associates extra functionality with a document, and in particular with specific locations or segments of text within a document. This extra functionality is often, though not exclusively, associated with the rendered document by being associated with its electronic counterpart. As an example, hyperlinks in a web page could have the same functionality when a printout of that web page is scanned. In some cases, the functionality is not defined in the electronic document, but is stored or generated elsewhere.

This layer of added functionality is referred to herein as "markup."

5.1. Overlays, Static and Dynamic

One way to think of the markup is as an "overlay" on the document, which provides further information about—and may specify actions associated with—the document or some portion of it. The markup may include human-readable content, but is often invisible to a user and/or intended for machine use. Examples include options to be displayed in a popup-menu on a nearby display when a user captures text from a particular area in a rendered document, or audio samples that illustrate the pronunciation of a particular phrase.

5.1.1. Several Layers, Possibly from Several Sources

Any document may have multiple overlays simultaneously, and these may be sourced from a variety of locations. Markup data may be created or supplied by the author of the document, or by the user, or by some other party.

Markup data may be attached to the electronic document or embedded in it. It may be found in a conventional location (for example, in the same place as the document but with a different filename suffix). Markup data may be included in the search results of the query that located the original document, or may be found by a separate query to the same or another search engine. Markup data may be found using the original captured text and other capture information or contextual information, or it may be found using already-deduced information about the document and location of the capture. Markup data may be found in a location specified in the document, even if the markup itself is not included in the document.

The markup may be largely static and specific to the document, similar to the way links on a traditional html web page are often embedded as static data within the html document, but markup may also be dynamically generated and/or applied to a large number of documents. An example of dynamic markup is information attached to a document that includes the up-to-date share price of companies mentioned in that document. An example of broadly applied markup is translation information that is automatically available on multiple documents or sections of documents in a particular language.

5.1.2. Personal "Plug-In" Layers

Users may also install, or subscribe to particular sources of, markup data, thus personalizing the system's response to particular captures.

5.2. Keywords and Phrases, Trademarks and Logos

Some elements in documents may have particular "markup" or functionality associated with them based on their own characteristics rather than their location in a particular document. Examples include special marks that are printed in the document purely for the purpose of being scanned, as well as logos and trademarks that can link the user to further information about the organization concerned. The same applies to "keywords" or "key phrases" in the text. Organizations might register particular phrases with which they are associated, or with which they would like to be associated, and attach certain markup to them that would be available wherever that phrase was scanned.

Any word, phrase, etc. may have associated markup. For example, the system may add certain items to a pop-up menu (e.g., a link to an online bookstore) whenever the user captures the word "book," or the title of a book, or a topic related to books. In some embodiments, of the system, digital counterpart documents or indices are consulted to determine whether a capture occurred near the word "book," or the title of a book, or a topic related to books—and the system behavior is modified in accordance with this proximity to keyword elements. In the preceding example, note that markup enables data captured from non-commercial text or documents to trigger a commercial transaction.

5.3. User-Supplied Content

5.3.1. User Comments and Annotations, Including Multimedia

Annotations are another type of electronic information that may be associated with a document. For example, a user can attach an audio file of his/her thoughts about a particular document for later retrieval as voice annotations. As another example of a multimedia annotation, a user may attach photographs of places referred to in the document. The user generally supplies annotations for the document but the system can associate annotations from other sources (for example, other users in a work group may share annotations).

5.3.2. Notes from Proof-Reading

An important example of user-sourced markup is the annotation of paper documents as part of a proofreading, editing or reviewing process.

5.4. Third-Party Content

As mentioned earlier, markup data may often be supplied by third parties, such as by other readers of the document. Online discussions and reviews are a good example, as are community-managed information relating to particular works, volunteer-contributed translations and explanations.

Another example of third-party markup is that provided by advertisers.

5.5. Dynamic Markup Based on Other Users' Data Streams

By analyzing the data captured from documents by several or all users of the system, markup can be generated based on the activities and interests of a community. An example might be an online bookstore that creates markup or annotations that tell the user, in effect, "People who enjoyed this book also enjoyed . . . ." The markup may be less anonymous, and may tell the user which of the people in his/her contact list have also read this document recently. Other examples of datastream analysis are included in Section 14.

5.6. Markup Based on External Events and Data Sources

Markup will often be based on external events and data sources, such as input from a corporate database, information from the public Internet, or statistics gathered by the local operating system.

Data sources may also be more local, and in particular may provide information about the user's context—his/her identity, location and activities. For example, the system might communicate with the user's mobile phone and offer a markup layer that gives the user the option to send a document to somebody that the user has recently spoken to on the phone.

6. Authentication, Personalization and Security

In many situations, the identity of the user will be known. Sometimes this will be an "anonymous identity," where the user is identified only by the serial number of the capture device, for example. Typically, however, it is expected that the system will have a much more detailed knowledge of the user, which can be used for personalizing the system and to allow activities and transactions to be performed in the user's name.

6.1. User History and "Life Library"

One of the simplest and yet most useful functions that the system can perform is to keep a record for a user of the text that s/he has captured and any further information related to that capture, including the details of any documents found, the location within that document and any actions taken as a result.

This stored history is beneficial for both the user and the system.

6.1.1. For the User

The user can be presented with a "Life Library," a record of everything s/he has read and captured. This may be simply for personal interest, but may be used, for example, in a library by an academic who is gathering material for the bibliography of his next paper.

In some circumstances, the user may wish to make the library public, such as by publishing it on the web in a similar manner to a weblog, so that others may see what s/he is reading and finds of interest.

Lastly, in situations where the user captures some text and the system cannot immediately act upon the capture (for example, because an electronic version of the document is not yet available) the capture can be stored in the library and can be processed later, either automatically or in response to a user request. A user can also subscribe to new markup services and apply them to previously captured scans.

6.1.2. For the System

A record of a user's past captures is also useful for the system. Many aspects of the system operation can be enhanced by knowing the user's reading habits and history. The simplest example is that any scan made by a user is more likely to come from a document that the user has scanned in the recent past, and in particular if the previous scan was within the last few minutes it is very likely to be from the same document. Similarly, it is more likely that a document is being read in start-to-finish order. Thus, for English documents, it is also more likely that later scans will occur farther down in the document. Such factors can help the system establish the location of the capture in cases of ambiguity, and can also reduce the amount of text that needs to be captured.

6.2. Scanner as Payment, Identity and Authentication Device

Because the capture process generally begins with a device of some sort, typically an optical scanner or voice recorder, this device may be used as a key that identifies the user and authorizes certain actions.

6.2.1. Associate Scanner with Phone or Other Account

The device may be embedded in a mobile phone or in some other way associated with a mobile phone account. For example, a scanner may be associated with a mobile phone account by inserting a SIM card associated with the account into the scanner. Similarly, the device may be embedded in a credit card or other payment card, or have the system for such a card to be connected to it. The device may therefore be used as a payment token, and financial transactions may be initiated by the capture from the rendered document.

6.2.2. Using Scanner Input for Authentication

The scanner may also be associated with a particular user or account through the process of scanning some token, symbol or text associated with that user or account. In addition, scanner may be used for biometric identification, for example by scanning the fingerprint of the user. In the case of an audio-based capture device, the system may identify the user by matching the voice pattern of the user or by requiring the user to speak a certain password or phrase.

For example, where a user scans a quote from a book and is offered the option to buy the book from an online retailer, the user can select this option, and is then prompted to scan his/her fingerprint to confirm the transaction.

See also Sections 15.5 and 15.6.

6.2.3. Secure Scanning Device

When the capture device is used to identify and authenticate the user, and to initiate transactions on behalf of the user, it is important that communications between the device and other parts of the system are secure. It is also important to guard against such situations as another device impersonating a scanner, and so-called "man in the middle" attacks where communications between the device and other components are intercepted.

Techniques for providing such security are well understood in the art; in various embodiments, the hardware and software in the device and elsewhere in the system are configured to implement such techniques.

7. Publishing Models and Elements

An advantage of the described system is that there is no need to alter the traditional processes of creating, printing or publishing documents in order to gain many of the system's benefits. There are reasons, though, that the creators or publishers of a document—hereafter simply referred to as the "publishers"—may wish to create functionality to support the described system.

This section is primarily concerned with the published documents themselves. For information about other related commercial transactions, such as advertising, see Section 10 entitled "P-Commerce."

7.1. Electronic Companions to Printed Documents

The system allows for printed documents to have an associated electronic presence. Conventionally publishers often ship a CD-ROM with a book that contains further digital information, tutorial movies and other multimedia data, sample code or documents, or further reference materials. In addition, some publishers maintain web sites associated with particular publications which provide such materials, as well as information which may be updated after the time of publishing, such as errata, further comments, updated reference materials, bibliographies and further sources of relevant data, and translations into other languages. Online forums allow readers to contribute their comments about the publication.

The described system allows such materials to be much more closely tied to the rendered document than ever before, and allows the discovery of and interaction with them to be much easier for the user. By capturing a portion of text from the document, the system can automatically connect the user to digital materials associated with the document, and more particularly associated with that specific part of the document. Similarly, the user can be connected to online communities that discuss that section of the text, or to annotations and commentaries by other readers. In the past, such information would typically need to be found by searching for a particular page number or chapter.

An example application of this is in the area of academic textbooks (Section 17.5).

7.2. "Subscriptions" to Printed Documents

Some publishers may have mailing lists to which readers can subscribe if they wish to be notified of new relevant matter or when a new edition of the book is published. With the described system, the user can register an interest in particular documents or parts of documents more easily, in some cases even before the publisher has considered providing any such functionality. The reader's interest can be fed to the publisher, possibly affecting their decision about when and where to provide updates, further information, new editions or even completely new publications on topics that have proved to be of interest in existing books.

7.3. Printed Marks with Special Meaning or Containing Special Data

Many aspects of the system are enabled simply through the use of the text already existing in a document. If the document is produced in the knowledge that it may be used in conjunction with the system, however, extra functionality can be added by printing extra information in the form of special marks, which may be used to identify the text or a required action more closely, or otherwise enhance the document's interaction with the system. The simplest and most important example is an indication to the reader that the document is definitely accessible through the system. A special icon might be used, for example, to indicate that this document has an online discussion forum associated with it.

Such symbols may be intended purely for the reader, or they may be recognized by the system when scanned and used to initiate some action. Sufficient data may be encoded in the symbol to identify more than just the symbol: it may also store information, for example about the document, edition, and location of the symbol, which could be recognized and read by the system.

7.4. Authorization Through Possession of the Paper Document

There are some situations where possession of or access to the printed document would entitle the user to certain privileges, for example, the access to an electronic copy of the document or to additional materials. With the described system, such privileges could be granted simply as a result of the user capturing portions of text from the document, or scanning specially printed symbols. In cases where the system needed to ensure that the user was in possession of the entire document, it might prompt the user to scan particular items or phrases from particular pages, e.g. "the second line of page 46."

7.5. Documents which Expire

If the printed document is a gateway to extra materials and functionality, access to such features can also be time-limited. After the expiry date, a user may be required to pay a fee or obtain a newer version of the document to access the features again. The paper document will, of course, still be usable, but will lose some of its enhanced electronic functionality. This may be desirable, for example, because there is profit for the publisher in receiving fees for access to electronic materials, or in requiring the user to purchase new editions from time to time, or because there are disadvantages associated with outdated versions of the printed document remaining in circulation. Coupons are an example of a type of commercial document that can have an expiration date.

7.6. Popularity Analysis and Publishing Decisions

Section 10.5 discusses the use of the system's statistics to influence compensation of authors and pricing of advertisements.

In some embodiments, the system deduces the popularity of a publication from the activity in the electronic community associated with it as well as from the use of the paper document. These factors may help publishers to make decisions about what they will publish in future. If a chapter in an existing book, for example, turns out to be exceedingly popular, it may be worth expanding into a separate publication.

8. Document Access Services

An important aspect of the described system is the ability to provide to a user who has access to a rendered copy of a document access to an electronic version of that document. In some cases, a document is freely available on a public network or a private network to which the user has access. The system uses the captured text to identify, locate and retrieve the document, in some cases displaying it on the user's screen or depositing it in their email inbox.

In some cases, a document will be available in electronic form, but for a variety of reasons may not be accessible to the user. There may not be sufficient connectivity to retrieve the document, the user may not be entitled to retrieve it, there may be a cost associated with gaining access to it, or the document may have been withdrawn and possibly replaced by a new version, to name just a few possibilities. The system typically provides feedback to the user about these situations.

As mentioned in Section 7.4, the degree or nature of the access granted to a particular user may be different if it is known that the user already has access to a printed copy of the document.

8.1. Authenticated Document Access

Access to the document may be restricted to specific users, or to those meeting particular criteria, or may only be available in certain circumstances, for example when the user is connected to a secure network. Section 6 describes some of the ways in which the credentials of a user and scanner may be established.

8.2. Document Purchase—Copyright-Owner Compensation

Documents that are not freely available to the general public may still be accessible on payment of a fee, often as compensation to the publisher or copyright-holder. The system may implement payment facilities directly or may make use of other payment methods associated with the user, including those described in Section 6.2.

8.3. Document Escrow and Proactive Retrieval

Electronic documents are often transient; the digital source version of a rendered document may be available now but inaccessible in future. The system may retrieve and store the existing version on behalf of the user, even if the user has not requested it, thus guaranteeing its availability should the user request it in future. This also makes it available for the system's use, for example for searching as part of the process of identifying future captures.

In the event that payment is required for access to the document, a trusted "document escrow" service can retrieve the document on behalf of the user, such as upon payment of a modest fee, with the assurance that the copyright holder will be fully compensated in future if the user should ever request the document from the service.

Variations on this theme can be implemented if the document is not available in electronic form at the time of capture. The user can authorize the service to submit a request for or make a payment for the document on his/her behalf if the electronic document should become available at a later date.

8.4. Association with Other Subscriptions and Accounts

Sometimes payment may be waived, reduced or satisfied based on the user's existing association with another account or subscription. Subscribers to the printed version of a newspaper might automatically be entitled to retrieve the electronic version, for example.

In other cases, the association may not be quite so direct: a user may be granted access based on an account established by their employer, or based on their scanning of a printed copy owned by a friend who is a subscriber.

8.5. Replacing Photocopying with Scan-and-Print

The process of capturing text from a paper document, identifying an electronic original, and printing that original, or some portion of that original associated with the capture, forms an alternative to traditional photocopying with many advantages:

- the paper document need not be in the same location as the final printout, and in any case need not be there at the same time
- the wear and damage caused to documents by the photocopying process, especially to old, fragile and valuable documents, can be avoided
- the quality of the copy is typically be much higher
- records may be kept about which documents or portions of documents are the most frequently copied
- payment may be made to the copyright owner as part of the process
- unauthorized copying may be prohibited

8.6. Locating Valuable Originals from Photocopies

When documents are particularly valuable, as in the case of legal instruments or documents that have historical or other particular significance, people may typically work from copies of those documents, often for many years, while the originals are kept in a safe location.

The described system could be coupled to a database which records the location of an original document, for example in an archiving warehouse, making it easy for somebody with access to a copy to locate the archived original paper document.

9. Text Recognition Technologies

Optical Character Recognition (OCR) technologies have traditionally focused on images that include a large amount of text, for example from a flat-bed scanner capturing a whole page. OCR technologies often need substantial training and correcting by the user to produce useful text. OCR technologies often require substantial processing power on the machine doing the OCR, and, while many systems use a dictionary, they are generally expected to operate on an effectively infinite vocabulary.

All of the above traditional characteristics may be improved upon in the described system.

While this section focuses on OCR, many of the issues discussed map directly onto other recognition technologies, in particular speech recognition. As mentioned in Section 3.1, the process of capturing from paper may be achieved by a user reading the text aloud into a device which captures audio. Those skilled in the art will appreciate that principles discussed here with respect to images, fonts, and text fragments often also apply to audio samples, user speech models and phonemes.

9.1. Optimization for Appropriate Devices

A scanning device for use with the described system will often be small, portable, and low power. The scanning device may capture only a few words at a time, and in some implementations does not even capture a whole character at once, but rather a horizontal slice through the text, many such slices being stitched together to form a recognizable signal from which the text may be deduced. The scanning device may also have very limited processing power or storage so, while in some embodiments it may perform all of the OCR process itself, many embodiments will depend on a connection to a more powerful device, possibly at a later time, to convert the captured signals into text. Lastly, it may have very limited facilities for user interaction, so may need to defer any requests for user input until later, or operate in a "best-guess" mode to a greater degree than is common now.

9.2. "Uncertain" OCR

The primary new characteristic of OCR within the described system is the fact that it will, in general, examine images of text which exists elsewhere and which may be retrieved in digital form. An exact transcription of the text is therefore not always required from the OCR engine. The OCR system may output a set or a matrix of possible matches, in some cases including probability weightings, which can still be used to search for the digital original.

9.3. Iterative OCR—Guess, Disambiguate, Guess . . .

If the device performing the recognition is able to contact the document index at the time of processing, then the OCR process can be informed by the contents of the document corpus as it progresses, potentially offering substantially greater recognition accuracy.

Such a connection will also allow the device to inform the user when sufficient text has been captured to identify the digital source.

9.4. Using Knowledge of Likely Rendering

When the system has knowledge of aspects of the likely printed rendering of a document—such as the font typeface used in printing, or the layout of the page, or which sections are in italics—this too can help in the recognition process. (Section 4.1.1)

9.5. Font Caching—Determine Font on Host, Download to Client

As candidate source texts in the document corpus are identified, the font, or a rendering of it, may be downloaded to the device to help with the recognition.

9.6. Autocorrelation and Character Offsets

While component characters of a text fragment may be the most recognized way to represent a fragment of text that may be used as a document signature, other representations of the text may work sufficiently well that the actual text of a text fragment need not be used when attempting to locate the text fragment in a digital document and/or database, or when disambiguating the representation of a text fragment into a readable form. Other representations of text fragments may provide benefits that actual text representations lack. For example, optical character recognition of text fragments is often prone to errors, unlike other representations of captured text fragments that may be used to search for and/or recreate a text fragment without resorting to optical character recognition for the entire fragment. Such methods may be more appropriate for some devices used with the current system.

Those of ordinary skill in the art and others will appreciate that there are many ways of describing the appearance of text fragments. Such characterizations of text fragments may include, but are not limited to, word lengths, relative word lengths, character heights, character widths, character shapes, character frequencies, token frequencies, and the like. In some embodiments, the offsets between matching text tokens (i.e., the number of intervening tokens plus one) are used to characterize fragments of text.

Conventional OCR uses knowledge about fonts, letter structure and shape to attempt to determine characters in scanned text. Embodiments of the system are different; they employ a variety of methods that use the rendered text itself to assist in the recognition process. These embodiments use characters (or tokens) to "recognize each other." One way to refer to such self-recognition is "template matching," and is similar to "convolution." To perform such self-recognition, the system slides a copy of the text horizontally over itself and notes matching regions of the text images. Prior template matching and convolution techniques encompass a variety of related techniques. These techniques to tokenize and/or recognize characters/tokens will be collectively referred to herein as "autocorrelation," as the text is used to correlate with its own component parts when matching characters/tokens.

When autocorrelating, complete connected regions that match are of interest. This occurs when characters (or groups of characters) overlay other instances of the same character (or group). Complete connected regions that match automatically provide tokenizing of the text into component tokens. As the two copies of the text are slid past each other, the regions where perfect matching occurs (i.e., all pixels in a vertical slice are matched) are noted. When a character/token matches itself, the horizontal extent of this matching (e.g., the connected matching portion of the text) also matches.

Note that at this stage there is no need to determine the actual identity of each token (i.e., the particular letter, digit or symbol, or group of these, that corresponds to the token image), only the offset to the next occurrence of the same token in the scanned text. The offset number is the distance (number of tokens) to the next occurrence of the same token. If the token is unique within the text string, the offset is zero (0). The sequence of token offsets thus generated is a signature that can be used to identify the scanned text.

In some embodiments, the token offsets determined for a string of scanned tokens are compared to an index that indexes a corpus of electronic documents based upon the token offsets of their contents (Section 4.1.2). In other embodiments, the token offsets determined for a string of scanned tokens are converted to text, and compared to a more conventional index that indexes a corpus of electronic documents based upon their contents As has been noted earlier, a similar token-correlation process may be applied to speech fragments when the capture process consists of audio samples of spoken words.

9.7. Font/Character "Self-Recognition"

Conventional template-matching OCR compares scanned images to a library of character images. In essence, the alphabet is stored for each font and newly scanned images are compared to the stored images to find matching characters. The process generally has an initial delay until the correct font has been identified. After that, the OCR process is relatively quick because most documents use the same font throughout. Subsequent images can therefore be converted to text by comparison with the most recently identified font library.

The shapes of characters in most commonly used fonts are related. For example, in most fonts, the letter "c" and the letter "e" are visually related—as are "t" and "f," etc. The OCR process is enhanced by use of this relationship to construct templates for letters that have not been scanned yet. For example, where a reader scans a short string of text from a paper document in a previously unencountered font such that the system does not have a set of image templates with which to compare the scanned images the system can leverage the probable relationship between certain characters to construct the font template library even though it has not yet encountered all of the letters in the alphabet. The system can then use the constructed font template library to recognize subsequent scanned text and to further refine the constructed font library.

9.8. Send Anything Unrecognized (Including Graphics) to Server

When images cannot be machine-transcribed into a form suitable for use in a search process, the images themselves can be saved for later use by the user, for possible manual transcription, or for processing at a later date when different resources may be available to the system.

10. P-Commerce

Many of the actions made possible by the system result in some commercial transaction taking place. The phrase p-commerce is used herein to describe commercial activities initiated from paper via the system.

10.1. Sales of Documents from their Physical Printed Copies.

When a user captures text from a document, the user may be offered that document for purchase either in paper or electronic form. The user may also be offered related documents, such as those quoted or otherwise referred to in the paper document, or those on a similar subject, or those by the same author.

10.2. Sales of Anything Else Initiated or Aided by Paper

The capture of text may be linked to other commercial activities in a variety of ways. The captured text may be in a catalog that is explicitly designed to sell items, in which case the text will be associated fairly directly with the purchase of an item (Section 18.2). The text may also be part of an advertisement, in which case a sale of the item being advertised may ensue.

In other cases, the user captures other text from which their potential interest in a commercial transaction may be deduced. A reader of a novel set in a particular country, for example, might be interested in a holiday there. Someone reading a review of a new car might be considering purchasing it. The user may capture a particular fragment of text knowing that some commercial opportunity will be presented to them as a result, or it may be a side-effect of their capture activities.

10.3. Capture of Labels, Icons, Serial Numbers, Barcodes on an Item Resulting in a Sale Sometimes text or symbols are actually printed on an item or its packaging. An example is the serial number or product id often found on a label on the back or underside of a piece of electronic equipment. The system can offer the user a convenient way to purchase one or more of the same items by capturing that text. They may also be offered manuals, support or repair services.

10.4. Contextual Advertisements

In addition to the direct capture of text from an advertisement, the system allows for a new kind of advertising which is not necessarily explicitly in the rendered document, but is nonetheless based on what people are reading.

10.4.1. Advertising Based on Scan Context and History

In a traditional paper publication, advertisements generally consume a large amount of space relative to the text of a newspaper article, and a limited number of them can be placed around a particular article. In the described system, advertising can be associated with individual words or phrases, and can selected according to the particular interest the user has shown by capturing that text and possibly taking into account their history of past scans.

With the described system, it is possible for a purchase to be tied to a particular printed document and for an advertiser to get significantly more feedback about the effectiveness of their advertising in particular print publications.

10.4.2. Advertising Based on User Context and History

The system may gather a large amount of information about other aspects of a user's context for its own use (Section 13); estimates of the geographical location of the user are a good example. Such data can also be used to tailor the advertising presented to a user of the system.

10.5. Models of Compensation

The system enables some new models of compensation for advertisers and marketers. The publisher of a printed document containing advertisements may receive some income from a purchase that originated from their document. This may be true whether or not the advertisement existed in the original printed form; it may have been added electronically either by the publisher, the advertiser or some third party, and the sources of such advertising may have been subscribed to by the user.

10.5.1. Popularity-Based Compensation

Analysis of the statistics generated by the system can reveal the popularity of certain parts of a publication (Section 14.2). In a newspaper, for example, it might reveal the amount of time readers spend looking at a particular page or article, or the popularity of a particular columnist. In some circumstances, it may be appropriate for an author or publisher to receive compensation based on the activities of the readers rather than on more traditional metrics such as words written or number of copies distributed. An author whose work becomes a frequently read authority on a subject might be considered differently in future contracts from one whose books have sold the same number of copies but are rarely opened. (See also Section 7.6)

10.5.2. Popularity-Based Advertising

Decisions about advertising in a document may also be based on statistics about the readership. The advertising space around the most popular columnists may be sold at a premium rate. Advertisers might even be charged or compensated some time after the document is published based on knowledge about how it was received.

10.6. Marketing Based on Life Library

The "Life Library" or scan history described in Sections 6.1 and 16.1 can be an extremely valuable source of information about the interests and habits of a user. Subject to the appropriate consent and privacy issues, such data can inform offers of goods or services to the user. Even in an anonymous form, the statistics gathered can be exceedingly useful.

10.7. Sale/Information at Later Date (when Available)

Advertising and other opportunities for commercial transactions may not be presented to the user immediately at the time of text capture. For example, the opportunity to purchase a sequel to a novel may not be available at the time the user is reading the novel, but the system may present them with that opportunity when the sequel is published.

A user may capture data that relates to a purchase or other commercial transaction, but may choose not to initiate and/or complete the transaction at the time the capture is made. In some embodiments, data related to captures is stored in a user's Life Library, and these Life Library entries can remain "active" (i.e., capable of subsequent interactions similar to those available at the time the capture was made). Thus a user may review a capture at some later time, and optionally complete a transaction based on that capture. Because the system can keep track of when and where the original capture occurred, all parties involved in the transaction can be properly compensated. For example, the author who wrote the story—and the publisher who published the story—that appeared next to the advertisement from which the user captured data can be compensated when, six months later, the user visits their Life Library, selects that particular capture from the history, and chooses "Purchase this item at Barnes and Noble" from the pop-up menu (which can be similar or identical to the menu optionally presented at the time of the capture).

11. Operating System and Application Integration

Modern Operating Systems (OSs) and other software packages have many characteristics that can be advantageously exploited for use with the described system, and may also be modified in various ways to provide an even better platform for its use.

11.1. Incorporation of Scan and Print-Related Information in Metadata and Indexing New and upcoming file systems and their associated databases often have the ability to store a variety of metadata associated with each file. Traditionally, this metadata has included such things as the ID of the user who created the file, the dates of creation, last modification, and last use. Newer file systems allow such extra information as keywords, image characteristics, document sources and user comments to be stored, and in some systems this metadata can be arbitrarily extended. File systems can therefore be used to store information that would be useful in implementing the current system. For example, the date when a given document was last printed can be stored by the file system, as can details about which text from it has been captured from paper using the described system, and when and by whom.

Operating systems are also starting to incorporate search engine facilities that allow users to find local files more easily. These facilities can be advantageously used by the system. It means that many of the search-related concepts discussed in Sections 3 and 4 apply not just to today's Internet-based and similar search engines, but also to every personal computer.

In some cases specific software applications will also include support for the system above and beyond the facilities provided by the OS.

11.2. OS Support for Capture Devices

As the use of capture devices such as pen scanners becomes increasingly common, it will become desirable to build support for them into the operating system, in much the same way as support is provided for mice and printers, since the applicability of capture devices extends beyond a single software application. The same will be true for other aspects of the system's operation. Some examples are discussed below. In some embodiments, the entire described system, or the core of it, is provided by the OS. In some embodiments, support for the system is provided by Application Programming Interfaces (APIs) that can be used by other software packages, including those directly implementing aspects of the system.

11.2.1. Support for OCR and Other Recognition Technologies

Most of the methods of capturing text from a rendered document require some recognition software to interpret the source data, typically a scanned image or some spoken words, as text suitable for use in the system. Some OSs include support for speech or handwriting recognition, though it is less common for OSs to include support for OCR, since in the past the use of OCR has typically been limited to a small range of applications.

As recognition components become part of the OS, they can take better advantage of other facilities provided by the OS. Many systems include spelling dictionaries, grammar analysis tools, internationalization and localization facilities, for example, all of which can be advantageously employed by the described system for its recognition process, especially since they may have been customized for the particular user to include words and phrases that he/she would commonly encounter.

If the operating system includes full-text indexing facilities, then these can also be used to inform the recognition process, as described in Section 9.3.

11.2.2. Action to be Taken on Scans

If an optical scan or other capture occurs and is presented to the OS, it may have a default action to be taken under those circumstances in the event that no other subsystem claims ownership of the capture. An example of a default action is presenting the user with a choice of alternatives, or submitting the captured text to the OS's built-in search facilities.

11.2.3. OS has Default Action for Particular Documents or Document Types

If the digital source of the rendered document is found, the OS may have a standard action that it will take when that particular document, or a document of that class, is scanned. Applications and other subsystems may register with the OS as potential handlers of particular types of capture, in a similar manner to the announcement by applications of their ability to handle certain file types.

Markup data associated with a rendered document, or with a capture from a document, can include instructions to the operating system to launch specific applications, pass applications arguments, parameters, or data, etc.

11.2.4. Interpretation of Gestures and Mapping into Standard Actions

In Section 12.1.3 the use of "gestures" is discussed, particularly in the case of optical scanning, where particular movements made with a handheld scanner might represent standard actions such as marking the start and end of a region of text.

This is analogous to actions such as pressing the shift key on a keyboard while using the cursor keys to select a region of text, or using the wheel on a mouse to scroll a document. Such actions by the user are sufficiently standard that they are interpreted in a system-wide way by the OS, thus ensuring consistent behavior. The same is desirable for scanner gestures and other scanner-related actions.

11.2.5. Set Response to Standard (and Non-Standard) Iconic/Text Printed Menu Items In a similar way, certain items of text or other symbols may, when scanned, cause standard actions to occur, and the OS may provide a selection of these. An example might be that scanning the text "[print]" in any document would cause the OS to retrieve and print a copy of that document. The OS may also provide a way to register such actions and associate them with particular scans.

11.3. Support in System GUI Components for Typical Scan-Initiated Activities Most software applications are based substantially on standard Graphical User Interface components provided by the OS.

Use of these components by developers helps to ensure consistent behavior across multiple packages, for example that pressing the left-cursor key in any text-editing context should move the cursor to the left, without every programmer having to implement the same functionality independently.

A similar consistency in these components is desirable when the activities are initiated by text-capture or other aspects of the described system. Some examples are given below.

11.3.1. Interface to Find Particular Text Content

A typical use of the system may be for the user to scan an area of a paper document, and for the system to open the electronic counterpart in a software package that is able to display or edit it, and cause that package to scroll to and highlight the scanned text (Section 12.2.1). The first part of this process, finding and opening the electronic document, is typically provided by the OS and is standard across software packages. The second part, however—locating a particular piece of text within a document and causing the package to scroll to it and highlight it—is not yet standardized and is often implemented differently by each package. The availability of a standard API for this functionality could greatly enhance the operation of this aspect of the system.

11.3.2. Text Interactions

Once a piece of text has been located within a document, the system may wish to perform a variety of operations upon that text. As an example, the system may request the surrounding text, so that the user's capture of a few words could result in the system accessing the entire sentence or paragraph containing them. Again, this functionality can be usefully provided by the OS rather than being implemented in every piece of software that handles text.

11.3.3. Contextual (Popup) Menus

Some of the operations that are enabled by the system will require user feedback, and this may be optimally requested within the context of the application handling the data. In some embodiments, the system uses the application pop-up menus traditionally associated with clicking the right mouse button on some text. The system inserts extra options into such menus, and causes them to be displayed as a result of activities such as scanning a paper document.

11.4. Web/Network Interfaces

In today's increasingly networked world, much of the functionality available on individual machines can also be accessed over a network, and the functionality associated with the described system is no exception. As an example, in an office environment, many paper documents received by a user may have been printed by other users' machines on the same corporate network. The system on one computer, in response to a capture, may be able to query those other machines for documents which may correspond to that capture, subject to the appropriate permission controls.

11.5. Printing of Document Causes Saving

An important factor in the integration of paper and digital documents is maintaining as much information as possible about the transitions between the two. In some embodiments, the OS keeps a simple record of when any document was printed and by whom. In some embodiments, the OS takes one or more further actions that would make it better suited for use with the system. Examples include:

- Saving the digital rendered version of every document printed along with information about the source from which it was printed
- Saving a subset of useful information about the printed version—for example, the fonts used and where the line breaks occur—which might aid future scan interpretation
- Saving the version of the source document associated with any printed copy
- Indexing the document automatically at the time of printing and storing the results for future searching

11.6. My (Printed/Scanned) Documents

An OS often maintains certain categories of folders or files that have particular significance. A user's documents may, by convention or design, be found in a "My Documents" folder, for example. Standard file-opening dialogs may automatically include a list of recently opened documents.

On an OS optimized for use with the described system, such categories may be enhanced or augmented in ways that take into account a user's interaction with paper versions of the stored files. Categories such as "My Printed Documents" or "My Recently-Read Documents" might usefully be identified and incorporated in its operations.

11.7. OS-Level Markup Hierarchies

Since important aspects of the system are typically provided using the "markup" concepts discussed in Section 5, it would clearly be advantageous to have support for such markup provided by the OS in a way that was accessible to multiple applications as well as to the OS itself. In addition, layers of markup may be provided by the OS, based on its own knowledge of documents under its control and the facilities it is able to provide.

11.8. Use of OS DRM Facilities

An increasing number of operating systems support some form of "Digital Rights Management": the ability to control the use of particular data according to the rights granted to a particular user, software entity or machine. It may inhibit unauthorized copying or distribution of a particular document, for example.

12. User Interface

The user interface of the system may be entirely on a PC, if the capture device is relatively dumb and is connected to it by a cable, or entirely on the device, if it is sophisticated and with significant processing power of its own. In some cases, some functionality resides in each component. Part, or indeed all, of the system's functionality may also be implemented on other devices such as mobile phones or PDAs.

The descriptions in the following sections are therefore indications of what may be desirable in certain implementations, but they are not necessarily appropriate for all and may be modified in several ways.

12.1. On the Capture Device

With all capture devices, but particularly in the case of an optical scanner, the user's attention will generally be on the device and the paper at the time of scanning. It is very desirable, then, that any input and feedback needed as part of the process of scanning do not require the user's attention to be elsewhere, for example on the screen of a computer, more than is necessary.

12.1.1. Feedback on Scanner

A handheld scanner may have a variety of ways of providing feedback to the user about particular conditions. The most obvious types are direct visual, where the scanner incorporates indicator lights or even a full display, and auditory, where the scanner can make beeps, clicks or other sounds. Important alternatives include tactile feedback, where the scanner can vibrate, buzz, or otherwise stimulate the user's sense of touch, and projected feedback, where it indicates a status by projecting onto the paper anything from a colored spot of light to a sophisticated display.

Important immediate feedback that may be provided on the device includes:

- feedback on the scanning process—user scanning too fast, at too great an angle, or drifting too high or low on a particular line
- sufficient content—enough has been scanned to be pretty certain of finding a match if one exists—important for disconnected operation
- context known—a source of the text has been located
- unique context known—one unique source of the text has been located
- availability of content—indication of whether the content is freely available to the user, or at a cost Many of the user interactions normally associated with the later stages of the system may also take place on the capture device if it has sufficient abilities, for example, to display part or all of a document.

12.1.2. Controls on Scanner

The device may provide a variety of ways for the user to provide input in addition to basic text capture. Even when the device is in close association with a host machine that has input options such as keyboards and mice, it can be disruptive for the user to switch back and forth between manipulating the scanner and using a mouse, for example.

The handheld scanner may have buttons, scroll/jog-wheels, touch-sensitive surfaces, and/or accelerometers for detecting the movement of the device. Some of these allow a richer set of interactions while still holding the scanner.

For example, in response to scanning some text, the system presents the user with a set of several possible matching documents. The user uses a scroll-wheel on the side of the scanner is to select one from the list, and clicks a button to confirm the selection.

12.1.3. Gestures

The primary reason for moving a scanner across the paper is to capture text, but some movements may be detected by the device and used to indicate other user intentions. Such movements are referred to herein as "gestures."

As an example, the user can indicate a large region of text by scanning the first few words in conventional left-to-right order, and the last few in reverse order, i.e. right to left. The user can also indicate the vertical extent of the text of interest by moving the scanner down the page over several lines. A backwards scan might indicate cancellation of the previous scan operation.

12.1.4. Online/Offline Behavior

Many aspects of the system may depend on network connectivity, either between components of the system such as a scanner and a host laptop, or with the outside world in the form of a connection to corporate databases and Internet search. This connectivity may not be present all the time, however, and so there will be occasions when part or all of the system may be considered to be "offline." It is desirable to allow the system to continue to function usefully in those circumstances.

The device may be used to capture text when it is out of contact with other parts of the system. A very simple device may simply be able to store the image or audio data associated with the capture, ideally with a timestamp indicating when it was captured. The various captures may be uploaded to the rest of the system when the device is next in contact with it, and handled then. The device may also upload other data associated with the captures, for example voice annotations associated with optical scans, or location information.

More sophisticated devices may be able to perform some or all of the system operations themselves despite being disconnected. Various techniques for improving their ability to do so are discussed in Section 15.3. Often it will be the case that some, but not all, of the desired actions can be performed while offline. For example, the text may be recognized, but identification of the source may depend on a connection to an Internet-based search engine. In some embodiments, the device therefore stores sufficient information about how far each operation has progressed for the rest of the system to proceed efficiently when connectivity is restored.

The operation of the system will, in general, benefit from immediately available connectivity, but there are some situations in which performing several captures and then processing them as a batch can have advantages. For example, as discussed in Section 13 below, the identification of the source of a particular capture may be greatly enhanced by examining other captures made by the user at approximately the same time. In a fully connected system where live feedback is being provided to the user, the system is only able to use past captures when processing the current one. If the capture is one of a batch stored by the device when offline, however, the system will be able to take into account any data available from later captures as well as earlier ones when doing its analysis.

12.2. On a Host Device

A scanner will often communicate with some other device, such as a PC, PDA, phone or digital camera to perform many of the functions of the system, including more detailed interactions with the user.

12.2.1. Activities Performed in Response to a Capture

When the host device receives a capture, it may initiate a variety of activities. An incomplete list of possible activities performed by the system after locating and electronic counterpart document associated with the capture and a location within that document follows.

- The details of the capture may be stored in the user's history. (Section 6.1)
- The document may be retrieved from local storage or a remote location. (Section 8)
- The operating system's metadata and other records associated with the document may be updated. (Section 11.1)
- Markup associated with the document may be examined to determine the next relevant operations. (Section 5)
- A software application may be started to edit, view or otherwise operate on the document. The choice of application may depend on the source document, or on the contents of the scan, or on some other aspect of the capture. (Section 11.2.2, 11.2.3)
- The application may scroll to, highlight, move the insertion point to, or otherwise indicate the location of the capture. (Section 11.3)

The precise bounds of the captured text may be modified, for example to select whole words, sentences or paragraphs around the captured text. (Section 11.3.2)

The user may be given the option to copy the capture text to the clipboard or perform other standard operating system or application-specific operations upon it.

Annotations may be associated with the document or the captured text. These may come from immediate user input, or may have been captured earlier, for example in the case of voice annotations associated with an optical scan. (Section 19.4)

Markup may be examined to determine a set of further possible operations for the user to select.

12.2.2. Contextual Popup Menus

Sometimes the appropriate action to be taken by the system will be obvious, but sometimes it will require a choice to be made by the user. One good way to do this is through the use of "popup menus" or, in cases where the content is also being displayed on a screen, with so-called "contextual menus" that appear close to the content. (See Section 11.3.3). In some embodiments, the scanner device projects a popup menu onto the paper document. A user may select from such menus using traditional methods such as a keyboard and mouse, or by using controls on the capture device (Section 12.1.2), gestures (Section 12.1.3), or by interacting with the computer display using the scanner (Section 12.2.4). In some embodiments, the popup menus which can appear as a result of a capture include default items representing actions which occur if the user does not respond—for example, if the user ignores the menu and makes another capture.

12.2.3. Feedback on Disambiguation

When a user starts capturing text, there will initially be several documents or other text locations that it could match. As more text is captured, and other factors are taken into account (Section 13), the number of candidate locations will decrease until the actual location is identified, or further disambiguation is not possible without user input. In some embodiments, the system provides a real-time display of the documents or the locations found, for example in list, thumbnail-image or text-segment form, and for the number of elements in that display to reduce in number as capture continues. In some embodiments, the system displays thumbnails of all candidate documents, where the size or position of the thumbnail is dependent on the probability of it being the correct match.

When a capture is unambiguously identified, this fact may be emphasized to the user, for example using audio feedback.

Sometimes the text captured will occur in many documents and will be recognized to be a quotation. The system may indicate this on the screen, for example by grouping documents containing a quoted reference around the original source document.

12.2.4. Scanning from Screen

Some optical scanners may be able to capture text displayed on a screen as well as on paper. Accordingly, the term rendered document is used herein to indicate that printing onto paper is not the only form of rendering, and that the capture of text or symbols for use by the system may be equally valuable when that text is displayed on an electronic display.

The user of the described system may be required to interact with a computer screen for a variety of other reasons, such as to select from a list of options. It can be inconvenient for the user to put down the scanner and start using the mouse or keyboard. Other sections have described physical controls on the scanner (Section 12.1.2) or gestures (Section 12.1.3) as methods of input which do not require this change of tool, but using the scanner on the screen itself to scan some text or symbol is an important alternative provided by the system.

In some embodiments, the optics of the scanner allow it to be used in a similar manner to a light-pen, directly sensing its position on the screen without the need for actual scanning of text, possibly with the aid of special hardware or software on the computer.

13. Context Interpretation

An important aspect of the described system is the use of other factors, beyond the simple capture of a string of text, to help identify the document in use. A capture of a modest amount of text may often identify the document uniquely, but in many situations it will identify a few candidate documents. One solution is to prompt the user to confirm the document being scanned, but a preferable alternative is to make use of other factors to narrow down the possibilities automatically. Such supplemental information can dramatically reduce the amount of text that needs to be captured and/or increase the reliability and speed with which the location in the electronic counterpart can be identified. This extra material is referred to as "context," and it was discussed briefly in Section 4.2.2. We now consider it in more depth.

13.1. System and Capture Context

Perhaps the most important example of such information is the user's capture history.

It is highly probable that any given capture comes from the same document as the previous one, or from an associated document, especially if the previous capture took place in the last few minutes (Section 6.1.2). Conversely, if the system detects that the font has changed between two scans, it is more likely that they are from different documents.

Also useful are the user's longer-term capture history and reading habits. These can also be used to develop a model of the user's interests and associations.

13.2. User's Real-World Context

Another example of useful context is the user's geographical location. A user in Paris is much more likely to be reading Le Monde than the Seattle Times, for example. The timing, size and geographical distribution of printed versions of the documents can therefore be important, and can to some degree be deduced from the operation of the system.

The time of day may also be relevant, for example in the case of a user who always reads one type of publication on the way to work, and a different one at lunchtime or on the train going home.

13.3. Related Digital Context

The user's recent use of electronic documents, including those searched for or retrieved by more conventional means, can also be a helpful indicator.

In some cases, such as on a corporate network, other factors may be usefully considered:

Which documents have been printed recently?
Which documents have been modified recently on the corporate file server?
Which documents have been emailed recently?

All of these examples might suggest that a user was more likely to be reading a paper version of those documents. In contrast, if the repository in which a document resides can affirm that the document has never been printed or sent anywhere where it might have been printed, then it can be safely eliminated in any searches originating from paper.

13.4. Other Statistics—the Global Context

Section 14 covers the analysis of the data stream resulting from paper-based searches, but it should be noted here that statistics about the popularity of documents with other readers, about the timing of that popularity, and about the parts of documents most frequently scanned are all examples of further factors which can be beneficial in the search process. The system brings the possibility of Google-type page-ranking to the world of paper.

See also Section 4.2.2 for some other implications of the use of context for search engines.

14. Data-Stream Analysis

The use of the system generates an exceedingly valuable data-stream as a side effect. This stream is a record of what users are reading and when, and is in many cases a record of what they find particularly valuable in the things they read. Such data has never really been available before for paper documents.

Some ways in which this data can be useful for the system, and for the user of the system, are described in Section 6.1. This section concentrates on its use for others. There are, of course, substantial privacy issues to be considered with any distribution of data about what people are reading, but such issues as preserving the anonymity of data are well known to those of skill in the art.

14.1. Document Tracking

When the system knows which documents any given user is reading, it can also deduce who is reading any given document. This allows the tracking of a document through an organization, to allow analysis, for example, of who is reading it and when, how widely it was distributed, how long that distribution took, and who has seen current versions while others are still working from out-of-date copies.

For published documents that have a wider distribution, the tracking of individual copies is more difficult, but the analysis of the distribution of readership is still possible.

14.2. Read Ranking—Popularity of Documents and Sub-Regions

In situations where users are capturing text or other data that is of particular interest to them, the system can deduce the popularity of certain documents and of particular sub-regions of those documents. This forms a valuable input to the system itself (Section 4.2.2) and an important source of information for authors, publishers and advertisers (Section 7.6, Section 10.5). This data is also useful when integrated in search engines and search indices—for example, to assist in ranking search results for queries coming from rendered documents, and/or to assist in ranking conventional queries typed into a web browser.

14.3. Analysis of Users—Building Profiles

Knowledge of what a user is reading enables the system to create a quite detailed model of the user's interests and activities. This can be useful on an abstract statistical basis—"35% of users who buy this newspaper also read the latest book by that author"—but it can also allow other interactions with the individual user, as discussed below.

14.3.1. Social Networking

One example is connecting one user with others who have related interests. These may be people already known to the user. The system may ask a university professor, "Did you know that your colleague at XYZ University has also just read this paper?" The system may ask a user, "Do you want to be linked up with other people in your neighborhood who are also how reading Jane Eyre?" Such links may be the basis for the automatic formation of book clubs and similar social structures, either in the physical world or online.

14.3.2. Marketing

Section 10.6 has already mentioned the idea of offering products and services to an individual user based on their interactions with the system. Current online booksellers, for example, often make recommendations to a user based on their previous interactions with the bookseller. Such recommendations become much more useful when they are based on interactions with the actual books.

14.4. Marketing Based on Other Aspects of the Data-Stream

We have discussed some of the ways in which the system may influence those publishing documents, those advertising through them, and other sales initiated from paper (Section 10). Some commercial activities may have no direct interaction with the paper documents at all and yet may be influenced by them. For example, the knowledge that people in one community spend more time reading the sports section of the newspaper than they do the financial section might be of interest to somebody setting up a health club.

14.5. Types of Data that May be Captured

In addition to the statistics discussed, such as who is reading which bits of which documents, and when and where, it can be of interest to examine the actual contents of the text captured, regardless of whether or not the document has been located.

In many situations, the user will also not just be capturing some text, but will be causing some action to occur as a result. It might be emailing a reference to the document to an acquaintance, for example. Even in the absence of information about the identity of the user or the recipient of the email, the knowledge that somebody considered the document worth emailing is very useful.

In addition to the various methods discussed for deducing the value of a particular document or piece of text, in some circumstances the user will explicitly indicate the value by assigning it a rating.

Lastly, when a particular set of users are known to form a group, for example when they are known to be employees of a particular company, the aggregated statistics of that group can be used to deduce the importance of a particular document to that group.

15. Device Features and Functions

A capture device for use with the system needs little more than a way of capturing text from a rendered version of the document. As described earlier (Section 1.2), this capture may be achieved through a variety of methods including taking a photograph of part of the document or typing some words into a mobile phone keypad. This capture may be achieved using a small hand-held optical scanner capable of recording a line or two of text at a time, or an audio capture device such as a voice-recorder into which the user is reading text from the document. The device used may be a combination of these—an optical scanner which could also record voice annotations, for example—and the capturing functionality may be built into some other device such as a mobile phone, PDA, digital camera or portable music player.

15.1. Input and Output

Many of the possibly beneficial additional input and output facilities for such a device have been described in Section 12.1. They include buttons, scroll-wheels and touch-pads for input, and displays, indicator lights, audio and tactile transducers for output. Sometimes the device will incorporate many of these, sometimes very few. Sometimes the capture device will be able to communicate with another device that already has them (Section 15.6), for example using a wireless link, and sometimes the capture functionality will be incorporated into such other device (Section 15.7).

15.2. Connectivity

In some embodiments, the device implements the majority of the system itself. In some embodiments, however, it often communicates with a PC or other computing device and with the wider world using communications facilities.

Often these communications facilities are in the form of a general-purpose data network such as Ethernet, 802.11 or UWB or a standard peripheral-connecting network such as USB, IEEE-1394 (Firewire), Bluetooth™ or infra-red. When a wired connection such as Firewire or USB is used, the device may receive electrical power though the same connection. In some circumstances, the capture device may appear to a connected machine to be a conventional peripheral such as a USB storage device.

Lastly, the device may in some circumstances "dock" with another device, either to be used in conjunction with that device or for convenient storage.

15.3. Caching and Other Online/Offline Functionality

Sections 3.5 and 12.1.4 have raised the topic of disconnected operation. When a capture device has a limited subset of the total system's functionality, and is not in communication with the other parts of the system, the device can still be useful, though the functionality available will sometimes be reduced. At the simplest level, the device can record the raw image or audio data being captured and this can be processed later. For the user's benefit, however, it can be important to give feedback where possible about whether the data captured is likely to be sufficient for the task in hand, whether it can be recognized or is likely to be recognizable, and whether the source of the data can be identified or is likely to be identifiable later. The user will then know whether their capturing activity is worthwhile. Even when all of the above are unknown, the raw data can still be stored so that, at the very least, the user can refer to them later. The user may be presented with the image of a scan, for example, when the scan cannot be recognized by the OCR process.

To illustrate some of the range of options available, both a rather minimal optical scanning device and then a much more full-featured one are described below. Many devices occupy a middle ground between the two.

15.3.1. The Simplescanner—A Low-End Offline Example

The SimpleScanner has a scanning head able to read pixels from the page as it is moved along the length of a line of text. It can detect its movement along the page and record the pixels with some information about the movement. It also has a clock, which allows each scan to be time-stamped. The clock is synchronized with a host device when the SimpleScanner has connectivity. The clock may not represent the actual time of day, but relative times may be determined from it so that the host can deduce the actual time of a scan, or at worst the elapsed time between scans.

The SimpleScanner does not have sufficient processing power to perform any OCR itself, but it does have some basic knowledge about typical word-lengths, word-spacings, and their relationship to font size. It has some basic indicator lights which tell the user whether the scan is likely to be readable, whether the head is being moved too fast, too slowly or too inaccurately across the paper, and when it determines that sufficient words of a given size are likely to have been scanned for the document to be identified.

The SimpleScanner has a USB connector and can be plugged into the USB port on a computer, where it will be recharged. To the computer it appears to be a USB storage device on which time-stamped data files have been recorded, and the rest of the system software takes over from this point.

15.3.2. The Superscanner—A High-End Offline Example

The SuperScanner also depends on connectivity for its full operation, but it has a significant amount of on-board storage and processing which can help it make better judgments about the data captured while offline.

As it moves along the line of text, the captured pixels are stitched together and passed to an OCR engine that attempts to recognize the text. A number of fonts, including those from the user's most-read publications, have been downloaded to it to help perform this task, as has a dictionary that is synchronized with the user's spelling-checker dictionary on their PC and so contains many of the words they frequently encounter. Also stored on the scanner is a list of words and phrases with the typical frequency of their use—this may be combined with the dictionary. The scanner can use the frequency statistics both to help with the recognition process and also to inform its judgment about when a sufficient quantity of text has been captured; more frequently used phrases are less likely to be useful as the basis for a search query.

In addition, the full index for the articles in the recent issues of the newspapers and periodicals most commonly read by the user are stored on the device, as are the indices for the books the user has recently purchased from an online bookseller, or from which the user has scanned anything within the last few months. Lastly, the titles of several thousand of the most popular publications which have data available for the system are stored so that, in the absence of other information the user can scan the title have a good idea as to whether or not captures from a particular work are likely to be retrievable in electronic form later.

During the scanning process, the system informs user that the captured data has been of sufficient quality and of a sufficient nature to make it probable that the electronic copy can be retrieved when connectivity is restored. Often the system indicates to the user that the scan is known to have been successful and that the context has been recognized in one of the on-board indices, or that the publication concerned is known to be making its data available to the system, so the later retrieval ought to be successful.

The SuperScanner docks in a cradle connected to a PC's Firewire or USB port, at which point, in addition to the upload of captured data, its various onboard indices and other databases are updated based on recent user activity and new publications. It also has the system to connect to wireless public networks or to communicate via Bluetooth to a mobile phone and thence with the public network when such facilities are available.

15.4. Features for Optical Scanning

We now consider some of the features that may be particularly desirable in an optical scanner device.

15.4.1. Flexible Positioning and Convenient Optics

One of the reasons for the continuing popularity of paper is the ease of its use in a wide variety of situations where a computer, for example, would be impractical or inconvenient. A device intended to capture a substantial part of a user's interaction with paper should therefore be similarly convenient in use. This has not been the case for scanners in the past; even the smallest hand-held devices have been somewhat unwieldy. Those designed to be in contact with the page have to be held at a precise angle to the paper and moved very carefully along the length of the text to be scanned. This is acceptable when scanning a business report on an office desk, but may be impractical when scanning a phrase from a novel while waiting for a train. Scanners based on camera-type optics that operate at a distance from the paper may similarly be useful in some circumstances.

Some embodiments of the system use a scanner that scans in contact with the paper, and which, instead of lenses, uses an image conduit a bundle of optical fibers to transmit the image from the page to the optical sensor device. Such a device can be shaped to allow it to be held in a natural position; for example, in some embodiments, the part in contact with the page is wedge-shaped, allowing the user's hand to move more naturally over the page in a movement similar to the use of a highlighter pen. The conduit is either in direct contact with the paper or in close proximity to it, and may have a replaceable transparent tip that can protect the image conduit from possible damage. As has been mentioned in Section 12.2.4, the scanner may be used to scan from a screen as well as from paper, and the material of the tip can be chosen to reduce the likelihood of damage to such displays.

Lastly, some embodiments of the device will provide feedback to the user during the scanning process which will indicate through the use of light, sound or tactile feedback when the user is scanning too fast, too slow, too unevenly or is drifting too high or low on the scanned line.

15.5. Security, Identity, Authentication, Personalization and Billing

As described in Section 6, the capture device may form an important part of identification and authorization for secure transactions, purchases, and a variety of other operations. It may therefore incorporate, in addition to the circuitry and software required for such a role, various hardware features that can make it more secure, such as a smartcard reader, RFID, or a keypad on which to type a PIN.

It may also include various biometric sensors to help identify the user. In the case of an optical scanner, for example, the scanning head may also be able to read a fingerprint. For a voice recorder, the voice pattern of the user may be used.

15.6. Device Associations

In some embodiments, the device is able to form an association with other nearby devices to increase either its own or their functionality. In some embodiments, for example, it uses the display of a nearby PC or phone to give more detailed feedback about its operation, or uses their network connectivity. The device may, on the other hand, operate in its role as a security and identification device to authenticate operations performed by the other device. Or it may simply form an association in order to function as a peripheral to that device.

An interesting aspect of such associations is that they may be initiated and authenticated using the capture facilities of the device. For example, a user wishing to identify themselves securely to a public computer terminal may use the scanning facilities of the device to scan a code or symbol displayed on a particular area of the terminal's screen and so effect a key transfer. An analogous process may be performed using audio signals picked up by a voice-recording device.

15.7. Integration with Other Devices

In some embodiments, the functionality of the capture device is integrated into some other device that is already in use. The integrated devices may be able to share a power supply, data capture and storage capabilities, and network interfaces. Such integration may be done simply for convenience, to reduce cost, or to enable functionality that would not otherwise be available.

Some examples of devices into which the capture functionality can be integrated include:

an existing peripheral such as a mouse, a stylus, a USB "webcam" camera, a Bluetooth™ headset or a remote control another processing/storage device, such as a PDA, an MP3 player, a voice recorder, a digital camera or a mobile phone other often-carried items, just for convenience—a watch, a piece of jewelry, a pen, a car key fob

15.7.1. Mobile Phone Integration

As an example of the benefits of integration, we consider the use of a modified mobile phone as the capture device.

In some embodiments, the phone hardware is not modified to support the system, such as where the text capture can be adequately done through voice recognition, where they can either be processed by the phone itself, or handled by a system at the other end of a telephone call, or stored in the phone's memory for future processing. Many modern phones have the ability to download software that could implement some parts of the system. Such voice capture is likely to be suboptimal in many situations, however, for example when there is substantial background noise, and accurate voice recognition is a difficult task at the best of times. The audio facilities may best be used to capture voice annotations.

In some embodiments, the camera built into many mobile phones is used to capture an image of the text. The phone display, which would normally act as a viewfinder for the camera, may overlay on the live camera image information about the quality of the image and its suitability for OCR, which segments of text are being captured, and even a transcription of the text if the OCR can be performed on the phone.

In some embodiments, the phone is modified to add dedicated capture facilities, or to provide such functionality in a clip-on adaptor or a separate Bluetooth-connected peripheral in communication with the phone. Whatever the nature of the capture mechanism, the integration with a modern cellphone has many other advantages. The phone has connectivity with the wider world, which means that queries can be submitted to remote search engines or other parts of the system, and copies of documents may be retrieved for immediate storage or viewing. A phone typically has sufficient processing power for many of the functions of the system to be performed locally, and sufficient storage to capture a reasonable amount of data. The amount of storage can also often be expanded by the user. Phones have reasonably good displays and audio facilities to provide user feedback, and often a vibrate function for tactile feedback. They also have good power supplies.

Most significantly of all, they are a device that most users are already carrying.

Part III—Example Applications of the System

This section lists example uses of the system and applications that may be built on it. This list is intended to be purely illustrative and in no sense exhaustive.

16. Personal Applications

16.1. Life Library

The Life Library (see also Section 6.1.1) is a digital archive of any important documents that the subscriber wishes to save and is a set of embodiments of services of this system. Important books, magazine articles, newspaper clippings, etc., can all be saved in digital form in the Life Library. Additionally, the subscriber's annotations, comments, and notes can be saved with the documents. The Life Library can be accessed via the Internet and World Wide Web.

The system creates and manages the Life Library document archive for subscribers. The subscriber indicates which documents the subscriber wishes to have saved in his life library by scanning information from the document or by otherwise indicating to the system that the particular document is to be added to the subscriber's Life Library. The scanned information is typically text from the document but can also be a barcode or other code identifying the document. The system accepts the code and uses it to identify the source document. After the document is identified the system can store either a copy of the document in the user's Life Library or a link to a source where the document may be obtained.

One embodiment of the Life Library system can check whether the subscriber is authorized to obtain the electronic copy. For example, if a reader scans text or an identifier from a copy of an article in the New York Times (NYT) so that the article will be added to the reader's Life Library, the Life Library system will verify with the NYT whether the reader is subscribed to the online version of the NYT; if so, the reader gets a copy of the article stored in his Life Library account; if not, information identifying the document and how to order it is stored in his Life Library account.

In some embodiments, the system maintains a subscriber profile for each subscriber that includes access privilege information. Document access information can be compiled in several ways, two of which are: 1) the subscriber supplies the document access information to the Life Library system, along with his account names and passwords, etc., or 2) the Life Library service provider queries the publisher with the subscriber's information and the publisher responds by providing access to an electronic copy if the Life Library subscriber is authorized to access the material. If the Life Library subscriber is not authorized to have an electronic copy of the document, the publisher provides a price to the Life Library service provider, which then provides the customer with the option to purchase the electronic document. If so, the Life Library service provider either pays the publisher directly and bills the Life Library customer later or the Life Library service provider immediately bills the customer's credit card for the purchase. The Life Library service provider would get a percentage of the purchase price or a small fixed fee for facilitating the transaction.

The system can archive the document in the subscriber's personal library and/or any other library to which the subscriber has archival privileges. For example, as a user scans text from a printed document, the Life Library system can identify the rendered document and its electronic counterpart. After the source document is identified, the Life Library system might record information about the source document in the user's personal library and in a group library to which the subscriber has archival privileges. Group libraries are collaborative archives such as a document repository for: a group working together on a project, a group of academic researchers, a group web log, etc.

The life library can be organized in many ways: chronologically, by topic, by level of the subscriber's interest, by type of publication (newspaper, book, magazine, technical paper, etc.), where read, when read, by ISBN or by Dewey decimal, etc. In one alternative, the system can learn classifications based on how other subscribers have classified the same document. The system can suggest classifications to the user or automatically classify the document for the user.

In various embodiments, annotations may be inserted directly into the document or may be maintained in a separate file. For example, when a subscriber scans text from a newspaper article, the article is archived in his Life Library with the scanned text highlighted. Alternatively, the article is archived in his Life Library along with an associated annotation file (thus leaving the archived document unmodified). Embodiments of the system can keep a copy of the source document in each subscriber's library, a copy in a master library that many subscribers can access, or link to a copy held by the publisher.

In some embodiments, the Life Library stores only the user's modifications to the document (e.g., highlights, etc.) and a link to an online version of the document (stored elsewhere). The system or the subscriber merges the changes with the document when the subscriber subsequently retrieves the document.

If the annotations are kept in a separate file, the source document and the annotation file are provided to the subscriber and the subscriber combines them to create a modified document. Alternatively, the system combines the two files prior to presenting them to the subscriber. In another alternative, the annotation file is an overlay to the document file and can be overlaid on the document by software in the subscriber's computer.

Subscribers to the Life Library service pay a monthly fee to have the system maintain the subscriber's archive. Alternatively, the subscriber pays a small amount (e.g., a micropayment) for each document stored in the archive. Alternatively, the subscriber pays to access the subscriber's archive on a per-access fee. Alternatively, subscribers can compile libraries and allow others to access the materials/annotations on a revenue share model with the Life Library service provider and copyright holders. Alternatively, the Life Library service provider receives a payment from the publisher when the Life Library subscriber orders a document (a revenue share model with the publisher, where the Life Library service provider gets a share of the publisher's revenue).

In some embodiments, the Life Library service provider acts as an intermediary between the subscriber and the copyright holder (or copyright holder's agent, such as the Copyright Clearance Center, a.k.a. CCC) to facilitate billing and payment for copyrighted materials. The Life Library service provider uses the subscriber's billing information and other user account information to provide this intermediation service. Essentially, the Life Library service provider leverages the pre-existing relationship with the subscriber to enable purchase of copyrighted materials on behalf of the subscriber.

In some embodiments, the Life Library system can store excerpts from documents. For example, when a subscriber scans text from a paper document, the regions around the scanned text are excerpted and placed in the Life Library, rather than the entire document being archived in the life library. This is especially advantageous when the document is long because preserving the circumstances of the original scan prevents the subscriber from re-reading the document to find the interesting portions. Of course, a hyperlink to the entire electronic counterpart of the paper document can be included with the excerpt materials.

In some embodiments, the system also stores information about the document in the Life Library, such as author, publication title, publication date, publisher, copyright holder (or copyright holder's licensing agent), ISBN, links to public annotations of the document, readrank, etc. Some of this additional information about the document is a form of paper document metadata. Third parties may create public annotation files for access by persons other than themselves, such the general public. Linking to a third party's commentary on a document is advantageous because reading annotation files of other users enhances the subscriber's understanding of the document.

In some embodiments, the system archives materials by class. This feature allows a Life Library subscriber to quickly store electronic counterparts to an entire class of paper documents without access to each paper document. For example, when the subscriber scans some text from a copy of National Geographic magazine, the system provides the subscriber with the option to archive all back issues of the National Geographic. If the subscriber elects to archive all back issues, the Life Library service provider would then verify with the National Geographic Society whether the subscriber is authorized to do so. If not, the Life Library service provider can mediate the purchase of the right to archive the National Geographic magazine collection.

16.2. Life Saver

A variation on, or enhancement of, the Life Library concept is the "Life Saver," where the system uses the text captured by a user to deduce more about their other activities. The scanning of a menu from a particular restaurant, a program from a particular theater performance, a timetable at a particular railway station, or an article from a local newspaper allows the system to make deductions about the user's location and social activities, and could construct an automatic diary for them, for example as a website. The user would be able to edit and modify the diary, add additional materials such as photographs and, of course, look again at the items scanned.

17. Academic Applications

Portable scanners supported by the described system have many compelling uses in the academic setting. They can enhance student/teacher interaction and augment the learning experience. Among other uses, students can annotate study materials to suit their unique needs; teachers can monitor classroom performance; and teachers can automatically verify source materials cited in student assignments.

17.1. Children's Books

A child's interaction with a paper document, such as a book, is monitored by a literacy acquisition system that employs a specific set of embodiments of this system. The child uses a portable scanner that communicates with other elements of the literacy acquisition system. In addition to the portable scanner, the literacy acquisition system includes a computer having a display and speakers, and a database accessible by the computer. The scanner is coupled with the computer (hardwired, short range RF, etc.). When the child sees an unknown word in the book, the child scans it with the scanner. In one embodiment, the literacy acquisition system compares the scanned text with the resources in its database to identify the word. The database includes a dictionary, thesaurus, and/or multimedia files (e.g., sound, graphics, etc.). After the word has been identified, the system uses the computer speakers to pronounce the word and its definition to the child. In another embodiment, the word and its definition are displayed by the literacy acquisition system on the computer's monitor. Multimedia files about the scanned word can also be played through the computer's monitor and speakers. For example, if a child reading "Goldilocks and the Three Bears" scanned the word "bear," the system might pronounce the word "bear" and play a short video about bears on the computer's monitor. In this way, the child learns to pronounce the written word and is visually taught what the word means via the multimedia presentation.

The literacy acquisition system provides immediate auditory and/or visual information to enhance the learning process. The child uses this supplementary information to quickly acquire a deeper understanding of the written material. The system can be used to teach beginning readers to read, to help children acquire a larger vocabulary, etc. This system provides the child with information about words with which the child is unfamiliar or about which the child wants more information.

17.2. Literacy Acquisition

In some embodiments, the system compiles personal dictionaries. If the reader sees a word that is new, interesting, or particularly useful or troublesome, the reader saves it (along with its definition) to a computer file. This computer file becomes the reader's personalized dictionary. This dictionary is generally smaller in size than a general dictionary so can be downloaded to a mobile station or associated device and thus be available even when the system isn't immediately accessible. In some embodiments, the personal dictionary entries include audio files to assist with proper word pronunciation and information identifying the paper document from which the word was scanned.

In some embodiments, the system creates customized spelling and vocabulary tests for students. For example, as a student reads an assignment, the student may scan unfamiliar words with the portable scanner. The system stores a list of all the words that the student has scanned. Later, the system administers a customized spelling/vocabulary test to the student on an associated monitor (or prints such a test on an associated printer).

17.3. Music Teaching

The arrangement of notes on a musical staff is similar to the arrangement of letters in a line of text. The same scanning device discussed for capturing text in this system can be used to capture music notation, and an analogous process of constructing a search against databases of known musical pieces would allow the piece from which the capture occurred to be identified which can then be retrieved, played, or be the basis for some further action.

17.4. Detecting Plagiarism

Teachers can use the system to detect plagiarism or to verify sources by scanning text from student papers and submitting the scanned text to the system. For example, a teacher who wishes to verify that a quote in a student paper came from the source that the student cited can scan a portion of the quote and compare the title of the document identified by the system with the title of the document cited by the student. Likewise, the system can use scans of text from assignments submitted as the student's original work to reveal if the text was instead copied.

17.5. Enhanced Textbook

In some embodiments, capturing text from an academic textbook links students or staff to more detailed explanations, further exercises, student and staff discussions about the material, related example past exam questions, further reading on the subject, recordings of the lectures on the subject, and so forth. (See also Section 7.1.)

17.6. Language Learning

In some embodiments, the system is used to teach foreign languages. Scanning a Spanish word, for example, might cause the word to be read aloud in Spanish along with its definition in English.

The system provides immediate auditory and/or visual information to enhance the new language acquisition process. The reader uses this supplementary information to acquire quickly a deeper understanding of the material. The system can be used to teach beginning students to read foreign languages, to help students acquire a larger vocabulary, etc. The system provides information about foreign words with which the reader is unfamiliar or for which the reader wants more information.

Reader interaction with a paper document, such as a newspaper or book, is monitored by a language skills system. The reader has a portable scanner that communicates with the language skills system. In some embodiments, the language skills system includes a computer having a display and speakers, and a database accessible by the computer. The scanner communicates with the computer (hardwired, short range RF, etc.). When the reader sees an unknown word in an article, the reader scans it with the scanner. The database includes a foreign language dictionary, thesaurus, and/or multimedia files (sound, graphics, etc.). In one embodiment, the system compares the scanned text with the resources in its database to identify the scanned word. After the word has been identified, the system uses the computer speakers to pronounce the word and its definition to the reader. In some embodiments, the word and its definition are both displayed on the computer's monitor. Multimedia files about grammar tips related to the scanned word can also be played through the computer's monitor and speakers. For example, if the words "to speak" are scanned, the system might pronounce the word "hablar,"

play a short audio clip that demonstrates the proper Spanish pronunciation, and display a complete list of the various conjugations of "hablar." In this way, the student learns to pronounce the written word, is visually taught the spelling of the word via the multimedia presentation, and learns how to conjugate the verb. The system can also present grammar tips about the proper usage of "hablar" along with common phrases.

In some embodiments, the user scans a word or short phrase from a rendered document in a language other than the user's native language (or some other language that the user knows reasonably well). In some embodiments, the system maintains a prioritized list of the user's "preferred" languages. The system identifies the electronic counterpart of the rendered document, and determines the location of the scan within the document. The system also identifies a second electronic counterpart of the document that has been translated into one of the user's preferred languages, and determines the location in the translated document corresponding to the location of the scan in the original document. When the corresponding location is not known precisely, the system identifies a small region (e.g., a paragraph) that includes the corresponding location of the scanned location. The corresponding translated location is then presented to the user. This provides the user with a precise translation of the particular usage at the scanned location, including any slang or other idiomatic usage that is often difficult to accurately translate on a word-by-word basis.

17.7. Gathering Research Materials

A user researching a particular topic may encounter all sorts of material, both in print and on screen, which they might wish to record as relevant to the topic in some personal archive. The system would enable this process to be automatic as a result of scanning a short phrase in any piece of material, and could also create a bibliography suitable for insertion into a publication on the subject.

18. Commercial Applications

Obviously, commercial activities could be made out of almost any process discussed in this document, but here we concentrate on a few obvious revenue streams.

18.1. Fee-Based Searching and Indexing

Conventional Internet search engines typically provide free search of electronic documents, and also make no charge to the content providers for including their content in the index. In some embodiments, the system provides for charges to users and/or payments to search engines and/or content providers in connection with the operation and use of the system.

In some embodiments, subscribers to the system's services pay a fee for searches originating from scans of paper documents. For example, a stockbroker may be reading a Wall Street Journal article about a new product offered by Company X. By scanning the Company X name from the paper document and agreeing to pay the necessary fees, the stockbroker uses the system to search special or proprietary databases to obtain premium information about the company, such as analyst's reports. The system can also make arrangements to have priority indexing of the documents most likely to be read in paper form, for example by making sure all of the newspapers published on a particular day are indexed and available by the time they hit the streets.

Content providers may pay a fee to be associated with certain terms in search queries submitted from paper documents. For example, in one embodiment, the system chooses a most preferred content provider based on additional context about the provider (the context being, in this case, that the content provider has paid a fee to be moved up the results list).

In essence, the search provider is adjusting paper document search results based on pre-existing financial arrangements with a content provider. See also the description of keywords and key phrases in Section 5.2.

Where access to particular content is to be restricted to certain groups of people (such as clients or employees), such content may be protected by a firewall and thus not generally indexable by third parties. The content provider may nonetheless wish to provide an index to the protected content. In such a case, the content provider can pay a service provider to provide the content provider's index to system subscribers. For example, a law firm may index all of a client's documents. The documents are stored behind the law firm's firewall. However, the law firm wants its employees and the client to have access to the documents through the portable scanner so it provides the index (or a pointer to the index) to the service provider, which in turn searches the law firm's index when employees or clients of the law firm submit paper-scanned search terms via their portable scanners. The law firm can provide a list of employees and/or clients to the service provider's system to enable this function or the system can verify access rights by querying the law firm prior to searching the law firm's index. Note that in the preceding example, the index provided by the law firm is only of that client's documents, not an index of all documents at the law firm. Thus, the service provider can only grant the law firm's clients access to the documents that the law firm indexed for the client.

There are at least two separate revenue streams that can result from searches originating from paper documents: one revenue stream from the search function, and another from the content delivery function. The search function revenue can be generated from paid subscriptions from the scanner users, but can also be generated on a per-search charge. The content delivery revenue can be shared with the content provider or copyright holder (the service provider can take a percentage of the sale or a fixed fee, such as a micropayment, for each delivery), but also can be generated by a "referral" model in which the system gets a fee or percentage for every item that the subscriber orders from the online catalog and that the system has delivered or contributed to, regardless of whether the service provider intermediates the transaction. In some embodiments, the system service provider receives revenue for all purchases that the subscriber made from the content provider, either for some predetermined period of time or at any subsequent time when a purchase of an identified product is made.

18.2. Catalogs

Consumers may use the portable scanner to make purchases from paper catalogs. The subscriber scans information from the catalog that identifies the catalog. This information is text from the catalog, a bar code, or another identifier of the catalog. The subscriber scans information identifying the products that s/he wishes to purchase. The catalog mailing label may contain a customer identification number that identifies the customer to the catalog vendor. If so, the subscriber can also scan this customer identification number. The system acts as an intermediary between the subscriber and the vendor to facilitate the catalog purchase by providing the customer's selection and customer identification number to the vendor.

18.3. Coupons

A consumer scans paper coupons and saves an electronic copy of the coupon in the scanner, or in a remote device such as a computer, for later retrieval and use. An advantage of electronic storage is that the consumer is freed from the burden of carrying paper coupons. A further advantage is that the electronic coupons may be retrieved from any location. In some embodiments, the system can track coupon expiration dates, alert the consumer about coupons that will expire soon, and/or delete expired coupons from storage. An advantage for the issuer of the coupons is the possibility of receiving more feedback about who is using the coupons and when and where they are captured and used.

19. General Applications

19.1. Forms

The system may be used to auto-populate an electronic document that corresponds to a paper form. A user scans in some text or a barcode that uniquely identifies the paper form. The scanner communicates the identity of the form and information identifying the user to a nearby computer. The nearby computer has an Internet connection. The nearby computer can access a first database of forms and a second database having information about the user of the scanner (such as a service provider's subscriber information database). The nearby computer accesses an electronic version of the paper form from the first database and auto-populates the fields of the form from the user's information obtained from the second database. The nearby computer then emails the completed form to the intended recipient. Alternatively, the computer could print the completed form on a nearby printer.

Rather than access an external database, in some embodiments, the system has a portable scanner that contains the user's information, such as in an identity module, SIM, or security card. The scanner provides information identifying the form to the nearby PC. The nearby PC accesses the electronic form and queries the scanner for any necessary information to fill out the form.

19.2. Business Cards

The system can be used to automatically populate electronic address books or other contact lists from paper documents. For example, upon receiving a new acquaintance's business card, a user can capture an image of the card with his/her cellular phone. The system will locate an electronic copy of the card, which can be used to update the cellular phone's onboard address book with the new acquaintance's contact information. The electronic copy may contain more information about the new acquaintance than can be squeezed onto a business card. Further, the onboard address book may also store a link to the electronic copy such that any changes to the electronic copy will be automatically updated in the cell phone's address book. In this example, the business card optionally includes a symbol or text that indicates the existence of an electronic copy. If no electronic copy exists, the cellular phone can use OCR and knowledge of standard business card formats to fill out an entry in the address book for the new acquaintance. Symbols may also aid in the process of extracting information directly from the image. For example, a phone icon next to the phone number on the business card can be recognized to determine the location of the phone number.

19.3. Proofreading/Editing

The system can enhance the proofreading and editing process. One way the system can enhance the editing process is by linking the editor's interactions with a paper document to its electronic counterpart. As an editor reads a paper document and scans various parts of the document, the system will make the appropriate annotations or edits to an electronic counterpart of the paper document. For example, if the editor scans a portion of text and makes the "new paragraph" control gesture with the scanner, a computer in communication with the scanner would insert a "new paragraph" break at the location of the scanned text in the electronic copy of the document.

19.4. Voice Annotation

A user can make voice annotations to a document by scanning a portion of text from the document and then making a voice recording that is associated with the scanned text. In some embodiments, the scanner has a microphone to record the user's verbal annotations. After the verbal annotations are recorded, the system identifies the document from which the text was scanned, locates the scanned text within the document, and attaches the voice annotation at that point. In some embodiments, the system converts the speech to text and attaches the annotation as a textual comment.

In some embodiments, the system keeps annotations separate from the document, with only a reference to the annotation kept with the document. The annotations then become an annotation markup layer to the document for a specific subscriber or group of users.

In some embodiments, for each capture and associated annotation, the system identifies the document, opens it using a software package, scrolls to the location of the scan and plays the voice annotation. The user can then interact with a document while referring to voice annotations, suggested changes or other comments recorded either by themselves or by somebody else.

19.5. Help in Text

The described system can be used to enhance paper documents with electronic help menus. In some embodiments, a markup layer associated with a paper document contains help menu information for the document. For example, when a user scans text from a certain portion of the document, the system checks the markup associated with the document and presents a help menu to the user. The help menu is presented on a display on the scanner or on an associated nearby display.

19.6. Use with Displays

In some situations, it is advantageous to be able to scan information from a television, computer monitor, or other similar display. In some embodiments, the portable scanner is used to scan information from computer monitors and televisions. In some embodiments, the portable optical scanner has an illumination sensor that is optimized to work with traditional cathode ray tube (CRT) display techniques such as rasterizing, screen blanking, etc.

A voice capture device which operates by capturing audio of the user reading text from a document will typically work regardless of whether that document is on paper, on a display, or on some other medium.

19.6.1. Public Kiosks and Dynamic Session IDs

One use of the direct scanning of displays is the association of devices as described in Section 15.6. For example, in some embodiments, a public kiosk displays a dynamic session ID on its monitor. The kiosk is connected to a communication network such as the Internet or a corporate intranet. The session ID changes periodically but at least every time that the kiosk is used so that a new session ID is displayed to every user. To use the kiosk, the subscriber scans in the session ID displayed on the kiosk; by scanning the session ID, the user tells the system that he wishes to temporarily associate the kiosk with his scanner for the delivery of content resulting from scans of printed documents or from the kiosk screen itself. The scanner may communicate the Session ID and other information authenticating the scanner (such as a serial number, account number, or other identifying information) directly to the system. For example, the scanner can communicate directly (where "directly" means without passing the message through the kiosk) with the system by sending the session initiation message through the user's cell phone (which is paired with the user's scanner via Bluetooth™). Alternatively, the scanner can establish a wireless link with the kiosk and use the kiosk's communication link by transferring the session initiation information to the kiosk (perhaps via short range RF such as Bluetooth™, etc.); in response, the kiosk sends the session initiation information to the system via its Internet connection.

The system can prevent others from using a device that is already associated with a scanner during the period (or session) in which the device is associated with the scanner. This feature is useful to prevent others from using a public kiosk before another person's session has ended. As an example of this concept related to use of a computer at an Internet café, the user scans a barcode on a monitor of a PC which s/he desires to use; in response, the system sends a session ID to the monitor that it displays; the user initiates the session by scanning the session ID from the monitor (or entering it via a keypad or touch screen or microphone on the portable scanner); and the system associates in its databases the session ID with the serial number (or other identifier that uniquely identifies the user's scanner) of his/her scanner so another scanner cannot scan the session ID and use the monitor during his/her session. The scanner is in communication (through wireless link such as Bluetooth™, a hardwired link such as a docking station, etc.) with a PC associated with the monitor or is in direct (i.e., w/o going through the PC) communication with the system via another means such as a cellular phone, etc.

Part IV—System Details

Figure 4:
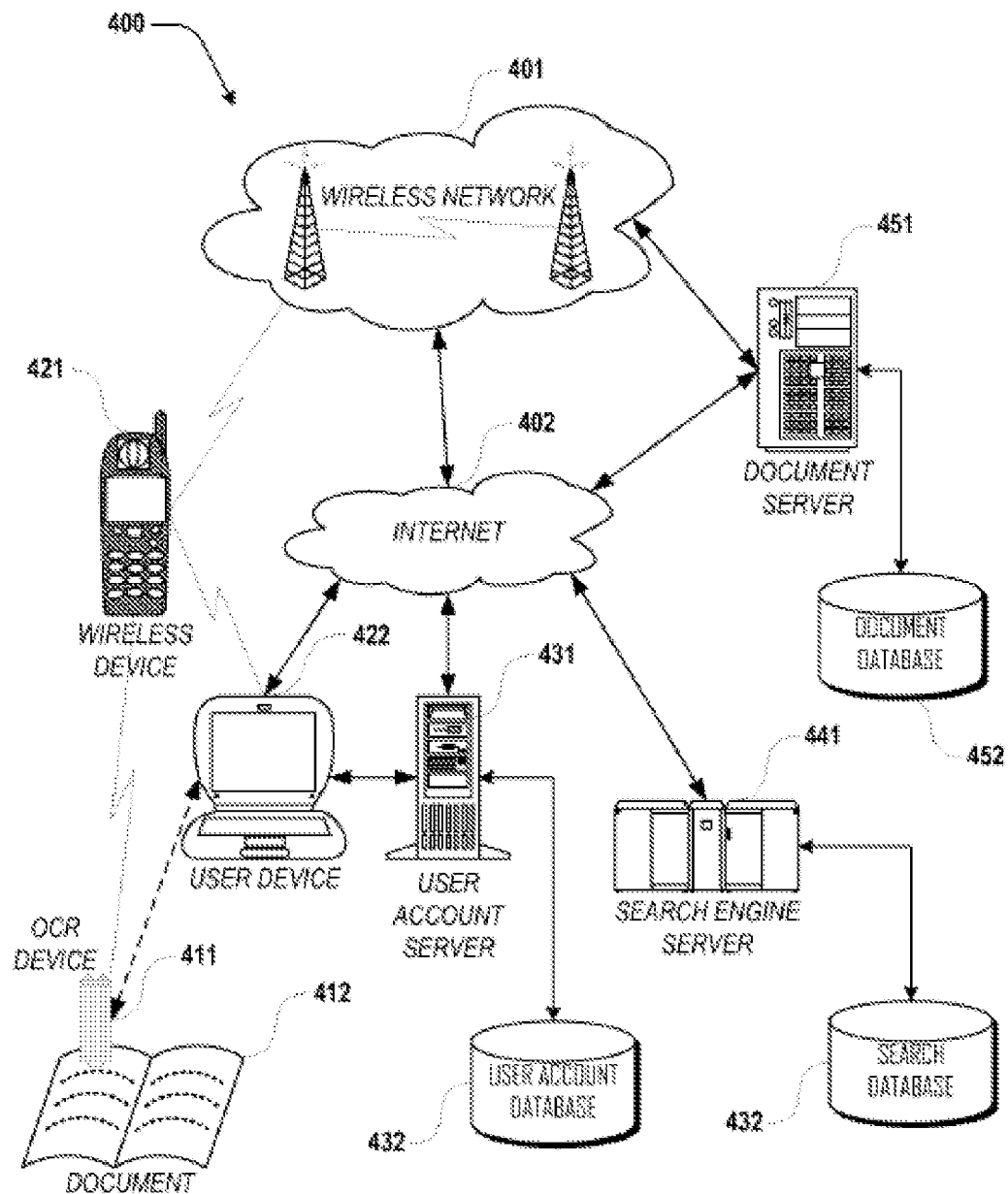
FIG. 4 is a diagram showing the typical environment in which embodiments of the system operate.

FIG. 4 is a diagram showing the typical environment in which embodiments of the system operate. The system functions in a distributed computing environment 400 that includes a plurality of devices interconnected by a wireless network 401, the Internet 402 or other networks (not shown). All these communications and connections are interconnected via suitable network connections using suitable network communication protocols. In various embodiments, the servers and other devices communicate with each other in accordance with respective APIs, which form additional embodiment of the system. In alternate embodiments, the devices and servers may communicate in accordance with open/standard protocols.

The servers and other devices include an OCR device 411 or other text capture device that is used to capture text from a rendered document 412; a wireless device 421 and/or a user device 422 to which the text capture device uploads various representations of captured text and other user input, and via which the system can provide various types of feedback to the user; a user account server 431 and associated user account database 432 in which the system manages user account information for the user; a search engine server 441 and an associated search database 442 that the system uses to perform queries containing text captured from a rendered document to identify positions in electronic documents in which the captured text occurs; and a document server 451 and an associated document database 452 from which the system retrieves copies of documents determined to contain the captured text. It will also be appreciated that while these servers are illustrated as single devices, each server may actually comprise more than a single device in an actual system practicing embodiments of the system. It will also be appreciated that the servers include file servers, database servers or a mixture that includes file servers and database servers. It will further be appreciated by those of ordinary skill in the art, that while the various servers may be discussed as separate devices, in other embodiments of the system the servers may reside on a single device.

Although the process of turning electronic documents into printed form has existed almost from the outset of computing, what has been lacking is an efficient way to reference back to the original digital sources of printed documents. The system achieves this by scanning the desired position within a document to identify a distinctive text "signature," where this signature provides information that can be used to locate the corresponding location within the original digital source document. This digital signature is then sent to a server that has access to database of electronic documents, which desirably includes an electronic version of the paper document in question (though as explained below, useful outcomes can be obtained even when this is not the case). The server then identifies the corresponding location (or locations) in the electronic source document, connecting it with the original scan of the paper document. Establishing this relationship enables numerous useful innovations related to the use of printed documents in a variety of contexts. Various embodiment of the system will now be examined.

This patent application generally relates to the field of electronic commerce, and more specifically to "p-commerce" (paper commerce) from references to products in otherwise non-commercial documents.

In some embodiments, when the user captures text, the system determines whether the captured text contains a reference to a product that is available for purchase. If so, the system presents a prompt to the user, such as by displaying a context menu item, to purchase the referenced product. In response to the prompt, the user may issue an instruction to purchase the referenced product, in which case the system interacts with a seller of the product to purchase the product on the user's behalf. In some cases, the operator of the system may receive a sales commission from the seller. In some embodiments, the system further stores information about the text capture in a scanning log, such as the user's Life Library, that includes an identification of the referenced product. When the user later reviews the scanning log, the system enables the user to issue an instruction to purchase the product. Later purchasing the product when reviewing the scanning log may be useful where the user did not know that he or she was interested in purchasing the product at the time of the capture, the user cannot afford the product at the time of the capture, the product was not available for purchase at the time of the capture, etc.

Various embodiments of the system include visual indications that an otherwise non-commercial reference includes an opportunity to purchase an item, identify which part of a scan is of interest to a user, provide local caching of source documents or their index, provide a state-of-device indicator and provide for interacting with items displayed on a dynamic display. For example, in one embodiment, a scanner may have an LCD display. When a user scans the phrase "The Adventures of Old Mr. Toad" the LCD display may bring up a prompt to allow the user to purchase this book from Barnes and Noble.com. It may be that the user scanned this phrase from an article that was entirely unrelated to selling a copy of this book (as opposed to an advertisement for this title).

One of the interesting and useful aspects of the system occurs at the boundary of content and commerce—for example where literature meets advertising. This situation has elements in common with embedded advertisements—e.g., product placements in otherwise non-commercial contexts.

With one exemplary embodiment, a user is reading a newspaper article, perhaps a travel story about South Africa from the New York Times. The story is well-written, so the user glances at the credits:

TABLE 1

Wendy Freston is a photo-journalist living in Amsterdam. Her recent book, "Sleepwalking Cats," won the 2003 Walker Award for Impressionist Fiction. She is currently working on "Any Day Now," a story about personal politics and political awakening (to be published in September by WestWind Press)

The user thinks this author and both of these books are interesting, so she scans the three items of interest:

TABLE 2

Wendy Freston is
book, "Sleepwalking Cats," won
on "Any Day Now,"

In making these scans, the user included a few extraneous words. However, the system can include software that recognizes the intended and/or meaningful content. This could be accomplished, for example, by use of expert-system-like knowledge about syntax, grammar, keywords—and/or via mark-ups made in the source document, or associated with the source document—e.g., XML tags. For example, a server may have a list of phrases known to be books, or a given document may have embedded XML tags specifying which phrases are book titles. Other embodiments may be used as well (e.g., neural networks or frequency statistics). If the expert-system-like approach is used, examples of the kinds of rules which could be employed might include:

Strip all stop words (e.g. "the," "to," "about") from front and back of text.
Keep all text which appears in quotes.
If quoted text is greater than a threshold amount of total text (e.g. eight words), discard text outside quotes.
Keep all proper nouns.
Keep all capitalized words.
Strip words from start and end if their frequency of usage is above x occurrences per million words.

Note that the additional words—e.g., the outside words not significant in the user's scan, can still be used in identifying the text fragments and resolving any ambiguity. Indeed, they can also be saved, so that the user's complete scan is preserved. The stripping of these unintended words can thus occur at a subsequent point of processing—for example, when the scan data is used to search in a search engine, or when it is presented to the user in a visual list of scans (where non-essential or stripped words might well appear in their original position, but in another color or shade, e.g., light grey).

When the user scanned the three items listed in Table 2, the system may already have a known context—for example because the user explicitly scanned some context-setting data, such as a unique piece of text which only occurs in this document or a barcode printed in the document or on an address label affixed to the document. Alternatively, the user may have entered identifying information about the document explicitly (e.g., with a keyboard or other input device). The system may even know which specific copy of the document the user is working from—e.g., because this information was in the scanned barcode, because it was explicitly entered by the user, or because the rendered data of the document contains a unique watermark (e.g., text spacing, hidden text, margin barcode(s) and the like) which is detected when that data is scanned.

Additional factors can also be used to determine context. For example, elapsed time since the last scan can be used to determine whether the user is still scanning in the same document. Similarly, comparing the currently scanned font to the previous scanned font will in many cases help to establish whether the user is in the same document. Paper color and texture, ink color, column width, vertical line spacing, kerning, direction user is reading, speed user is reading, etc., also provide clues. In one embodiment, a scanner may record an identifier for images such that it can retrieve original pictures for two images both matching a template. A processor may then compare a background color or other feature listed to determine a match. In another embodiment, a processor may make these comparisons between two images that do not having matching templates (perhaps their sequence is of interest). If there is not a match, the system may determine that these images came from different documents. In some cases, it will be helpful within the system to calculate a probability or reliability factor associated with a context—e.g., an indication of how likely the assumed context is the correct context. In one embodiment, this may be calculated using information and instructions stored in memory. For example, a background color difference may be worth 5 points, a font change worth 3 points and a change in column width worth 6. If document changes score more than 8 points, it may be determined that there has been a change in documents. This may be derived from various combinations of the above exemplary clue items. It might also include data relating to or derived from such information as the user's reading habits and preferences, the user's stored profile, the periodicals the user subscribes to, the subject matter as compared to other content the user has read historically, the publication date of the content, time or delay between publishing and when other readers access this content, the popularity of the content, the likely availability of this content in the user's current physical circumstance (e.g., car, train, home, office, hotel, vacation, etc.)—to name but a few. For example, in one embodiment, documents may be associated with meta data such as date of publication, subject or author. If a server has disambiguated a search query down to two documents, it may choose the most likely by scoring their prevalence in this user's history. For example, if one document is about sailing and the other is on mining, then this server may divide the allotted points for subject based on the number of matching subjects. So, if 37% of this user's history is documents about sailing, then the sailing document may have 3.7 points added to its score.

The device may include one or more visual indicators about its state or states. These may show whether the current scan is occurring/did occur in a known context, an unknown context or perhaps the degree of certainty or probability that the context is known. Similarly, an audible indicator might tell the user if the previous scan was in a known context. A signal might also indicate whether the last scan was unique or ambiguous—and perhaps the degree of ambiguity.

One of the useful enhancements in the system is that when the context is known (e.g., current document, chapter, page, paragraph, periodical, issue, volume, line, etc.), the amount of information required to establish location may be reduced. For example, if a user was known to be scanning this paragraph, and they scanned the word "when" adjacent to the word "the", the system would know the user's exact location, since this adjacent combination of words only occurs once—though it occurs several times in the complete document, and many, many times in the larger world—for example, in the collection of all documents indexed by the search engine Google. In one embodiment, a server may be able to use a known context, even if not unique, to constrain a search. A search engine may restrict its query to these documents, or discard results from other documents.

When the context (e.g., what is the current document) is known it will be possible in some situations to make information about the context/current document more easily accessible to the device or user (and/or those components of the system which will make use of this information). For example, when the system determines that the user is reading a newspaper article from today's issue of the Wall Street Journal, a copy of the article, or an index of the article, or a copy or index of the entire page or entire paper, might be cached on the remote server so that any subsequent references to this document by the user can be responded to with less delay. Alternatively the content, or index of the content, might be "downloaded" to a server/device nearer to the user, perhaps to a server within the user's corporate intranet—or even closer, perhaps to the user's desktop computer, PDA, wireless phone, or directly into the user's scanning device.

Figure 5:
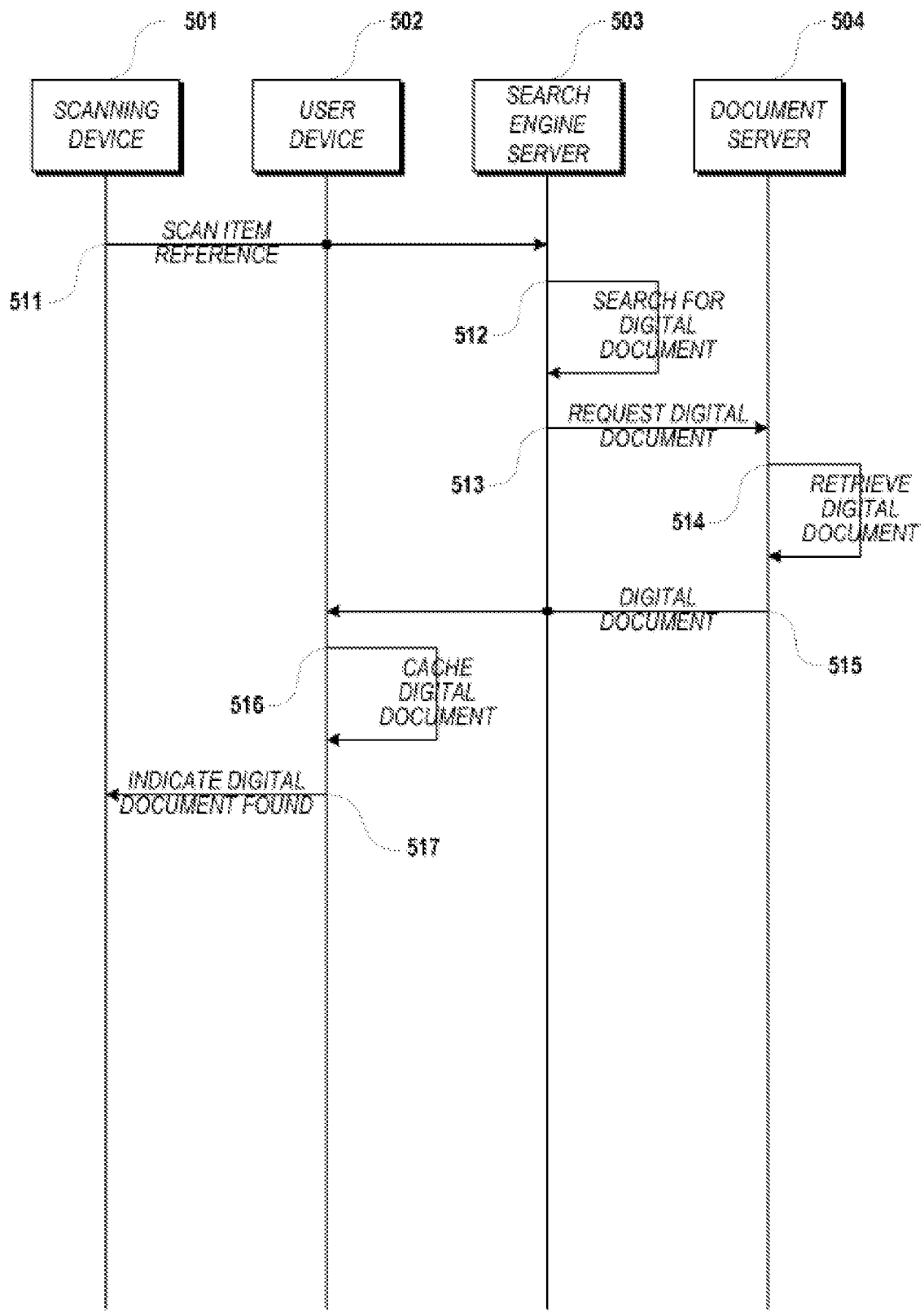
FIG. 5 is a distributed processing diagram showing the caching of a digital document at a user device near the user with which the scanning device can easily communicate, and/or on which the user can review the digital document.

FIG. 5 is a distributed processing diagram showing the caching of a digital document at a user device near the user with which the scanning device can easily communicate, and/or on which the user can review the digital document. The diagram shows communications between a scanning device 501, a user device 502, search engine server 503, and a document server 504. The scanning device sends a scan item reference 511, such as an indication that the user has performed a text capture that specifies the captured text, captured time and other particulars, etc., to search engine server 503. The search engine server performs a search 512 for a digital document matching the capture. The search engine server sends a request 513 for a matching digital document to the document server. The document server retrieves digital document 514, and returns digital document 515 to the user device. The user device caches the digital document 516, and sends an indication 517 that the digital document was found to the scanning device.

One result of this document caching approach is that latency and/or bandwidth usage and/or processor bandwidth can sometimes be reduced. In some cases, a reduction in these aspects of the system can have a dramatic effect on the user experience. For example, with the relevant data close to the user, feedback about the ambiguity/uniqueness of a scan can be provided in real-time. Thus, for example, the user may receive audible or visual feedback when the current scan is known to be unique, so the user knows no further scanning is required. Similarly, the user can receive in real time an acknowledgment that the scan was completed successfully—i.e., that matching content was found in the current context.

This enhancement may be particularly when the system includes a link over a wireless network—for example, when the user's device accesses network-based or server-based components via a wireless handset—or in the case where the scanner device is integrated in the handset. Since the latencies and costs of a wireless network can both be large, having a local copy of data can be beneficial.

One enhancement which can be combined with, or used as an alternative to, caching or downloading the current document or document index, is to provide the user's device (i.e., that portion of the system located close—either physically, or from a latency perspective—to the user) with a parametric description of the user's context. This description contains information which the system can use to determine such aspects as when a particular scan is likely or certainly unique, when the user has changed to a new context, how to respond to certain actions or events (e.g., when the user scans certain items), etc. In many cases this parametric description will allow the local system or device respond in real time, and without lengthy communications with a remote server.

As an example, such a parametric description might include a simple guideline such as:

Every sequence of three or more words is unique in this context.

Or a slightly more complicated description:

Every sequence of three or more words is unique—if at least one of the words has eight or more characters Note in this example that, in some cases, having a short parametric description available removes the need for a full copy of the source document or index data to be cached or downloaded.

Other data stored locally might include:

If the user scans the word "Microsoft" add "Go to www-.microsoft.com" to the dynamic menu displayed on the user's local machine.

Such instructions allow the terminal device or local system components to function without (or with fewer) communications with a remote system or server.

Figure 6:
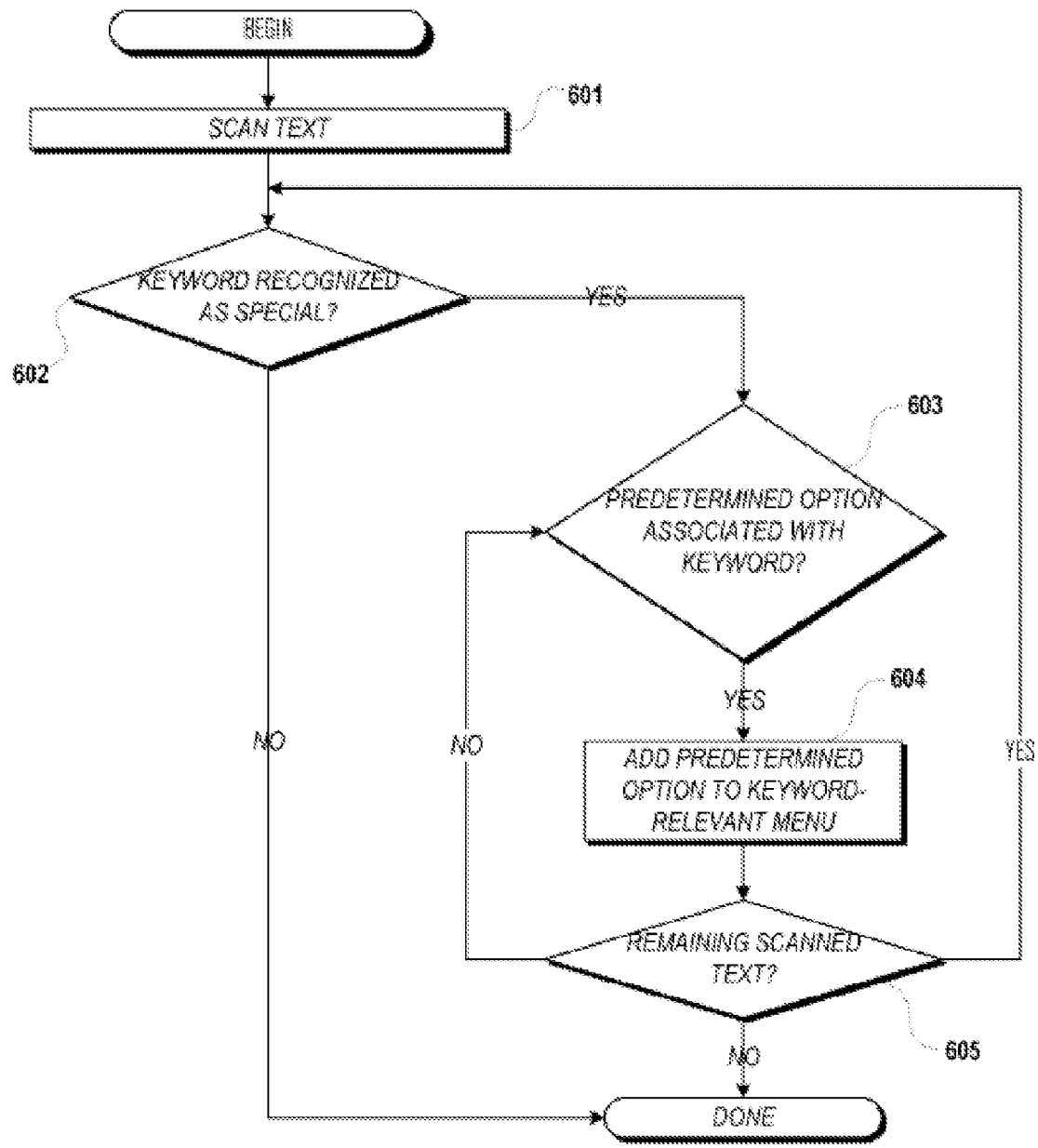
FIG. 6 is a flow diagram showing steps typically performed by the system in order to adapt a dynamic menu displayed to the user in accordance with a parametric context description.

FIG. 6 is a flow diagram showing steps typically performed by the system in order to adapt a dynamic menu displayed to the user in accordance with a parametric context description. In step 601, the system captures text. In step 602, if a keyword among the captured text is recognized as special, then the system continues in step 603, else these steps conclude. In step 603, if a predefined option is associated with the keyword recognized in step 602, then the system continues in step 604, else the system continues in step 605. In step 604, the system adds a predefined option corresponding to the keyword to the menu, making it a keyword-relevant menu. In step 605, if additional captured text remains to be reviewed, then the system continues in step 602 to review the remaining text, else these steps conclude.

Another example where a source or reference copy of the context document might be delivered to the user is so that it can be displayed on the user's local display device. Thus, if the user is reading a newspaper but has their personal computer running nearby, the system can bring a copy of the current document up on the user's screen. One way of doing this is via conventional browser architecture, e.g., using HTTP protocol commands. With one embodiment, a user may be able to view this current document by using a web browser application to visit their account. A server may have already stored a copy of this document in their account.

Once the current document is displayed locally, actions performed by the user in a paper version can be mirrored, interpreted, displayed, etc., in the dynamically displayed version. Thus, for example, as the user highlights a section of text, for example by selecting a "highlight" button or menu option and then scanning with the device, the highlighting of that same portion of text can appear concurrently in the displayed version of the document. Or if the user adds a voice annotation to a specific location (e.g., by scanning text at that location, pushing a record button on the device, and speaking into the device's optional microphone), a symbol representing a voice annotation—perhaps a small speaker icon—can appear in the dynamically displayed version.

One use of an embodiment of a system is for copy editing and proofreading documents. In this application, changes to the document, deletions, insertions, annotations, proofreading marks, etc. can be represented in the displayed version of the document in real time as they are being made. One can certainly imagine a teacher correcting students' papers with this technology.

A default behavior which may be optionally implemented is to have each new document or context which the user scans automatically display the source/digital version of the document on the user's local display (if available). A refinement on this is for the system to determine how the user's copy of the document is rendered—e.g. by examining data scanned by the user—and then ensure that the dynamically displayed version is in the same format. Another refinement is to have the displayed version auto-scroll so that the location being indicated by the user is visible on the dynamic display.

It is possible for devices capable of scanning paper documents to also be capable of scanning a CRT or flat-panel device or other dynamic displays. Thus, the scanner is a useful tool for also interacting with these display devices. In one embodiment, menus and other user options and choices can appear on the display when the user scans in a printed document with a device. The user can then use the same device to scan and interact with items displayed on the dynamic display. In one example, the choices on a dynamic screen might be "brushes" or actions or attributes which the user can select—for highlighting in various colors, underlining, changing font, deleting, inserting, etc. Once a brush, action or attribute is selected, the device can perform that action on the next scan in the printed document. In many cases these brushes/actions/attributes/etc. could be momentary—i.e., the state of the device reverts after one use of the brush/action/attribute/etc.

In some cases, a nearby dynamic display can be used to provide a rich user interface for a simple device that has no display. For example, the system can associate a menu of choices or selections with any scanned item—including different menus for different kinds of motions or scans or actions of the device.

Figure 7:
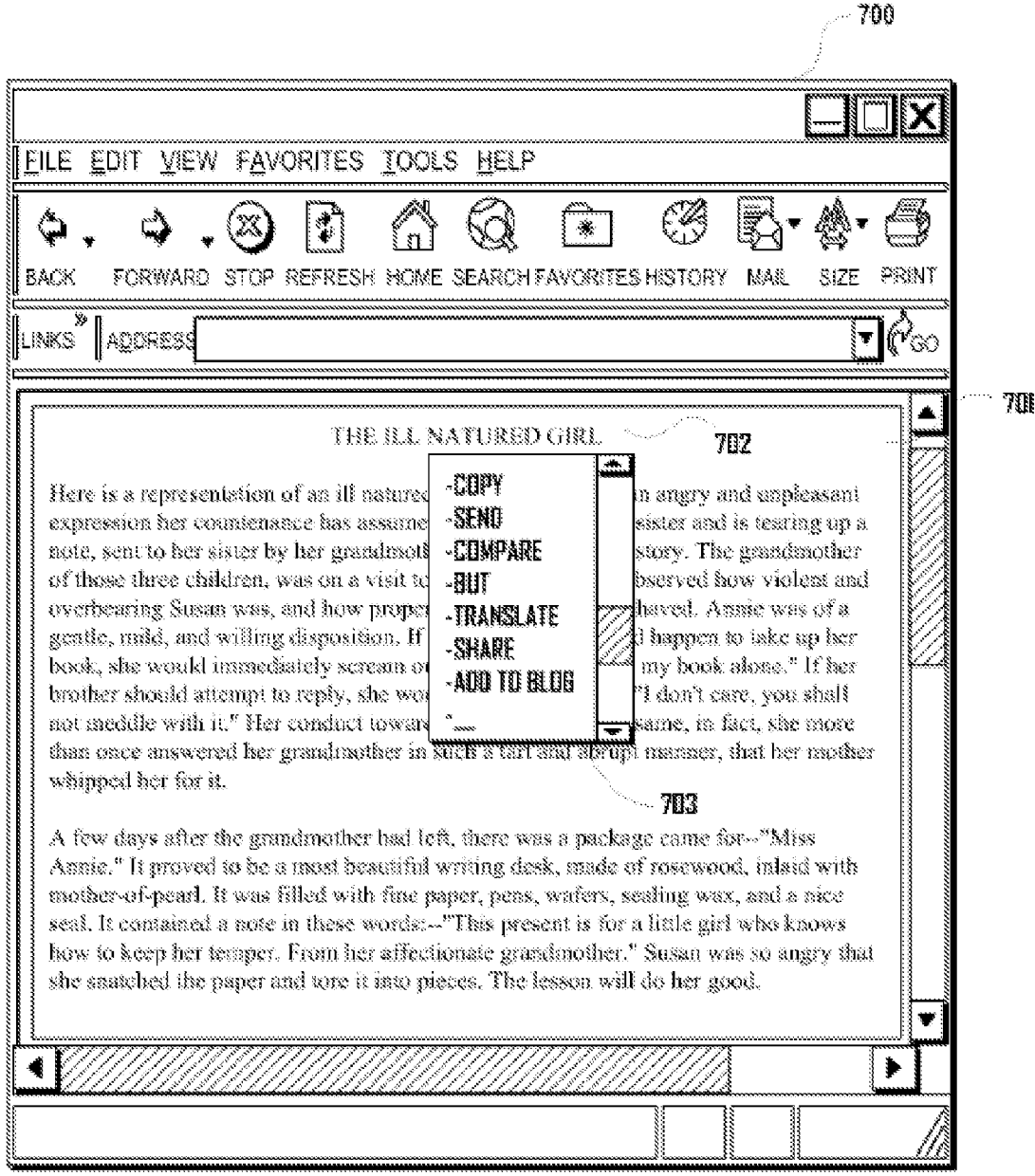
FIG. 7 is a display diagram showing a display typically presented by the system on a nearby dynamic display.

FIG. 7 is a display diagram showing a display typically presented by the system on a nearby dynamic display. The diagram shows that the system opens an application window 700, such as a window of a browser application, containing electronic copy of the document 701 in which the user's last capture occurred. Indication 702 shows the contents of the capture, while context menu 703 shows actions that are available to the user in connection with the capture.

When the user scanned the three items listed in Table 2, the system may have already stored the context. If, however, the context is unknown (e.g., if these three scans are the first scans in this document), then the system may either determine the context from these scans themselves, or at a later time (for example when the user scans additional data, or when the user explicitly enters document information, or when the user selects from a list of possible matching documents—which list would optionally be sorted with the most likely document first and/or selected by default).

Figure 8:
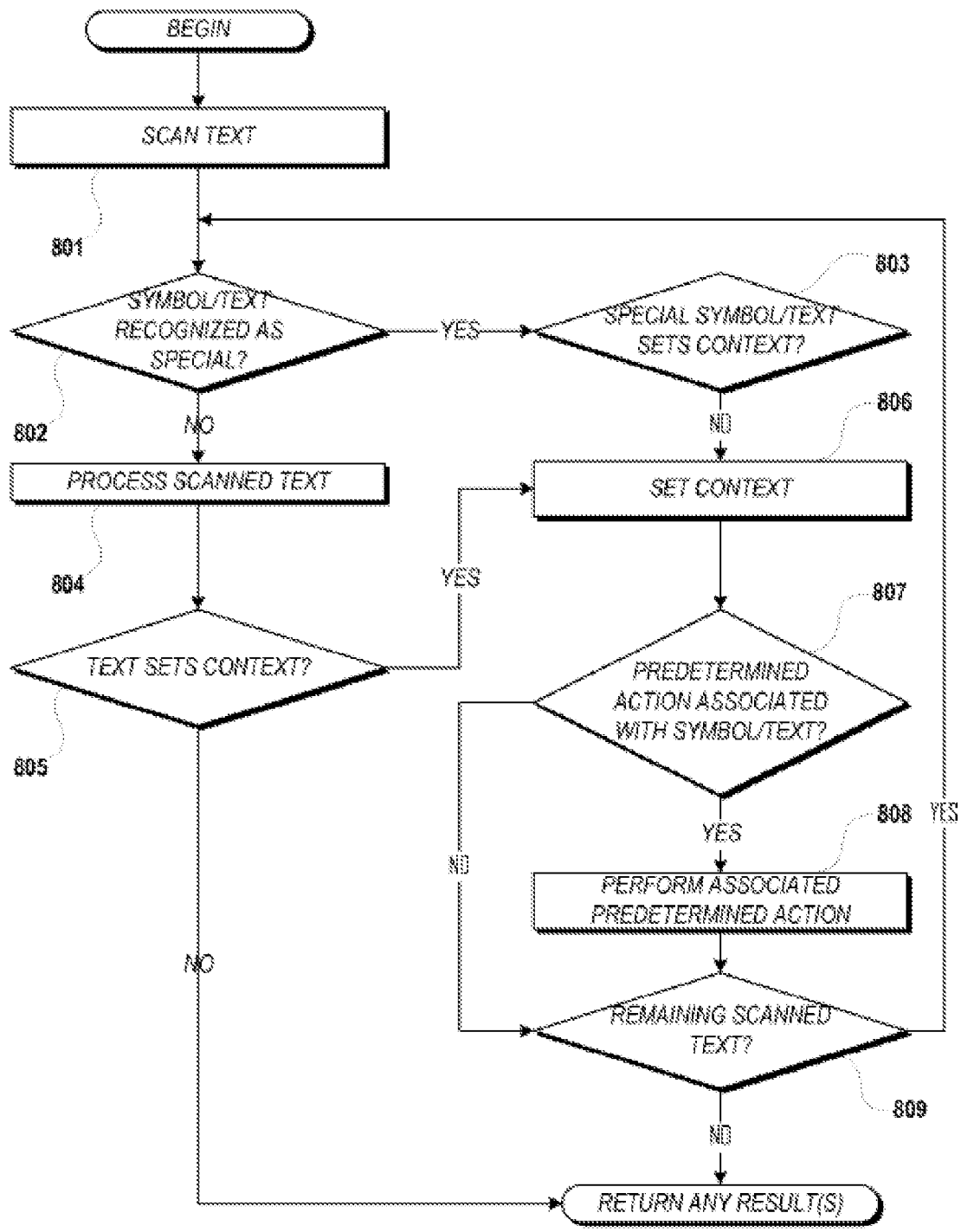
FIG. 8 is a flow diagram showing steps typically performed by the system to determine the context from the contents of a text capture.

FIG. 8 is a flow diagram showing steps typically performed by the system to determine the context from the contents of a text capture. In step 801, the system receives captured text. In step 802, if the captured text contains a symbol or text recognized as special, then the system continues in step 803, else the system continues to step 804. In step 803, if the special symbol or text recognized in step 802 sets a context, then the system continues in step 806, else the system continues in step 807. In step 804, the system processes the scanned text. In step 805, if the processed text sets a context, then the system continues in step 806, else the system returns any produced results. In step 806, the system sets a context based upon the special symbol or text, or based upon the processed text. In step 807, if a predetermined action is associated with a recognized special symbol or text or text among the processed text, then the system continues in step 808, else the system continues in step 809. In step 808, the system performs the associated predetermined action. In step 809, if additional captured text remains to be reviewed, then the system continues in step 802 to continue reviewing the captured text, else the system returns any results produced.

Even if no single one of these three scans contains enough information to completely identify the context/document, the combination of two or more may well do so. This is similar to searching in a search engine for documents that contain "Sleepwalking Cats" AND "Any Day Now." And note that, if these scans occurred close together in time, we may also know or assume that we are looking for a document where these items are physically near each other (e.g., "NEAR" in the command lexicon of many search engines such as Lexis-Nexus).

One example of a possible User Interface for the device would include an "Unrecognized/Recognized" indicator, perhaps in the form of a red/green LED device. This indicator would be red when the system was unsure of the user's context (is specific document and location). It would remain red until enough information was scanned that the context was known—at which point it would turn green. Then at the beginning of each new scan (e.g., as the device approached or touched or began moving on the surface of the rendered document), the indicator would turn red (indicating it did not yet recognize the context/location), and remain so until this scan contained enough information to again identify the user's specific location.

Figure 9:
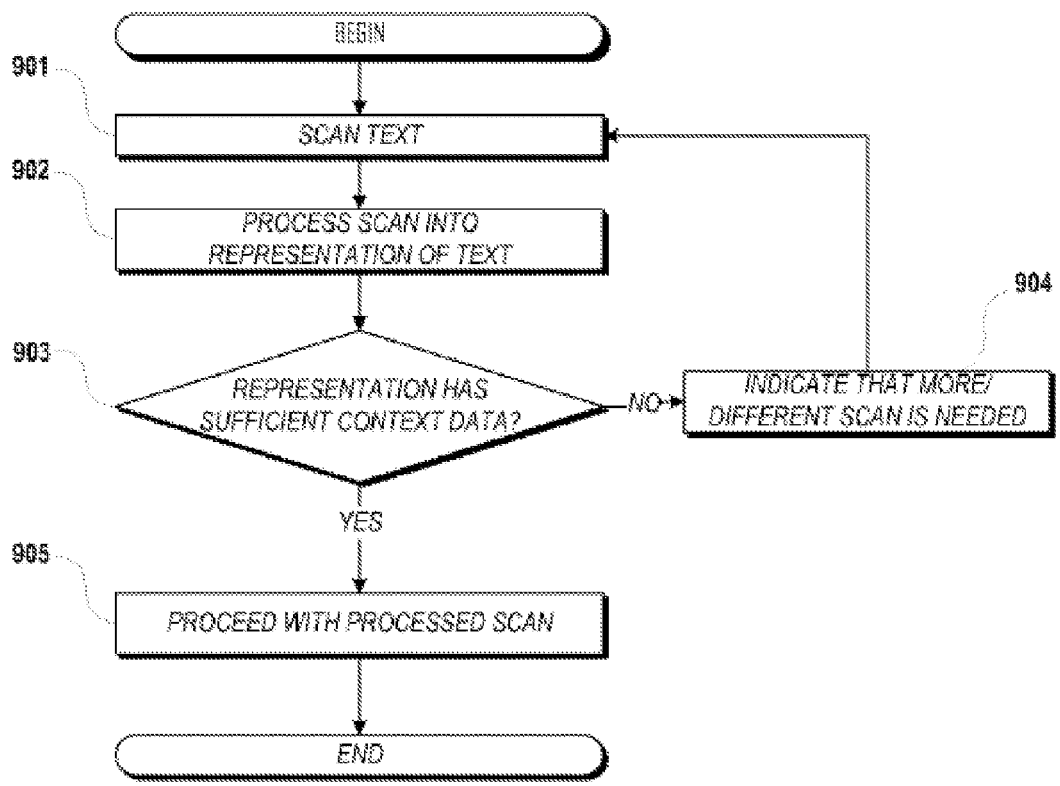
FIG. 9 is a flow diagram showing steps typically performed by the system in order to provide unrecognized/recognized feedback.

FIG. 9 is a flow diagram showing steps typically performed by the system in order to provide unrecognized/recognized feedback. In step 901, the system receives captured text. In step 902, the system processes the received information into a representation of text. In step 903, if the representation generated in step 902 has sufficient context data to recognize the source document, then the system continues in step 905, else the system continues in step 904. In step 904, the system indicates that a more expansive or different capture is required to recognize the source document, such as illuminating a red LED indicator on the capture device. After step 904, the system continues in step 901 to receive information about the next capture. In step 905, the system proceeds with the representation of text obtained by processing the scan in step 902. After step 905, these steps conclude.

Where the user scans the three items listed above, the system may provide a menu of choices for each of these scans. This menu might be available at the time the scans were made (e.g., if a local dynamic display were available), or the menu might be accessed later, for example when the user reviews these items in their account history list of all scans.

If metadata is associated with the source document, or if the system has additional information or an expert-system-like capability, the first item scanned, "Wendy Freston" may be known to be the name of an individual, and perhaps further that this individual is an author. Some of the possible menu options are, "Bookmark (save a reference to) this item"
"Send Wendy Freston an email"
"Search the Web for 'Wendy Freston'"
"Show me available contact information for Wendy Freston"
"Find other articles/books/etc. by Wendy Freston"
"Notify me when other materials by Wendy Freston become available"

Some of the possible menu options for the item "Sleepwalking Cats" are:

"Bookmark (save a reference to) this item"
"Reserve a copy of 'Sleepwalking Cats' at my local library"
"Show me an excerpt from 'Sleepwalking Cats'"

"Purchase a copy of 'Sleepwalking Cats' from Barnes and Noble.com, $24.50, shipping in 24 hours"

"Show me reviews of 'Sleepwalking Cats'"

Some of the possible menu options for the item "Any Day Now" are:

"Bookmark (save a reference to) this item"

"Notify me when 'Any Day Now' becomes available at my library"

"Show me an excerpt from 'Any Day Now'"

"Advance order a copy of 'Any Day Now' from Barnes and Noble.com for $19.95, shipping on September 15"

"Show me advance reviews of 'Any Day Now'"

In some embodiments, some of these options may be displayed if the device acknowledges that it can process these requests (e.g. a scanner may not have any software to compose email, and so may not display on its LCD the option to send an email.)

Note that the two book titles scanned by the device are handled differently. Depending on the associated metadata, context, etc., the system can present different options to the user. These options can in fact be programmatic, i.e., can involve simple or complex algorithms concerning what to display, how to display it, etc. In the cases of the two books, the system may have communicated with the Barnes and Noble.com server to check the availability and price of the items, and the public library computer system to see if these books were checked out.

Note from the preceding, that the response of the system can vary over time. If the user were to scan these same items at a later time they might find that "Send Wendy Freston an email" was not an option (perhaps because she had registered with the system not to receive further email), that the price to purchase "Sleepwalking Cats" had changed, and was now available instead from Barnes & Noble, and that "Any Day Now" was now published and shipping. Thus one important aspect of the system is that its response to a given reference or scanned item can be very dynamic—including changing with time—even thought the underlying reference is static, for example ink printed on paper.

It is useful to note that, for a specific scanned item, the system generally knows the context (document and location) as well as the scanned content. Moreover, in many cases, via metadata, expert system or other technique, the system may know the specific meaning of the scanned data—and perhaps have special algorithms to handle it.

This information associated with a scan can be preserved along with the scanned data itself—and used in the future. Assume in the above example for the item "Sleepwalking Cats" in the New York Times that the user selected "Bookmark (i.e. save a reference to) this item". Then, several years later, the user remembers reading this newspaper article, finds the saved reference in their account history, selects it to see available options. The user now selects "Purchase a copy of 'Sleepwalking Cats' from Barnes and Noble.com, $29.99, shipping in 48 hours." In one embodiment, a scanner may route this request to a server. A server may execute a software routine to handle this menu option. This exemplary server may debit an account identified by the scan request (e.g. an identifier is sent as part of the scan request, and the server decrypts the remainder of the message with this account's public key.) This routine may then credit the account belonging to Barnes and Noble.com, whose account number may be stored in the routine's instructions. This server may then authenticate itself to Barnes and Noble.com using Kerberos and SSH to place an order for this book. The server may execute a software routine that accesses this user's account to retrieve a shipping address, a shipping preference (e.g. standard, overnight) and other preferences (e.g. buy a used copy if available). This information may then be passed to the Barnes and Noble.com server over the authenticated connection. This order may then be processed as though the user had manually entered all of this information at the Barnes and Noble.com website.

If this user had made this purchase in a conventional way—perhaps writing a reminder note about "Sleepwalking Cats", searching around and locating this note many years later and purchasing the book from the Barnes and Noble.com website, there would most likely be no knowledge or information about when/where/how the user learned of the book. However, with the system, information about the source of the purchase can be maintained.

In many cases, this retained information may have value for the user—to answer the question, "where did I hear about that book?" It may also have value to the author (Wendy Freston), publisher (WestWind) and bookseller (Barnes and Noble)—since they now know the source of the referral that led to the sale. In one embodiment, a user may log on to their account and set a preference allowing their purchase information to be shared. Such a user may have their account credited for providing this information. Moreover, with this information can have value to the original publisher of the article (the New York Times in this example). For example, it may be reasonable for the New York Times to be compensated (e.g., by the book's author, publisher, and/or bookseller) for printing the newspaper article which eventually led to the sale. In conventional publishing, this would not be easily accomplished, since it would require that the book purchaser first remember and then convey that the original reference was in the New York Times. Accordingly, with the system, at least in the case where the subsequent purchase is made from within the system (i.e., from the "Purchase . . . " item in the menu in the earlier example), this referral information is readily available and can be passed to the book's seller, publisher, author, and to the New York Times, automatically. In one embodiment, an account may also be automatically debited when this information is sent.

A refinement in the above scenarios should be noted. When story shown in Table 1 appeared in the New York Times, it could well have appeared with special markings to indicate to a reader of the article the special and specific nature of the various component items. Thus "Wendy Freston" could be rendered in a special color, or with an accompanying symbol, to indicate that the system will interpret this as an individual's name, and provide various standard menu options. Similarly, "Sleepwalking Cats" might appear in a distinct way or with a distinct mark to indicate that this item has an associated commercial opportunity (e.g., can be purchased). In addition, the item "Any Day Now" might indicate that special or additional information was available—e.g., that this book will become available on a certain date. In one embodiment, a server may have a database of known text strings. Scanned text may be processed against this database. The string "Wendy Freston" may return a list of menu options to make available to the user. These results may be sent back to the scanner via a network. Should a user choose one of these via buttons on the scanner, the scanner may send this option's identifier (e.g. which option, in which menu, which user, what time) to a server for processing. This server may parse this information into a function identifier and variable data. This server may then execute the specified function.

From this, it can be seen that the system may include various visual indications to the user about specific items in a document. These may be icons or other graphic items, or special colors, fonts, highlighting, underlining, etc. Among other things, these marks may indicate to the user the type of item, and how it will be handled by the system. Note that these marks and indications may also be machine readable, e.g., by the scanner itself. Thus, the device may, like the user, be made aware of the meaning of various items within a document, and how these items should be treated or handled.

The case where an item referred to in a document can be reviewed, ordered, purchased (as with the books in the above example) is interesting because it represents a new form of interactions between users and rendered documents (and, in particular, between users and static documents printed on paper). In this new model, objects referenced in print or images, directly or indirectly, can be reviewed, and optionally purchased, simply by scanning the reference to the object. Since the information about these referrals may be available within the system, it can be used to connect the entity selling an item (e.g., a book) to the entity responsible for or helping with the sale (e.g., an author or publisher of content)—to the benefit of both parties. The seller obtains a sale, and valuable information about what was responsible for the sale. The author or publisher may receive specific compensation for the referral/sale. In such an embodiment, a server may credit the author or publisher's account when the server provides the purchase and source notice.

Figure 10:
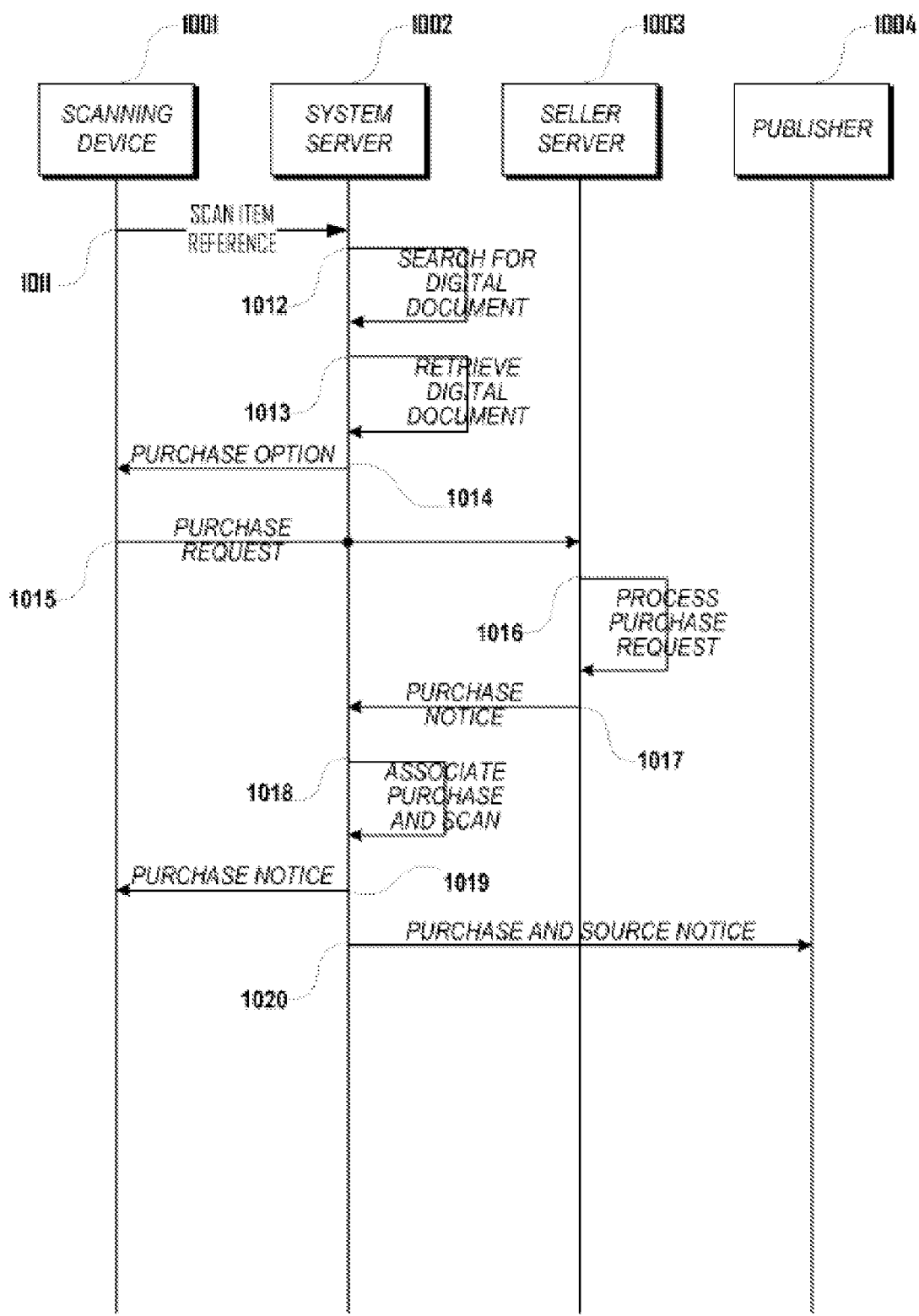
FIG. 10 is a distributed processing diagram showing a process employed in some embodiments of the system to compensate the author or publisher where a user captures text from a document authored or published by that party, and proceeds to use the system to purchase a product related to the capture.

FIG. 10 is a distributed processing diagram showing a process employed in some embodiments of the system to compensate the author or publisher where a user captures text from a document authored or published by that party, and proceeds to use the system to purchase a product related to the capture. The diagram shows communications between a scanning device 1001, a system server 1002, a seller server 1003, and a publisher (or author) 1004. When the user uses the scanning device to perform a capture, a reference 1011 to the capture is passed from the scanning device to the system server. In step 1012, the system server searches for a digital document matching the capture. In step 1013, the system server retrieves a digital document matching the capture. In step 1014, the system server provides to the user via the scanning device a purchase option 1014. The user uses the scanning device to send the purchase request 1015 through the system server to the seller server. In step 1016, the seller server processes the received purchase request. The seller server sends a purchase notice 1017 to the system server. In step 1018, the system server associates the purchase with the capture. The system server sends the scanning device a purchase notice 1019 indicating that the product has been purchased. The system server also sends a purchase and source notice 1020 to the publisher, enabling the publisher and/or the author of the document to be compensated.

Note that the device is capable of interacting with rendered or displayed data, such as that displayed on the screen of a personal computer. The device often also has some means of connecting to a central server—for example, a server having access to documents on the Internet. Therefore, when a device is used in conjunction with a personal computer, the system may represent a separate channel, distinct from the conventional communications of the PC. In some cases, the device may communicate with a remote server on a wholly distinct link, e.g., over a wireless network. In other cases, the system may use the same transports, protocols and physical connections as the PC—but even here, its operation may be quite distinct.

As an example, consider a device that employs some form of encryption built into the scanner to ensure that the data it communicates with a remote server cannot be intercepted and used by a third party. In this case, even if the scanner makes use of a local PC's Internet access to transport data to and from the server, effectively the scanner is tunneling via the PC, and may therefore be thought of as having a separate connection. It may be worth noting that even though the PC is transmitting both its data and the scanner's data, the PC can decode its data but not the scanner's. In one embodiment, a scanner may execute a software routine to perform RSA encryption on data before transmitting it. In such an embodiment, a scanner may have at least one private key hardwired into its circuitry and a server may store the corresponding public keys in the user account for that scanner's unique identifier.

This may be useful because in some circumstances it is helpful not to trust a PC—for example when making financial transactions. The PC, being a general-purpose device, is subject to computer viruses, hackers, Trojan horse malware, etc. Dedicated devices such as wireless handsets, PDA's, etc are generally more robust or secure—or can be made to be so. For example, an encrypted communication may allow a user to connect their scanner to a server via a public computer (e.g. at a public library) without needing to be concerned that another user of this computer will be privy to this user's communications.

Consider the situation where the user has used a PC to research and identify an item that they would like to purchase—but they are not sure of the integrity of the PC. If the vendor of the product can present a code or other information on the screen, the device can scan this and the purchase transaction can be accomplished using the channel.

Figure 11:
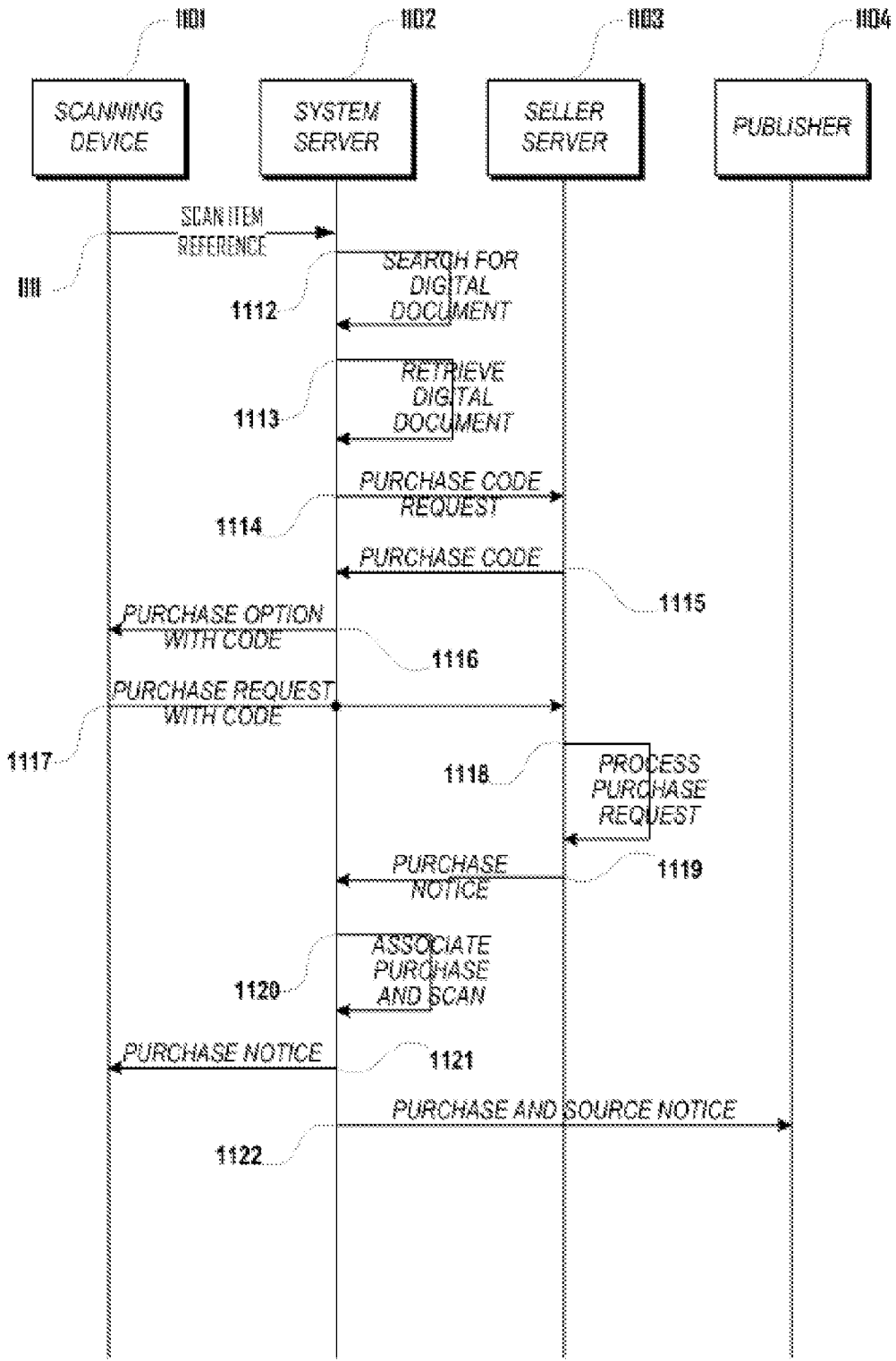
FIG. 11 is a distributed processing diagram showing a process typically employed by the system to enable a user to purchase an item by scanning a code presented to the user and corresponding to the item.

FIG. 11 is a distributed processing diagram showing a process typically employed by the system to enable a user to purchase an item by scanning a code presented to the user and corresponding to the item. The diagram shows interactions between a scanning device 1101, a system server 1102, a seller server 1103, and a publisher/author 1104. The scanning device sends a scan item reference 1111 to the system server. In step 1112, the system server searches for a digital document matching the capture. In step 1113, the system server retrieves a matching digital document. In step 1114, the system server sends the seller server a purchase code request, asking the seller server to specify a code that, when later passed to the seller server from the scanning device, will indicate the user's instruction to purchase the item. The seller server replies with a purchase code 1115. The system server passes a purchase option containing the received purchase code to the scanning device. If the user elects to purchase the product, the user uses the scanning device to scan the purchase option with the code, causing the scanning device to send a purchase request with the code through the system server to the seller server. In step 1118, the seller server processes the received purchase request. The seller server then sends a purchase notice 1119 to the system server. In step 1120, the system server associates the purchase and the scan. The system server sends a purchase notice 1121 to the scanning device. The system server also sends a purchase and source notice 1122 to the publisher, enabling the publisher and/or the author to be compensated for contributing to the transaction.

Conclusion

It will be appreciated by those skilled in the art that the above-described system may be straightforwardly adapted or extended in various ways. While the foregoing description makes reference to particular embodiments, the scope of the invention is defined solely by the claims that following and the elements recited therein.

We claim:

1. A method, comprising:

receiving, by a system server and from a capture device, text captured by the capture device from a paper form of a published document, the document having a publisher;

identifying, by the system server, the published document and the publisher from the captured text;

retrieving, by the system server and from a repository of digital documents, a digital form of the document;

identifying a first product, by the system server, the first product being related to the captured text or to the digital document;

providing to the capture device, by the system server, a purchase option to purchase the first product from a seller server;

receiving a request to purchase the first product from the capture device and providing the request to the seller server, by the system server;

receiving, by the system server, a purchase notice confirming the purchase from the seller server;

associating, by the system server, the purchase with the document and publisher;

providing confirmation of the purchase to the capture device, by the system server; and providing a purchase and source notice to the publisher, by the system server, enabling the publisher or an author of the document to obtain compensation for the purchase.

2. The method of claim 1, wherein the text captured by the capture device comprises a reference to the first product and a reference to a second product, and wherein providing the purchase option to purchase the product comprises:

assessing availability of each of the referenced products for purchase, wherein the first product is assessed to be available and the second product is assessed to be unavailable, and providing an opportunity to purchase the first product without providing an opportunity to purchase the second product.

3. The method of claim 1, wherein providing the purchase option to purchase the first product comprises:

determining terms for purchasing the first product; and presenting the terms for purchasing the first product.

4. The method of claim 1, wherein providing the purchase option to purchase the first product comprises providing a context menu of actions comprising the purchase option to purchase the first product.

5. The method of claim 1, wherein the first product is purchased from a seller, and wherein the method further comprises collecting a referral fee from the seller in connection with the purchase.

6. The method of claim 5, further comprising retrieving, from a document server, a digital document matching the text captured by the capture device, wherein retrieving the digital document comprises:

identifying the document from which the text was captured;

identifying a source of the identified document; and initiating payment to the identified source of a portion of the referral fee.

7. The method of claim 6, wherein the identified source is a publisher.

8. The method of claim 6, wherein the identified source is an author.

9. The method of claim 1, wherein identifying the first product comprises:

identifying one or more non-extraneous text fragments in the text captured by the capture device;

accessing a data repository that includes a mapping between words or phrases and products; and determining that at least one of the text fragments corresponds to a word or phrase associated with the first product.

10. The method of claim 9, wherein identifying one or more non-extraneous text fragments comprises an action selected from the group consisting of (i) stripping stop words, (ii) keeping text that appears within quotes, (iii) keeping proper nouns, (iv) keeping capitalized words, and (v) stripping words from the start and the end of the captured text if their frequency of usage meets or exceeds a predetermined threshold value.

11. The method of claim 1, further comprising:

storing, by the system server and in a user-specific log, information comprising a first identifier of the first product; and receiving, by the system server and from the capture device, a request to access the user-specific log;

wherein the request to purchase the first product occurs after the request to access the user-specific log.

12. A non-transitory computer readable medium containing computer executable instructions that, when executed by one or more servers, cause the one or more servers to perform operations comprising:

receiving text captured by a capture device from a paper form of a published document, the document having a publisher;

identifying the published document and the publisher from the captured text;

retrieving from a repository of digital documents, a digital form of the published document;

identifying a first product, the first product being related to the captured text or to the digital document;

providing to the capture device a purchase option to purchase the first product from a seller server;

receiving a request to purchase the first product from the capture device and providing the request to the seller server;

receiving a purchase notice confirming the purchase from the seller server;

associating the purchase with the document and publisher;

providing confirmation of the purchase to the capture device; and providing a purchase and source notice to the publisher, enabling the publisher or an author of the document to obtain compensation for the purchase.

13. The non-transitory computer readable medium of claim 12, wherein the text captured by the capture device comprises a reference to the first product and a reference to a second product, and wherein providing the purchase option to purchase the product comprises:

assessing availability of each of the referenced products for purchase, wherein the first product is assessed to be available and the second product is assessed to be unavailable, and providing an opportunity to purchase the first product without providing an opportunity to purchase the second product.

14. The non-transitory computer readable medium of claim 12, wherein providing the purchase option to purchase the first product comprises:

determining terms for purchasing the first product; and presenting the terms for purchasing the first product.

15. The non-transitory computer readable medium of claim 12, wherein providing the purchase option to purchase the first product comprises providing a context menu of actions comprising the purchase option to purchase the first product.

16. The non-transitory computer readable medium of claim 12, wherein the first product is purchased from a seller, and wherein the operations further comprise collecting a referral fee from the seller in connection with the purchase.

17. The non-transitory computer readable medium of claim 16 wherein the operations further comprise retrieving, from a document server, a digital document matching the text captured by the capture device, wherein retrieving the digital document comprises:
   identifying the document from which the text was captured;
   identifying a source of the identified document; and
   initiating payment to the identified source of a portion of the referral fee.

18. A server, comprising:
   one or more computing devices; and
   a non-transitory computer readable medium containing computer executable instructions that, when executed by the one or more computing devices, cause the one or more computing devices to perform operations, the operations comprising:
   receiving text captured by a capture device from a paper form of a published document, the document having a publisher,
   identifying the published document and the publisher from the captured text;
   retrieving from a repository of digital documents, a digital form of the published document,
   identifying a first product, the first product being related to the captured text or to the digital document;
   providing a purchase option to purchase the first product from a seller server,
   receiving a request to purchase the first product from the capture device and providing the request to the seller server;
   receiving a purchase notice confirming the purchase from the seller server,
   associating the purchase with the document and publisher;
   providing confirmation of the purchase to the capture device; and
   providing a purchase and source notice to the publisher, enabling the publisher or an author of the document to obtain compensation for the purchase.

19. The server of claim 18, wherein the text captured by the capture device comprises a reference to the first product and a reference to a second product, and wherein providing the purchase option to purchase the product comprises:
   assessing availability of each of the referenced products for purchase, wherein the first product is assessed to be available and the second product is assessed to be unavailable, and
   providing an opportunity to purchase the first product without providing an opportunity to purchase the second product.

20. The server of claim 18, wherein providing the purchase option to purchase the first product comprises:
   determining terms for purchasing the first product; and
   presenting the terms for purchasing the first product.

21. The server of claim 18, wherein providing the purchase option to purchase the first product comprises providing a context menu of actions comprising the purchase option to purchase the first product.

22. The server of claim 18, wherein the first product is purchased from a seller, and wherein the operations further comprise collecting a referral fee from the seller in connection with the purchase.

23. The server of claim 22, wherein the operations further comprise retrieving, from a document server, a digital document matching the text captured by the capture device, wherein retrieving the digital document comprises:
   identifying the document from which the text was captured;
   identifying a source of the identified document; and
   initiating payment to the identified source of a portion of the referral fee.

* * * * *